US011887030B2

(12) United States Patent
DaCosta et al.

(10) Patent No.: US 11,887,030 B2
(45) Date of Patent: Jan. 30, 2024

(54) INTERACTIVE NETWORK AND METHOD FOR SECURING CONVEYANCE SERVICES

(71) Applicant: TELEPORT MOBILITY, INC., San Diego, CA (US)

(72) Inventors: Alexis DaCosta, Santa Clara, CA (US); Vince Coletti, San Marcos, CA (US)

(73) Assignee: TELEPORT MOBILITY, INC., San Diego, CA (US)

( * ) Notice: Subject to any disclaimer, the term of this patent is extended or adjusted under 35 U.S.C. 154(b) by 0 days.

(21) Appl. No.: 17/397,882

(22) Filed: Aug. 9, 2021

(65) Prior Publication Data

US 2021/0398055 A1 Dec. 23, 2021

Related U.S. Application Data

(60) Continuation of application No. 16/038,487, filed on Jul. 18, 2018, now Pat. No. 11,087,252, which is a
(Continued)

(51) Int. Cl.
*G06Q 10/0631* (2023.01)
*G06Q 30/0601* (2023.01)
(Continued)

(52) U.S. Cl.
CPC ... *G06Q 10/063114* (2013.01); *G01C 21/343* (2013.01); *G05D 1/00* (2013.01);
(Continued)

(58) Field of Classification Search
CPC .......... G06Q 10/063114; G06Q 10/02; G06Q 10/063112; G06Q 10/06316;
(Continued)

(56) References Cited

U.S. PATENT DOCUMENTS 5,948,040 A 9/1999 DeLorme et al.
9,262,929 B1 2/2016 Roy et al.
(Continued)

FOREIGN PATENT DOCUMENTS

CA 2974452 A1 7/2016
WO WO-03069576 A1 * 8/2003 ............. G08G 1/127
(Continued)

OTHER PUBLICATIONS

P. Lalos et a. "A Framework for Dynamic Car and Taxi Pools with the Use of Positioning Systems," 2009 Computation World: Future Computing, Service Computation, Cognitive, Adaptive, Content, Patterns, 2009, pp. 385-391, doi: 10.1109/ComputationWorld.2009.55. (Year: 2009).*
(Continued)

*Primary Examiner* — Crystol Stewart
(74) *Attorney, Agent, or Firm* — Eleanor Musick; Torrey Pines Law Group PC

(57) ABSTRACT

The inventive system and method address a long felt need for enhancing the efficiency of systems in the interactive conveyance industry for goods and services by providing for the filtering, selection and securing of conveyance services in accordance with one or more of client and representative preferences in substantially real time.

18 Claims, 11 Drawing Sheets

Related U.S. Application Data continuation-in-part of application No. 15/680,439, filed on Aug. 18, 2017, now Pat. No. 11,087,250, which is a division of application No. 15/675,757, filed on Aug. 13, 2017, now Pat. No. 11,176,500.

(60) Provisional application No. 62/539,706, filed on Aug. 1, 2017, provisional application No. 62/482,306, filed on Apr. 6, 2017, provisional application No. 62/426,549, filed on Nov. 27, 2016, provisional application No. 62/375,491, filed on Aug. 16, 2016.

(51) Int. Cl.

| | | |
|---|---|---|
| *G01C 21/34* | (2006.01) | |
| *G08G 1/127* | (2006.01) | |
| *G06F 16/2457* | (2019.01) | |
| *G05D 1/00* | (2006.01) | |
| *G06Q 10/02* | (2012.01) | |
| *G08G 1/123* | (2006.01) | |
| *G06Q 50/30* | (2012.01) | |
| *G06Q 10/0833* | (2023.01) | |
| *G08G 1/00* | (2006.01) | |
| *G06F 3/0485* | (2022.01) | |
| *G06F 16/248* | (2019.01) | |
| *B60W 60/00* | (2020.01) | |
| *G06Q 50/32* | (2012.01) | |

(52) U.S. Cl.
CPC ....... *G06F 16/24578* (2019.01); *G06Q 10/02* (2013.01); *G06Q 10/06316* (2013.01); *G06Q 10/063112* (2013.01); *G06Q 30/0633* (2013.01); *G08G 1/123* (2013.01); *G08G 1/127* (2013.01); *B60W 60/00253* (2020.02); *G01C 21/34* (2013.01); *G06F 3/0485* (2013.01); *G06F 16/248* (2019.01); *G06Q 10/0833* (2013.01); *G06Q 50/30* (2013.01); *G06Q 50/32* (2013.01); *G08G 1/202* (2013.01)

(58) Field of Classification Search
CPC ........... G06Q 30/0633; G06Q 10/0833; G06Q 50/30; G06Q 50/32; G01C 21/343; G01C 21/34; G05D 1/00; G06F 16/24578; G06F 3/0485; G06F 16/248; G08G 1/123; G08G 1/127; G08G 1/202; B60W 60/00253

See application file for complete search history.

(56) References Cited

U.S. PATENT DOCUMENTS

| | | | |
|---|---|---|---|
| 9,562,785 | B1 | 2/2017 | Racah et al. |
| 10,093,252 | B2 | 10/2018 | Zych |
| 10,628,758 | B2 | 4/2020 | Ikeda et al. |
| 11,067,983 | B2 * | 7/2021 | Kentley-Klay ........ G06Q 10/00 |
| 11,087,252 | B2 | 11/2021 | DaCosta et al. |
| 11,176,500 | B2 | 11/2021 | DaCosta et al. |
| 11,182,709 | B2 | 11/2021 | DaCosta et al. |
| 2001/0056396 | A1 | 12/2001 | Goino |
| 2004/0143466 | A1 | 7/2004 | Smith et al. |
| 2004/0260470 | A1 | 12/2004 | Rast |
| 2006/0136254 | A1 | 6/2006 | Greenstein |
| 2009/0234564 | A1 | 9/2009 | Onishi et al. |
| 2009/0248587 | A1 | 10/2009 | Van Buskirk |
| 2010/0017237 | A1 | 1/2010 | Dalesandro et al. |
| 2010/0312591 | A1 | 12/2010 | Wu |
| 2011/0040655 | A1 | 2/2011 | Hendrickson |
| 2011/0055046 | A1 | 3/2011 | Bowen et al. |
| 2011/0137666 | A1 | 6/2011 | Zuida et al. |
| 2011/0153629 | A1 | 6/2011 | Lehmann et al. |
| 2012/0130627 | A1 | 5/2012 | Slam et al. |
| 2013/0041696 | A1 | 2/2013 | Richard |
| 2013/0103313 | A1 | 4/2013 | Moore et al. |
| 2013/0132140 | A1 | 5/2013 | Amin et al. |
| 2013/0158861 | A1 * | 6/2013 | Lerenc ............... G01C 21/3438 701/410 |
| 2014/0026065 | A1 | 1/2014 | Wang |
| 2014/0032034 | A1 | 1/2014 | Raptopoulos et al. |
| 2014/0039784 | A1 | 2/2014 | Millspaugh |
| 2014/0040079 | A1 | 2/2014 | Smirin |
| 2014/0046585 | A1 | 2/2014 | Morris, IV et al. |
| 2014/0067488 | A1 | 3/2014 | James et al. |
| 2014/0067491 | A1 | 3/2014 | James et al. |
| 2014/0172727 | A1 | 6/2014 | Abhyanker et al. |
| 2014/0229258 | A1 | 8/2014 | Seriani |
| 2014/0278802 | A1 | 9/2014 | Macpherson |
| 2014/0309876 | A1 | 10/2014 | Ricci |
| 2014/0365268 | A1 | 12/2014 | Masterlark |
| 2015/0039365 | A1 | 2/2015 | Haque |
| 2015/0066361 | A1 | 3/2015 | Stenneth |
| 2015/0081362 | A1 | 3/2015 | Chadwick et al. |
| 2015/0161752 | A1 | 6/2015 | Barreto et al. |
| 2015/0185034 | A1 | 7/2015 | Abhyanker |
| 2015/0206267 | A1 | 7/2015 | Khanna et al. |
| 2015/0294237 | A1 | 10/2015 | Stener |
| 2015/0294566 | A1 | 10/2015 | Huang et al. |
| 2015/0338852 | A1 | 11/2015 | Ramanujam |
| 2015/0339928 | A1 | 11/2015 | Ramanujam |
| 2015/0356501 | A1 | 12/2015 | Gorjestani et al. |
| 2015/0379437 | A1 | 12/2015 | Reich |
| 2016/0019496 | A1 | 1/2016 | Gorlin |
| 2016/0055605 | A1 | 2/2016 | Kim et al. |
| 2016/0055743 | A1 | 2/2016 | Raj |
| 2016/0098650 | A1 | 4/2016 | Ratti et al. |
| 2016/0104110 | A1 | 4/2016 | Jones et al. |
| 2016/0125735 | A1 | 5/2016 | Tuukkanen |
| 2016/0171574 | A1 * | 6/2016 | Paulucci ................ G06Q 50/30 705/13 |
| 2016/0244311 | A1 | 8/2016 | Burks et al. |
| 2016/0293012 | A1 | 10/2016 | Lubeck et al. |
| 2016/0334797 | A1 | 11/2016 | Ross et al. |
| 2016/0356624 | A1 | 12/2016 | O'Beimne et al. |
| 2016/0364812 | A1 | 12/2016 | Cao |
| 2017/0011324 | A1 | 1/2017 | Truong et al. |
| 2017/0059336 | A1 | 3/2017 | Huang et al. |
| 2017/0083957 | A1 | 3/2017 | Ross et al. |
| 2017/0098224 | A1 | 4/2017 | Marco et al. |
| 2017/0123421 | A1 | 5/2017 | Kentley et al. |
| 2017/0123422 | A1 | 5/2017 | Kentley et al. |
| 2017/0123429 | A1 | 5/2017 | Levinson et al. |
| 2017/0124205 | A1 | 5/2017 | Shaam et al. |
| 2017/0126810 | A1 | 5/2017 | Kentley et al. |
| 2017/0132696 | A1 * | 5/2017 | Haparnas ........... G06Q 30/0635 |
| 2017/0132934 | A1 | 5/2017 | Kentley et al. |
| 2017/0138749 | A1 | 5/2017 | Pan et al. |
| 2017/0141873 | A1 | 5/2017 | Mandeville-Clarke et al. |
| 2017/0147959 | A1 | 5/2017 | Sweeney et al. |
| 2017/0178085 | A1 | 6/2017 | Kragh et al. |
| 2017/0187787 | A1 | 6/2017 | Syamala et al. |
| 2017/0192428 | A1 | 7/2017 | Vogt et al. |
| 2017/0192437 | A1 | 7/2017 | Bier et al. |
| 2017/0219360 | A1 * | 8/2017 | Cui .................... G01C 21/3815 |
| 2017/0220966 | A1 | 8/2017 | Wang |
| 2017/0282821 | A1 | 10/2017 | Zych |
| 2017/0313323 | A1 | 11/2017 | Tseng et al. |
| 2017/0316387 | A1 | 11/2017 | Joshi et al. |
| 2017/0372703 | A1 | 12/2017 | Sung et al. |
| 2018/0004211 | A1 | 1/2018 | Grimm et al. |
| 2018/0024552 | A1 | 1/2018 | She |
| 2018/0024554 | A1 | 1/2018 | Brady et al. |
| 2018/0025407 | A1 * | 1/2018 | Zhang ................... G06Q 10/02 705/26.81 |
| 2018/0032928 | A1 | 2/2018 | Li et al. |
| 2018/0033058 | A1 | 2/2018 | Mukherjee et al. |
| 2018/0053136 | A1 | 2/2018 | DaCosta et al. |

(56) References Cited

U.S. PATENT DOCUMENTS

2018/0357912 A1* 12/2018 Kessler .................... G08G 7/02
2019/0318277 A1* 10/2019 Goldman ............. G05D 1/0297

FOREIGN PATENT DOCUMENTS

WO        2011149979 A2    12/2011
WO        2019203804 A1    10/2019

OTHER PUBLICATIONS

J. Keiser et al., "IMA—An adaptable and dynamic service platform for intermodal mobility assistance," 17th International IEEE Conference on Intelligent Transportation Systems (ITSC), Qingdao, China, 2014, pp. 1521-1528, doi: 10.1109/ITSC.2014.6957649. (Year: 2014).*

N. J. Farin, M. N. A. A. Rimon, S. Momen, M. S. Uddin and N. Mansoor, "A framework for dynamic vehicle pooling and ride-sharing system," 2016 International Workshop on Computational Intelligence (IWCI), Dhaka, Bangladesh, 2016, pp. 204-208, doi: 10.1109/IWCI.2016.7860366. (Year: 2016).*

Lalos, P., et al. "A Framework for Dynamic Car and Taxi Pools with the Use of Positioning Systems", Computation World: Future Computing, Service Computation, Cognitive, Adaptive, Content, Patterns, 2009, pp. 385-391, doi: 10.1109/ComputationWorld.2009.55.

Lam, A. et al., Autonomous-Vehicle Public Transportation System: Scheduling and Admission Control, IEEE Transactions on Intelligent Transportation Systems, May 2016, pp. 1210-1226, vol. 17, No. 5.

Rigby, M. et al., "A Continuous Representation of Ad Hoc Ridesharing Potential," in IEEE Transactions on Intelligent Transportation Systems, vol. 17, No. 10, pp. 2832-2842, Oct. 2016, doi: 10.1109/TITS.2016.2527052. (Year:2016).

* cited by examiner

INTERACTIVE NETWORK AND METHOD FOR SECURING CONVEYANCE SERVICES

RELATED APPLICATIONS

This is a continuation of application Ser. No. 16/038,487, filed Jul. 18, 2018, issued as U.S. Pat. No. 11,087,252, which is a continuation-in-part of application Ser. No. 15/680,439, filed Aug. 18, 2017, which is a divisional application of application Ser. No. 15/675,757, filed Aug. 13, 2017, which claims benefit of priority to Provisional Application No. 62/375,491 filed Aug. 16, 2016, Provisional Application No. 62/426,549 filed Nov. 27, 2016, Provisional Application No. 62/482,306 filed Apr. 6, 2017, and Provisional Application No. 62/539,706 filed Aug. 1, 2017, each of which is incorporated by reference herein in their entirety.

FIELD OF THE INVENTION

The present invention relates generally to the field of conveyance service management and more particularly to an interactive network and method for offering, managing, and securing conveyance services in substantially real time.

BACKGROUND

As in many new industries, there are inefficiencies in existing support systems and methods due to the lack of experience in optimizing these systems for the needs of the new industry. These inefficiencies are typically identified over time through trial and error, eventually leading to technological advancement in the field. This generalization holds true for the conveyance industry, which includes a large number of new industry segments such as ride-hail, rideshare, and on-demand delivery services.

The existing inefficient support systems and methods available to many conveyance industry segments impose disadvantages on nearly all involved: the clients, the service providers, and the representatives who perform the services on behalf of the service providers.

Many failings within the existing systems and methods are rooted in computer technology and tied to the fact that the modern conveyance industry segments operate and change quite rapidly: a conveyance service offering that is available one minute can be snapped up by another client in the next minute, or a service request can be answered by another representative before the service provider can respond and dispatch its representative. In the fast pace of the conveyance industry segment, neither representatives nor conveyance clients can procure the available information and evaluate it rapidly and accurately to make a well-informed decision on the fly. There is currently no system available to assist both representatives and conveyance clients with the rapid processing capability needed to keep up with the rate of change. This lack of a substantially real time capability leads to a representative obtaining a suboptimal, one-size-fits-all conveyance service request and a conveyance client obtaining a suboptimal, one-size-fits-all conveyance service offering due to the inability to easily apply their own preferences.

Currently, a conveyance client requesting a ride in the ride-hail industry segment is offered different ride options, prices, wait times, and times to destination depending on which service provider is offering a given conveyance service and when the conveyance service offering is secured. Often, a conveyance client is provided options of conveyance service offerings from only one service provider to accept or decline. A representative is limited even further as only one conveyance service request is shown when a representative wants to provide a conveyance service in any conveyance industry segment. The current approaches for matching up representatives with conveyance service requests, and conveyance service offerings to conveyance clients, is inefficient and wasteful.

The current systems and methods for a representative to analyze incoming conveyance service requests are very difficult and time consuming in the fast-paced, substantially real time environment of conveyance industry segments. The current technology does not permit a representative to analyze or evaluate and then accept conveyance service requests that the representative would prefer based on their individual preferences. Representatives are currently given a single conveyance service request and only have the option of accepting or declining that specific conveyance service request, without an alternative. Frequently, the details of a conveyance service request that a representative is responding to are not provided in advance but are only revealed after that conveyance service request has already been secured. Thus, a representative is forced to either blindly accept a conveyance service request or decline to work at all.

In addition, a representative will often be penalized for canceling a conveyance service request that they may not wish to fulfill, even when the representative would ordinarily not have accepted the request in the first place had they been given a choice. This disadvantage, among others, has led to the common practice of representatives working for more than one service provider at the same time to allow some semblance of choice. However, the effort required to evaluate incoming requests from multiple service providers injects its own delays and detracts from the ability to rapidly respond as needed in the substantially real time environment of conveyance industry segments. Specifically, to evaluate conveyance service requests, a representative would have to login to multiple applications from different service providers and navigate between these applications, viewing one individual conveyance service request per application. The serial approach to evaluating conveyance service requests can cause a representative to miss out on desirable conveyance service requests that a representative might have preferred. Currently there is no system that permits the simultaneously evaluation of multiple conveyance service requests from multiple service providers in substantially real time.

Without a way to evaluate conveyance service requests continuously in substantially real time, a representative currently cannot maximize their efforts as efficiently as they would like. To secure a preferred conveyance service request, a representative might be tempted to forego less desirable conveyance service requests in the hope that a more preferred request to become available, but this risks missing out on income if none comes along.

There is also currently no system or method to evaluate and secure conveyance service requests in substantially real time across more than one conveyance industry segment. The absence of this capability further limits a representative's exposure in the conveyance industry and their ability to operate more efficiently if the representative wants to provide conveyance services across conveyance industry segments. In addition, current limitations also reduce the amount of potential preferred conveyance service requests available to a representative. For example, if a representative wants to provide a ride in the ride-hail industry segment, then deliver food in the good delivery industry segment to take advantage of overlaps in locations or routes, the representative does not have the ability to evaluate and secure the requests in substantially real time. If there were a system and method to allow a representative to easily work across industry segments, the representative would have access to a greater number of diverse conveyance service requests allowing more efficient use of their time and vehicle resources.

Currently, some service providers dynamically increase prices in certain areas for various reasons. Representatives looking to work more efficiently or earn more money try to work in these areas as much as possible, however, by the time a representative gets to the area with elevated pricing, the increased pricing may have moved or been removed. Representatives experience the challenge of chasing the elevated pricing areas but often cannot capitalize on them. This problem could be addressed by providing a tool to allow representatives to predict where the areas of elevated pricing will be in order to maximize their earning potential.

The need to evaluate multiple conveyance service requests in a sequential order creates a situation known as the travelling salesman problem, which is compounded when new conveyance service requests or offerings become available in substantially real time.

Many of the challenges described herein are experienced by conveyance service providers in general, whether the providers are representatives, e.g., drivers, dispatchers, or fleet managers, or they are owners or operators of autonomous vehicles (AVs). Service providers are disadvantaged due to the inefficient systems and methods currently used in conveyance industry segments. A significant problem among service providers is the lack of representatives to provide conveyance services. Because representatives can switch among different service providers to chase the best opportunities, service providers may not have a stable supply of representatives. With autonomous vehicles becoming more prevalent, service providers may believe they have found the solution to this problem by using driverless AVs to supplement the lack of drivers. The ability to employ AVs reduces the chance of wage and benefit disputes, taxi permits, vehicle qualifications, and vehicle maintenance. Service providers can use autonomous vehicles to address some of these challenges and increase profits, however an efficient system and method to incorporate or utilize autonomous vehicles into the conveyance industry segments is needed.

When service providers' AVs are used, other issues such as the vehicle routing and vehicle dispatch become important. Existing technology is lacking in its ability to evaluate and then secure a preferred conveyance service request for an AV. For example, there is currently no system to automatically analyze conveyance service requests continuously in substantially real time and secure additional conveyance service requests while an AV performs a conveyance service.

SUMMARY

In one aspect of the invention, an interactive network and method are provided for requesting, offering, managing, obtaining, and/or providing conveyance services for transportation of persons or objects within a variety of different conveyance industries.

In another aspect of the invention, an interactive network and method are provided for managing and/or optimizing efficiency within businesses that provide and/or operate conveyance services and vehicles for transportation of persons or objects within a variety of different industries.

DETAILED DESCRIPTION OF EMBODIMENTS

Figure 1:
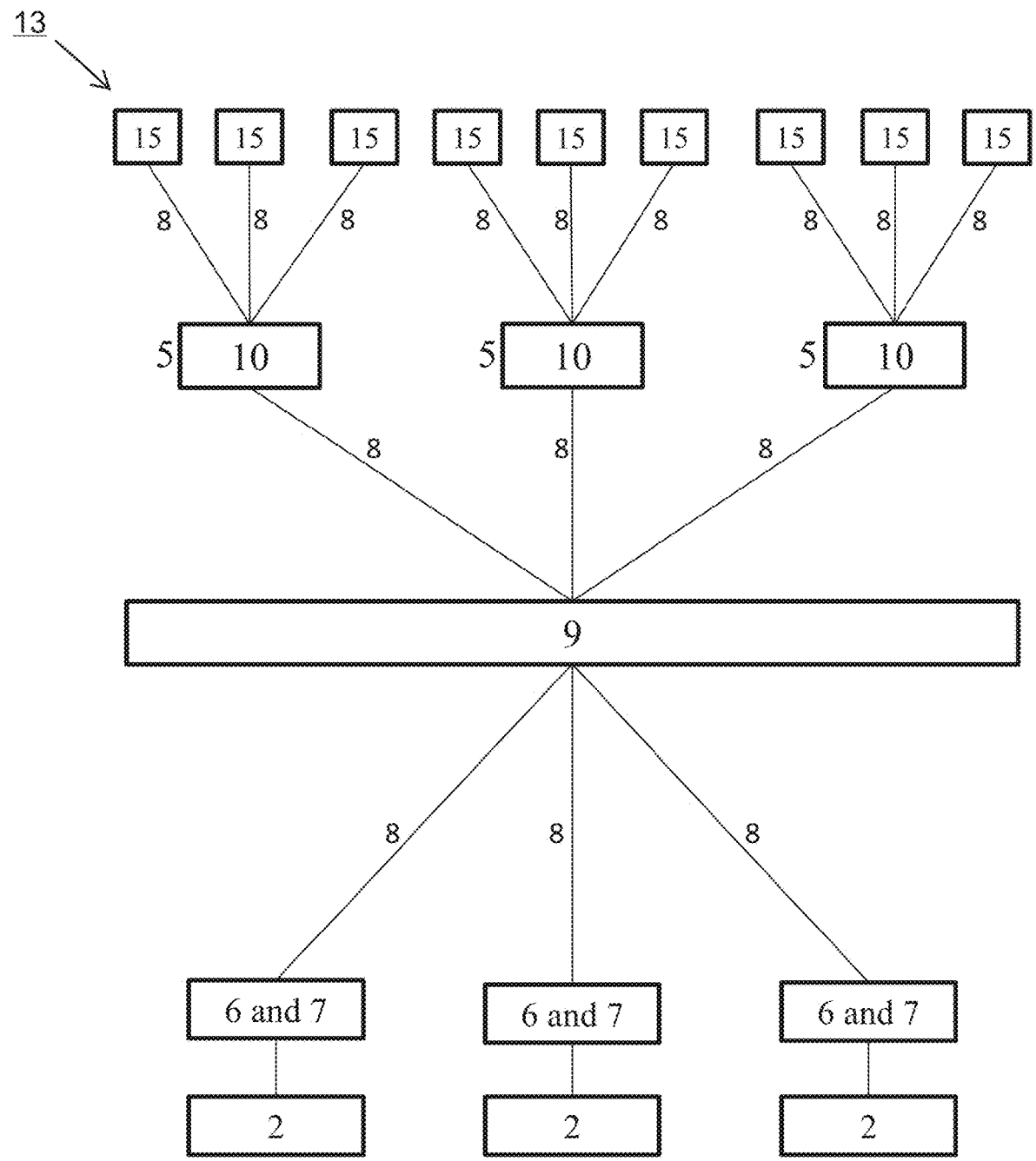
FIG. 1 is a high-level schematic of an automated conveyance system according to one embodiment of the present invention that utilizes representative preferences.

Definitions: Unless defined otherwise, all technical and scientific terms used herein have the plain and ordinary meaning as would be understood by a person of skill in the art. Unless expressly limited, where a term is provided in the singular, the description contemplates the plural of that term, i.e., one or more, and where a term is provided in the plural, the inventors also contemplate the singular of that term. To provide a clarifying example, when an object is described, unless that object is expressly described as a single object, "one or more object", or "at least one object" also falls within the meaning of that term.

As used herein, "AV" refers to an autonomous vehicle, one or more autonomous vehicle, e.g., "AV(s)", or "AVs" (more than one AV), which is controlled by an owner or operator, referred to as an "AV owner/operator". An AV owner/operator may control a single AV or more than one AV.

As used herein, "substantially real time" means real time or near real time.

General Description of the Inventive Platform and Problems Being Solved

In one embodiment, a Representative Automated Platform (also referred to as "RAP") comprises a technology based solution, automated in whole or in part, that employs a substantially real time system and method to assist a representative in evaluating and/or securing a preferred conveyance service request.

The inventive RAP can analyze or evaluate a conveyance service request continuously in substantially real time, in order to identify and then secure a preferred conveyance service request based on a representative preference and a substantially real time geographical location of a representative. After securing or obtaining a first preferred conveyance service request, a representative can perform a conveyance service and The inventive RAP, can automatically and continuously repeat a substantially real time process of analyzing or evaluating and then securing or obtaining a subsequent or additional preferred conveyance service request until a process is stopped by a representative and a representative performs a final conveyance service.

The inventive RAP, automated in whole or in part, provides improved efficiency for a representative in analyzing or evaluating a conveyance service request continuously in substantially real time to identify and then secure a preferred conveyance service request and a subsequent or additional preferred conveyance service request. The inventive RAP can be updated in substantially real time with an incoming conveyance service request to be continuously analyzed or evaluated and can then secure a subsequent or additional preferred conveyance service request. The inventive RAP can continuously analyze or evaluate a conveyance service request in substantially real time and secure a preferred conveyance service request while a representative performs a conveyance service.

As a result, a representative and a service provider can operate more efficiently and can potentially perform an additional conveyance service to increase earning potential. A proposal or recommendation from The inventive RAP of a different conveyance service request can improve efficiency relating to a representative and solve a problem relating to a traveling salesman problem or a dynamic traveling salesman problem. The inventive RAP can solve a problem by identifying, securing or obtaining a subsequent or additional preferred conveyance service request, and performing a conveyance service more efficiently by continuously analyzing or evaluating a conveyance service request in substantially real time. This improved efficiency can allow a representative to perform an additional conveyance service based on a representative preference and a substantially real time geographical location of a representative. A benefit of the present invention can address a problem relating to a traveling salesman problem, a dynamic traveling salesman problem, or a combination thereof, relating to a conveyance industry segment.

In one embodiment, the inventive RAP, when automated in part, can enhance representative efficiency. The RAP can perform a process to identify a preferred conveyance service request relating to a representative preference and a representative can simply accept or decline. In this example, a pop-up or notification of a preferred conveyance service request can be displayed on an application for a representative to accept or decline. If declined, a next preferred conveyance service request can be displayed until a preferred conveyance service request is accepted, declined, or a representative turns off the RAP. The ability of the RAP to continuously analyze or evaluate in substantially real time and display a preferred conveyance service request, allows a representative to work more efficiently and improve a user interaction compared to the current state of the art.

The inventive RAP enhances the decision making process for the representative by continuously analyzing or evaluating conveyance service requests in substantially real time. Existing approaches are limited in that they permit a representative to receive a subsequent conveyance service request at one point in time, and often only when the representative is close to completing the service relating to a previously-accepted conveyance service request.

Such limitations impact the representative's decision making ability and do not allow the representative to apply preferences, reducing the opportunity to secure a most preferred conveyance service request available at that time. The inventive RAP can identify a preferred conveyance service request that a representative might otherwise miss due to the current approaches. The inventive RAP can secure a subsequent or additional preferred conveyance service request while a representative is performing a conveyance service. Due to the current state of the art, a representative can potentially miss securing or obtaining a subsequent or additional preferred conveyance service request because a representative is limited on how and when a conveyance service request can be secured or obtained, let alone even analyzed or evaluated. Instead of having a representative multi-task while performing a conveyance service and searching for a next conveyance service request, which can often lead to securing or obtaining a suboptimal conveyance service request, The inventive RAP can take care of analyzing or evaluating and then securing or obtaining a preferred conveyance service request for a representative.

With the inventive RAP, by using continuous and improved substantially real time analysis or evaluation instead of a one-time analysis or evaluation, a decision making process can be improved, and a preferred conveyance service request can be secured or obtained. A benefit of an improved decision making process of the present invention can also address a problem relating to a traveling salesman problem, a dynamic traveling salesman problem, or a combination thereof, relating to a conveyance industry segment.

The inventive RAP can enhance usability or interaction with a user. The current state of the art can require a representative to take valuable time and effort to potentially receive a subsequent or additional conveyance service request, often times while driving. The inventive RAP can update or notify a representative while performing a conveyance service about including but not limited to a direction, a route, a conveyance client, a conveyance service request, a preferred conveyance service request, a beginning service geographical location, an ending service geographical location, or a combination thereof, which can improve an interaction or usability for a representative to perform a conveyance service. The present invention can improve the current state of the art and can allow a representative to input or provide a representative preference and the inventive RAP can facilitate analyzing or evaluating and then securing or obtaining a subsequent or additional preferred conveyance service request continuously in substantially real time.

The inventive RAP also provides safety benefits. The less attention a representative has to pay to a mobile device and the more focused they are on performing a conveyance service, the safer it is for the representative, the conveyance client, and others in the vicinity or area. The inventive RAP can use a preferred system and a preferred method to automatically search, filter, analyze or evaluate, and then secure a preferred conveyance service request based on a representative preference and geographical location of the representative while allowing the representative to focus solely on the conveyance service, providing higher levels of safety for the conveyance client and others.

The inventive RAP can manage or control a representative from a single vehicle perspective, a fleet perspective, an independent third party perspective, or a combination thereof. The RAP benefits a fleet manager, a service provider, a good supplier, An AV owner/controller, a logistics provider, or a logistics supplier by integrating or implementing software, hardware, logistics, or a combination thereof, by optimizing vehicle utilization in substantially real time. The inventive RAP can integrate or implement software, hardware, logistics, or a combination thereof, for or with a fleet manager, a service provider, a good supplier, an AV owner/controller, a logistics provider, or a logistics supplier. The RAP can integrate or implement software, hardware, logistics, or a combination thereof, for or with a fleet manager, a service provider, a good supplier, an AV owner/controller, a logistics provider, or a logistics supplier to facilitate a conveyance service in substantially real time between a representative and a conveyance client. A fleet manager, a service provider, a good supplier, an AV owner/controller, a logistics provider, or a logistics supplier can employ or utilize The inventive RAP to optimize vehicle utilization, which can result in more affordable services and can improve consumer sentiment among or with a conveyance client.

In another embodiment, an Autonomous Vehicle Automated Platform, alternatively referred to herein as an "AV Automated Platform" or "AVAP", is a technology-based solution that can be automated in whole or in part, operating in substantially real time to assist one or more AV to analyze, evaluate and secure one or more preferred conveyance service request.

The inventive AVAP continuously analyzes one or more conveyance service requests in substantially real time in order to identify and secure preferred conveyance service request(s) based on a selected preference and the geographical location of the AV(s). After securing a first preferred conveyance service request, the AV(s) can perform a conveyance service and the AVAP can automatically and continuously repeat the process of analyzing or evaluating to secure an additional preferred conveyance service request until the process is stopped by an AV owner/controller, or until the AV(s) performs the final conveyance service among the outstanding service requests.

The inventive AVAP provides improved efficiency in analyzing or evaluating conveyance service requests by continuously, in substantially real time, identifying and securing a preferred conveyance service request and a subsequent or additional preferred conveyance service request for an AV. The AVAP can be updated in substantially real time with an incoming conveyance service request to be continuously analyzed or evaluated and can then secure a subsequent or additional preferred conveyance service request. The AVAP can continuously analyze or evaluate a conveyance service request in substantially real time and secure a preferred conveyance service request while an AV performs a conveyance service.

As a result, an AV, an AV owner/controller, a service provider, a good supplier, a fleet manager, a logistics provider, a logistics supplier, or a combination thereof, can operate more efficiently and can potentially perform an additional conveyance service to increase earning potential. A proposal or recommendation from the inventive AVAP of a different conveyance service request can improve efficiency relating to an AV, a service provider, an AV owner/controller, a good supplier, a fleet manager, a logistics provider, a logistics supplier, or a combination thereof, and solve a problem relating to a vehicle routing problem or a vehicle dispatch problem. The AVAP of the present invention can solve a problem in existing approaches by identifying, securing, or obtaining a subsequent or additional preferred conveyance service request, and performing a conveyance service more efficiently by continuously analyzing or evaluating a conveyance service request in substantially real time. This improved efficiency can allow a service provider, an AV owner/controller, a good supplier, a fleet manager, a logistics provider, a logistics supplier, or a combination thereof, to strategically place or dispatch an AV based on a selected preference and a substantially real time geographical location of an AV. A benefit of the inventive AVAP can address a problem relating to a vehicle routing problem, a vehicle dispatch problem, or a combination thereof, relating to a conveyance industry segment.

The AVAP improves earning potential for an AV owner/controller by taking advantage of the availability of an extra seat within an AV for responding to an additional conveyance service request.

When the inventive AVAP is automated in part, it can perform a process to identify a preferred conveyance service request relating to a selected preference and an AV owner/controller can simply accept or decline. In this example, a pop-up or notification of a preferred conveyance service request can be displayed on an owner/controller application for an AV owner/controller to accept or decline. If declined, a next preferred conveyance service request can be displayed until a preferred conveyance service request is accepted, declined, or the AV owner/controller turns off the inventive AVAP. The AVAP's ability to analyze or evaluate continuously in substantially real time and display a preferred conveyance service request, allows an AV, an AV owner/controller, a service provider, a good supplier, a fleet manager, a logistics provider, a logistics supplier, or a combination thereof, to work more efficiently.

The AVAP enables improved decision making for the AV owner/controller, an AV, a service provider, a good supplier, a fleet manager, a logistics provider, a logistics supplier, or a combination thereof, in a substantially real time conveyance industry segment. The AVAP can continuously analyze or evaluate conveyance service requests in substantially real time whereas current practices are typically limited to presenting only the next available service request within the sequence, and usually only when the AV is close to completing services related to the previously-accepted conveyance service request.

Such limitations can decrease the AV owner/controller's decision-making ability, not allow the AV owner/controller to apply a selected preference and/or can reduce opportunities for securing the most preferred conveyance service request available at a given time. The inventive AVAP can identify a preferred conveyance service request that an AV owner/controller, a service provider, a good supplier, a fleet manager, a logistics provider, a logistics supplier, or a combination thereof, might miss under the current practices. The AVAP can secure a subsequent or additional preferred conveyance service request while an AV is performing a conveyance service. Due to the current state of the art, an AV owner/controller, a service provider, a good supplier, a fleet manager, a logistics provider, a logistics supplier, or a combination thereof, might miss securing a subsequent or additional preferred conveyance service request because the AV owner/controller, service provider, good supplier, fleet manager, logistics provider, logistics supplier, or a combination thereof, is limited as to how and when a conveyance service request can be secured.

With the inventive AVAP, by using continuous and improved substantially real time analysis or evaluation instead of a one-time analysis or evaluation, a decision making process can be improved, and a preferred conveyance service request can be secured or obtained. A benefit of an improved decision making process of the present invention can also address a problem relating to a vehicle routing problem, a vehicle dispatch problem, or a combination thereof, relating to a conveyance industry segment.

Currently, there is a shortage of a representative in a conveyance industry segment. The inventive AVAP can assist a service provider, an AV owner/controller, a good supplier, a fleet manager, a logistics provider, a logistics supplier, or a combination thereof, in supplementing a shortage of a representative to provide an additional conveyance service, which can increase profitability for a service provider, an AV owner/controller, a good supplier, a fleet manager, a logistics provider, a logistics supplier, or a combination thereof, and decrease waiting times for a conveyance client. The inventive AVAP can allow An AV owner/controller, a service provider, a good supplier, a fleet manager, a logistics provider, a logistics supplier, or a combination thereof, to supplement the lack of a representative with an AV to help fulfill an additional conveyance service request.

The AVAP facilitates provision of improved quality of service for a conveyance client. Currently, there are problems with quality of service relating to a representative. The present invention can improve and mitigate challenges associated with quality of service within the conveyance industry.

The inventive AVAP improves the process of managing or controlling an AV or a fleet of AVs in substantially real time relating to a fleet manager, a service provider, a good supplier, an AV owner/controller, a logistics provider, or a logistics supplier. The AVAP can manage or control an AV from a single vehicle perspective, a fleet perspective, an independent third party perspective, or a combination thereof.

The inventive AVAP can benefit a fleet manager, a service provider, a good supplier, An AV owner/controller, a logistics provider, or a logistics supplier by integrating or implementing software, hardware, logistics, or a combination thereof, by optimizing vehicle utilization in substantially real time. The inventive AVAP can integrate or implement software, hardware, logistics, or a combination thereof, for or with a fleet manager, a service provider, a good supplier, An AV owner/controller, a logistics provider, or a logistics supplier. The inventive AVAP can integrate or implement software, hardware, logistics, or a combination thereof, for or with a fleet manager, a service provider, a good supplier, an AV owner/controller, a logistics provider, or a logistics supplier to facilitate a conveyance service in substantially real time between an AV and a conveyance client. A fleet manager, a service provider, a good supplier, an AV owner/controller, a logistics provider, or a logistics supplier can employ or utilize the AVAP to optimize vehicle utilization, which can result in more affordable services and can improve consumer sentiment among conveyance clients.

The inventive AVAP can benefit a fleet manager, a service provider, a good supplier, an AV owner/controller, a logistics provider, or a logistics supplier by allowing a third party to control or operate an AV to perform a conveyance service. Conversely, the AVAP can benefit a third party by having a fleet manager, a service provider, a good supplier, an AV owner/controller, a logistics provider, or a logistics supplier control or operate an AV to perform a conveyance service.

The inventive approach provides improved ability for a representative to interact with others including a conveyance client, a good supplier, a service provider, an AV owner/controller, a good supplier, a fleet manager, a logistics provider, a logistics supplier, or a combination thereof, or a combination thereof, due to increased insight or knowledge relating to a conveyance industry segment. The present invention can be a tool for presenting including but not limited to a preferred conveyance service request, a filtered conveyance service request, conveyance data, or a combination thereof, to be analyzed or evaluated by a representative.

The inventive approach provides a representative greater control or flexibility when analyzing or evaluating and then securing or obtaining a preferred conveyance service request. The representative can set a parameter or a representative preference on how and where a representative wants to work, thus providing more control or flexibility. An AV owner/controller can set a parameter or a selected preference on how and where to dispatch an AV, thus providing more control or flexibility for An AV owner/controller.

The RAP and/or AVAP provides representative or AV owner/controller with a method of analyzing or evaluating and then securing a preferred conveyance service request in substantially real time. By utilizing a system and a method that can operate in substantially real time, quantum computing, machine learning technology, or a combination thereof, can be incorporated to further improve analysis or evaluation for a representative, an AV, an AV owner/controller, a service provider, a good supplier, a fleet manager, a logistics provider, a logistics supplier, or a combination thereof, to secure a preferred conveyance service request.

The inventive RAP and/or AVAP allow a larger number of a conveyance service request available to be analyzed or evaluated by a representative, an AV owner/controller, an AV, a service provider, a good supplier, a fleet manager, a logistics provider, a logistics supplier, or a combination thereof. The larger number of conveyance service requests that a representative, an AV owner/controller, an AV, a service provider, a good supplier, a fleet manager, a logistics provider, a logistics supplier, or a combination thereof, has exposure to, the greater the chance of identifying preferred conveyance service requests to secure given a representative preference or a selected preference.

The inventive platform allows a representative to input or provide a representative preference to filter a conveyance service request into a filtered conveyance service request and identify a preferred conveyance service request from a filtered conveyance service request. The representative can analyze or evaluate a conveyance service request more efficiently using a representative preference to identify and secure a preferred conveyance service request. An improved process can allow a representative to work more efficiently and spend less time on identifying and securing or obtaining a preferred conveyance service request and more time on providing a conveyance service.

The inventive platform allows an AV owner/controller to input or provide a selected preference to filter a conveyance service request into a filtered conveyance service request and identify a preferred conveyance service request from a filtered conveyance service request. An AV, an AV owner/controller, or a combination thereof, can analyze or evaluate a conveyance service request more efficiently by using a selected preference to identify and secure a preferred conveyance service request. The improved process increases efficiency and saves times that was previously required for identifying and securing a preferred conveyance service request.

The inventive RAP allows a representative to increase their earning potential when securing or obtaining a preferred conveyance service request relating to a representative preference. The representative is able to input or provide a representative preference to identify and secure a preferred conveyance service request. The improved process allows a representative to enhance earnings by, for example, securing preferred conveyance service requests that meet elevated pricing preferences, or shorter distance preferences to allow operation within an elevated pricing area. The increased benefit of higher earning potential extends to an AV, an AV owner/controller, a service provider, a good supplier, a fleet manager, a logistics provider, a logistics supplier, or a combination thereof.

Additional benefits of the inventive platform include ability of a representative or an AV to concurrently operate for or contract with multiple different service providers, good suppliers, fleet managers, logistics providers, logistics suppliers, or combinations thereof.

Currently, a service provider, a good supplier, a fleet manager, a logistics provider, a logistics supplier, or a combination thereof, do not have an ability to enable a representative or an AV to operate in an additional conveyance industry segment at the same time. The inventive platform allows a representative or an AV to operate initially in a conveyance industry segment, then perform a conveyance service in a different conveyance industry segment, and then go back to operate in a first conveyance industry segment. The inventive approach seamlessly allows a representative or an AV to transfer across a conveyance industry segments based on a representative preference or a selected preference.

The inventive platform adds value to the conveyance industry as a whole, providing the ability to operate more efficiently, handle more capacity, and prosper for future growth of the industry. Representatives, service providers, good suppliers, fleet managers, a logistics providers, logistics suppliers, or a combinations thereof, can benefit by increasing satisfaction of representatives and allowing representatives to identify and perform preferred conveyance services based on a representative preference. A service provider, a good supplier, a fleet manager, a logistics provider, a logistics supplier, or a combination thereof, can also benefit by using an AV to help reduce the impact of a shortage of representatives. An AV owner/controller can increase earning potential by using their AV more efficiently. Conveyance clients benefit through shorter wait times, higher quality of a conveyance services, more price transparency, or a combination thereof.

The following general description of an inventive platform and method for securing conveyance services refers to various elements illustrated FIGS. 1-12. Additional details about the different embodiments are provided in the examples in the description that follows.

A conveyance client 1 can be but is not limited to a person, a robot, a machine, or a combination thereof, that can receive a conveyance service. A conveyance client 1 does not necessarily have to be a consumer of a service.

A representative 2 can be but is not limited to a person, a robot, a machine, or a combination thereof, that can analyze or evaluate and then secure a preferred conveyance service request 17. A representative 2 can provide or perform a conveyance service of including but not limited to a person, a good, a thing, an article, an item, a conveyance client 1, or a combination thereof. A representative 2 can input or provide a representative preference 18 used to identify a preferred conveyance service request 17. A representative 2 can provide or perform a conveyance service relating to a service provider 5 operating in a conveyance industry segment. A representative 2 can accept or decline a preferred conveyance service request 17. A representative 2 can perform all or some of a conveyance service in conjunction with an AV 3.

An AV 3 can be for example a self-governing machine, a self-maneuvering machine, or a self-driving machine that can be used to provide or perform a conveyance service of including but not limited to a person, a good, an article, a thing, an item, a conveyance client 1, or a combination thereof. An AV 3 can perform or provide a conveyance service relating to a service provider 5 operating in a conveyance industry segment. An AV 3 can include hardware and/or software alone or in a combination. An AV 3 can be identified as preferred.

An AV owner/controller 4 can be but is not limited to an entity, a business, a person, a robot, a machine, or a combination thereof, that can own or control an AV 3. An AV owner/controller 4 can input or provide a selected preference 19 used to identify a preferred conveyance service request 17. An AV owner/controller 4 can accept or decline a preferred conveyance service request 17. An AV owner/controller 4 can be a service provider 5, a fleet manager, a logistics provider, a logistics supplier, or a combination thereof.

A service provider 5 can be for example an entity or a business that can retain or contract with including but not limited to a representative 2, an AV 3, a good supplier, or a combination thereof. A service provider 5 can facilitate a conveyance service between including but not limited to a representative 2, an AV 3, a good supplier, a conveyance client 1, An AV owner/controller 4, or a combination thereof. A service provider 5 can operate in a conveyance industry segment. A service provider 5 can be An AV owner/controller 4, a good supplier, a fleet manager, a logistics provider, a logistics supplier, or a combination thereof.

An application 6 can be but is not limited to software accessible through a terminal 7. An application 6 can be associated with an AV 3. An application 6 can be a software that can for example facilitate an operation or a function to secure a preferred conveyance service request 17, an AV 3 that can be identified as preferred, or a combination thereof. An application 6 can be for example used to analyze, evaluate, secure, obtain, accept, or decline a preferred conveyance service request 17. An application 6 can display including but not limited to a preferred conveyance service request 17. A representative 2 can input or provide a representative preference 18 into an application 6. An application 6 can display including but not limited to a visual representation 12.

A terminal 7 can be but is not limited to an electronic computing device. A terminal 7 can be associated with an AV 3. A terminal 7 can include but is not limited to a computer processor, a computer readable memory, an input source, a geographical location module, a display, a network interface, or a combination thereof. A terminal 7 can be capable of communicating by way of a link 8. A terminal 7 can be used to access an application 6. A terminal 7 can encompass hardware and/or software alone or in a combination. A terminal 7 can be associated with an AV 3.

A link 8 can be but is not limited to a connection or an association with a software function, a software operation, a software component, a software module, or a combination thereof. A link 8 can be but is not limited to an electronic communication network channel. A link 8 can be a combination of connections between including but not limited to a central server 9, an external server 10, a terminal 7, an application 6, an AV 3, an owner/controller application 11, or a combination thereof. A link 8 can encompass hardware and/or software alone or in a combination.

A central server 9 can be a software and/or a hardware that can for example facilitate an operation or a function to secure a preferred conveyance service request 17, an AV 3 that can be identified as preferred, or a combination thereof, for a representative 2 or an AV 3. A central server 9 can include but is not limited to a computer processor, a computer readable memory, a network interface, or a combination thereof. A central server 9 can connect to or communicate with including but not limited to an external server 10, an application 6, a terminal 7, an owner/controller application 11, an AV 3, or a combination thereof, by way of a link 8. A central server 9 can include or connect to a database. A central server 9 can encompass hardware and/or software alone or in a combination.

An external server 10, can be but is not limited to a source of a conveyance service request 15 in conjunction with corresponding conveyance data, all or some of conveyance data relating to an AV 3, or a combination thereof. An external server 10 can include but is not limited to a computer processor, a computer readable memory, a network interface, or a combination thereof. An external server 10 can connect to or communicate with a central server 9, an application 6, a terminal 7, an owner/controller application 11, an AV 3, or a combination thereof, by way of a link 8. An external server 10 can include or connect to a database. An external server 10 can encompass hardware and/or software alone or in a combination.

An owner/controller application 11 can be for example software appropriate for communicating with but not limited to a central server 9, an external server 10, an AV 3, an application 6, or a combination thereof, by way of a link 8. An owner/controller application 11 can be a software that can for example facilitate an operation or a function to secure a preferred conveyance service request 17, an AV 3 that can be identified as preferred, or a combination thereof. An owner/controller application 11 can be used by An AV owner/controller 4 to input or provide a selected preference 19 that can be used to identify a preferred conveyance service request 17. An owner/controller application 11 can be used to analyze, evaluate, secure, obtain, accept, or decline a preferred conveyance service request 17. An owner/controller application 11 can display a preferred conveyance service request 17 to be accepted or declined. An owner/controller application 11 can display a secured or obtained preferred conveyance service request 17.

A visual representation 12 can be a tool used to assist a representative 2 analyze or evaluate a conveyance service request 15 or a conveyance service request metric on, for example, a geographical map to secure a preferred conveyance service request 17. A visual representation 12 can be displayed in or on an AV 3. A visual representation 12 can be viewed from including but not limited to a perspective, a point of reference, a point of interest, or a combination thereof.

A RAP 13 can for example continuously or repeatedly analyze or evaluate a conveyance service request 15 in substantially real time relating to a representative preference 18 and a substantially real time geographical location of a representative 2 to secure a preferred conveyance service request 17 for a representative 2. A RAP 13 can secure a subsequent or additional preferred conveyance service request 17 after a first preferred conveyance service request 17 is secured or obtained, while a substantially real time geographical location of a representative 2 updates or changes. A RAP 13 can secure a preferred conveyance service request 17 relating to a service provider 5 operating in a conveyance industry segment.

An AVAP 14, automated in whole or in part, can for example continuously or repeatedly analyze or evaluate a conveyance service request 15, all or some of conveyance data relating to AV 3, or a combination thereof, in substantially real time relating to a selected preference 19 and a substantially real time geographical location of an AV 3 to secure a preferred conveyance service request 17 for or with an AV 3, an AV 3 that can be identified as preferred, or a combination thereof. An AVAP 14 can secure a subsequent or additional preferred conveyance service request 17 after a first preferred conveyance service request 17 is secured or obtained, while a substantially real time geographical location of an AV 3 updates or changes. An AVAP 14 can secure a preferred conveyance service request 17 relating to a service provider 5 operating in a conveyance industry segment.

A conveyance service request 15 can be for example a request for transportation of including but not limited to a person, a good, an article, a thing, an item, a conveyance client 1, or a combination thereof, from a geographical location to another geographical location. A conveyance service request 15 can be but is not limited to a request from a conveyance client 1. A conveyance service request 15 can be sourced or provided from an external server 10. A conveyance service request 15 can be sourced or provided by a service provider 5. A conveyance service request 15 can be updated in substantially real time.

A filtered conveyance service request 16 can be for example a conveyance service request 15 that can be filtered by using including but not limited to a representative preference 18, a substantially real time geographical location of a representative 2, or a combination thereof. A filtered conveyance service request 16 can be but is not limited to a conveyance service request 15 that can be filtered by using a selected preference 19, a substantially real time geographical location of an AV 3, or a combination thereof. A filtered conveyance service request 16 can be updated in substantially real time.

A preferred conveyance service request 17 can be for example a filtered conveyance service request 16 that can be identified as preferred by including but not limited to a representative 2, an AV 3, an AV owner/controller 4, a central server 9, an application 6, an owner/controller application 11, or a combination thereof. A preferred conveyance service request 17 can be identified as preferred for example by using a representative preference 18 or a selected preference 19. A preferred conveyance service request 17 can be updated in substantially real time.

A representative preference 18 can be but is not limited to an option selected or provided by a representative 2 that can be used to filter a conveyance service request 15 and identify a preferred conveyance service request 17. A representative preference 18 can be stored or cached on a central server 9, an external server 10, an application 6, or a combination thereof. A representative preference 18 can be inclusive or exclusive for filtering a conveyance service request 15.

A selected preference 19 can be a rule or a parameter that can for example be used to facilitate an operation or a function to secure a preferred conveyance service request 17, an AV 3 that can be identified as preferred, or a combination thereof. A selected preference 19 can be but is not limited to an option selected or provided by An AV owner/controller 4 that can be used to filter a conveyance service request 15 and identify a preferred conveyance service request 17. A selected preference 19 can be stored or cached on a central server 9, an external server 10, an application 6, an owner/controller application 11, or a combination thereof. A selected preference 19 can be inclusive or exclusive for filtering of a conveyance service request 15, all or some of conveyance data relating to an AV 3, or a combination thereof.

Example 1: Representative Automated Platform

In this example, an embodiment of the present invention is described for assisting a representative in a process of securing or obtaining, within the conveyance industry, a preferred conveyance service request relating to a selected preference.

FIG. 1 relates to an exemplary implementation of the inventive scheme as a macro level view of a RAP 13, alternatively referred to herein as a "RAP", which may be automated in whole or in part to assist a representative 2 who wants to provide conveyance services. The conveyance service requests 15 can be sourced from one or more external server 10 and can be transmitted to a central server 9 by way of a link 8. A service provider 5 can be associated with an external server 10. In this example, each service provider 5 is associated with one external server 10, however, a service provider can be associated with multiple external servers. A central server 9 can filter conveyance service requests 15 into filtered conveyance service requests 16 by using a representative preference 18 and the substantially real time geographical location of a representative 2. A central server 9 can calculate the weighted average of a representative preference 18. A central server 9 can sort the filtered conveyance service requests 16 in an order relating to the corresponding weighted averages to identify a preferred conveyance service request 17. A preferred conveyance service request 17 can be identified by a central server 9 from the filtered conveyance service requests 16 that has the highest weighted average. A preferred conveyance service request 17 can be secured or obtained by a central server 9. A secured or obtained preferred conveyance service request 17 can be transmitted from a central server 9 to an application 6 by way of a link 8. An application 6 can operate on a terminal 7. A secured or obtained preferred conveyance service request 17 can be displayed on an application 6. A RAP 13 can analyze or evaluate and then secure a subsequent or additional preferred conveyance service request 17 continuously in substantially real time, while a representative 2 performs a conveyance service relating to a secured or obtained preferred conveyance service request 17 until the process is stopped by a representative 2. A link 8 can be a connection or an association with a software function or a software component relating to an application 6, a terminal 7, a central server 9, an external server 10, or a combination thereof.

Figure 2:
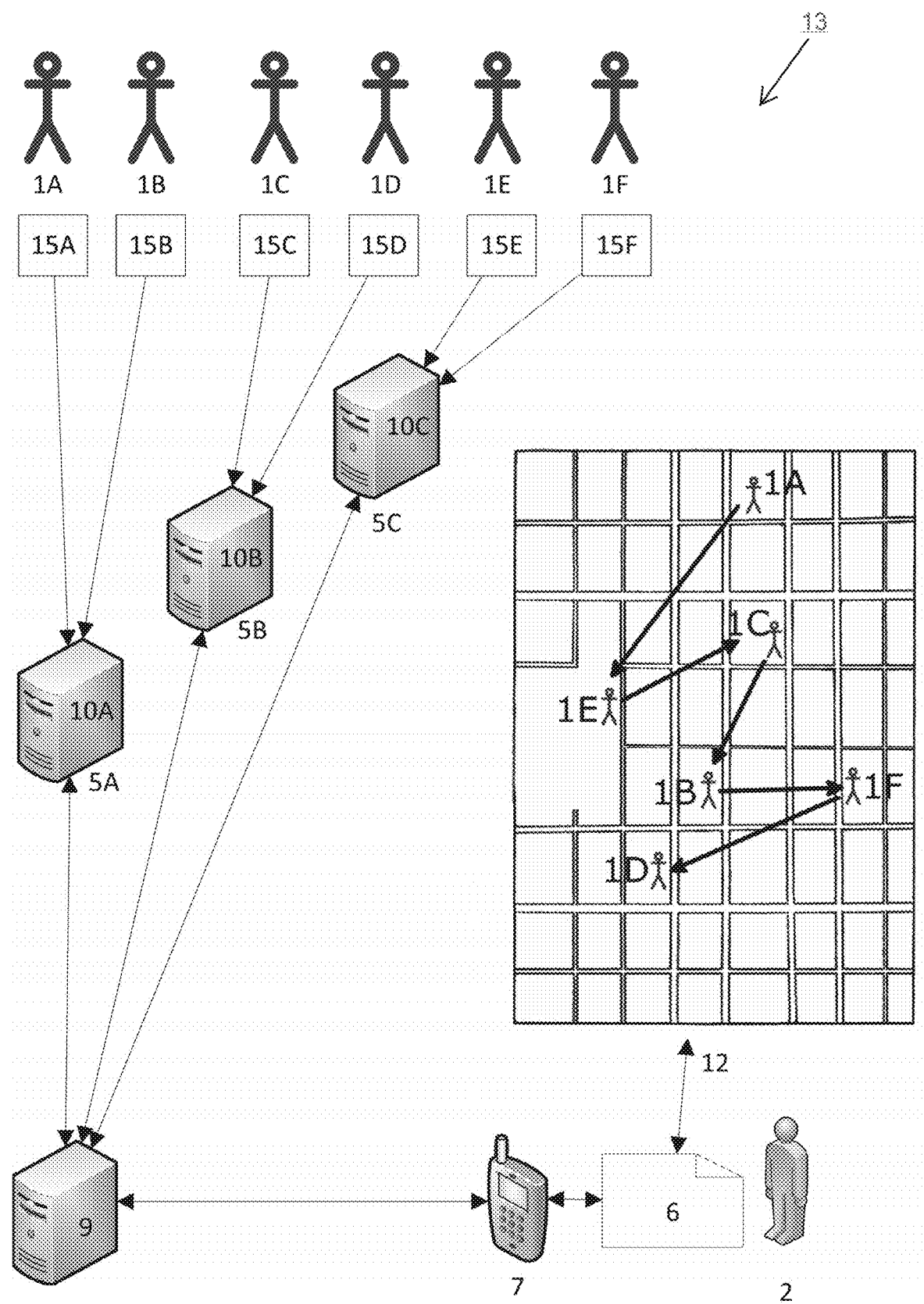
FIG. 2 is a high-level diagram of an automated conveyance service system according to an embodiment of the present invention that utilizes representative preferences

Referring to FIG. 2, an individual conveyance service request 15 can be submitted by each individual conveyance client 1A, 1B, 1C, 1D, 1E, and 1F. An individual conveyance service request 15 corresponds with each individual conveyance client 1 in the figure. Conveyance service requests 15A and 15B are submitted by conveyance clients 1A and 1B to external server 10A associated with service provider 5A. Conveyance service requests 15C and 15D are submitted by conveyance clients 1C and 1D to external server 10B associated with service provider 5B. Conveyance service requests 15E and 15F are submitted by conveyance clients 1E and 1F to external server 10C associated with service provider 5C. Each service provider 5 can have an external server 10.

A central server 9 can receive conveyance service requests 15 and then filter the conveyance service requests 15 into filtered conveyance service requests 16 by using a representative preference 18 and the substantially real time geographical location of a representative 2. A central server 9 can calculate the weighted average of a representative preference 18. A central server 9 can sort the filtered conveyance service requests 16 in an order relating to the corresponding weighted averages to identify a preferred conveyance service request 17. A preferred conveyance service request 17 can be identified by a central server 9 from the filtered conveyance service requests 16 that has the highest weighted average.

A central server 9 can analyze or evaluate conveyance service requests 15 and then secure a preferred conveyance service request 17. A secured or obtained preferred conveyance service request 17 can be transmitted from a central server 9 to an application 6 by way of a link 8. An application 6 can operate on a terminal 7 and can display a secured or obtained preferred conveyance service request 17. A representative 2 can use a visual representation 12 in conjunction with a RAP 13 to visually analyze or evaluate where a conveyance client 1 or a preferred conveyance service request 17 is geographically located. A RAP 13 can analyze or evaluate and then secure a subsequent or additional preferred conveyance service request 17 continuously in substantially real time, while a representative 2 performs a conveyance service relating to a secured or obtained preferred conveyance service request 17, until the process is stopped by a representative 2.

A link can be a connection or an association with a software function or a software component relating to an application 6, a terminal 7, a central server 9, an external server 10, or a combination thereof. A link can be a connection or an association with an application 6, a central server 9, an external server 10, or a combination thereof, on a terminal 7 associated with a representative 2.

Example 2: Representative Automated Platform

A second aspect of the inventive scheme includes a substantially real time method to assist a representative in securing a preferred conveyance service request relating to a representative preference using the RAP.

Figure 3:
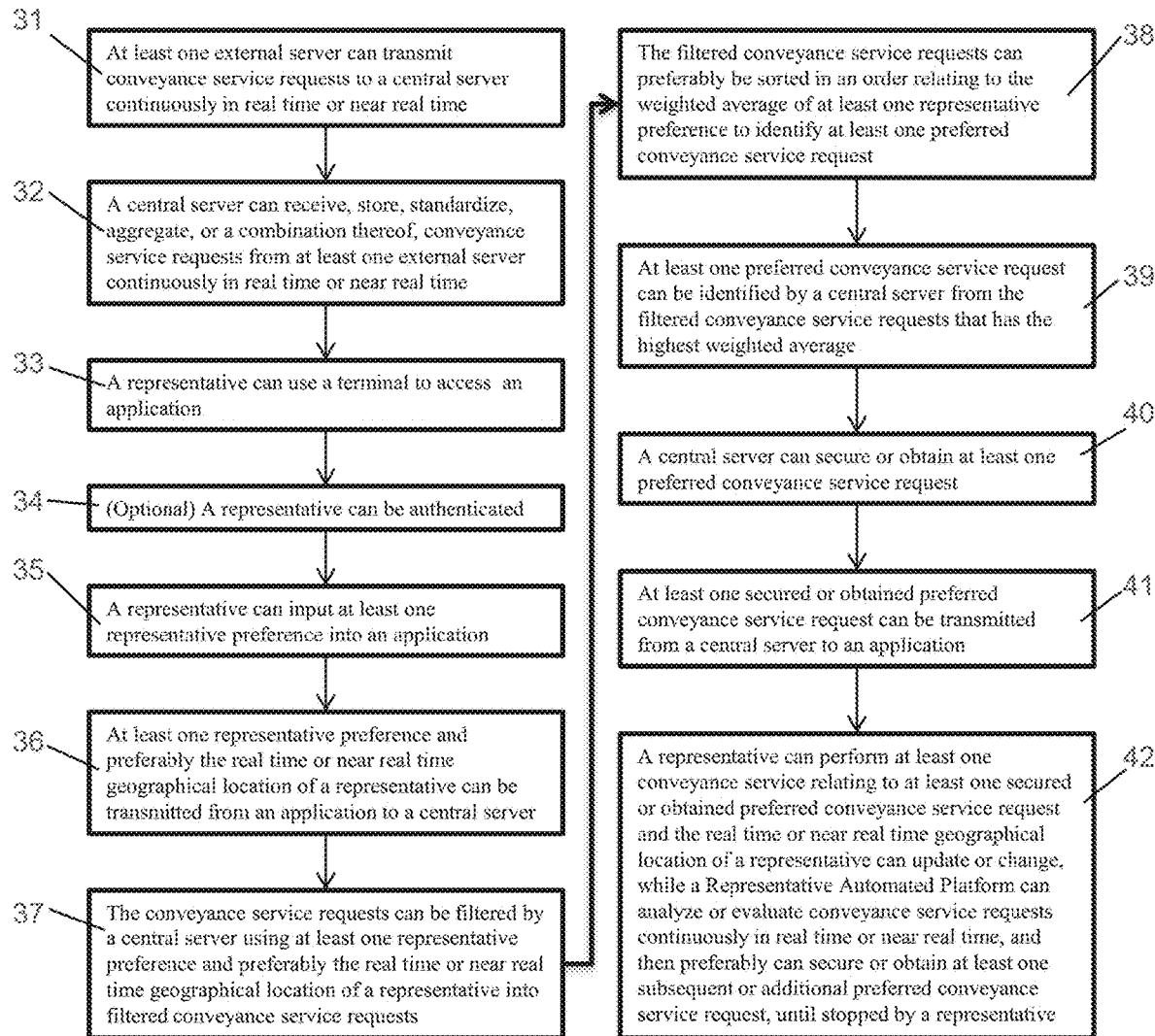
FIG. 3 is a flow diagram of steps according to an embodiment of an automated conveyance system that utilizes representative preferences.

FIG. 3 provides a flowchart of steps of an exemplary method in which a representative 2 can benefit from the present invention. The flowchart shows one approach of how a RAP 13, automated in whole or in part, can assist a representative 2 in analyzing or evaluating and then securing or obtaining a preferred conveyance service request 17. A RAP 13, automated in whole or in part, after securing or obtaining a preferred conveyance service request 17, can continuously analyze or evaluate conveyance service requests 15 in substantially real time and then secure a subsequent or additional preferred conveyance service request 17 while a representative 2 is performing a conveyance service. A link can be a connection or an association with a software function or a software component relating to an application 6, a terminal 7, a central server 9, an external server 10, or a combination thereof.

Referring to FIG. 3, in this embodiment, the following steps can be following in the order indicated or can be performed in a different order:

Step 31. A conveyance service request can be transmitted from an external server to a central server continuously in substantially real time by way of a link Step 32. A conveyance service request can be stored, standardized, aggregated, or a combination thereof, at least once on a central server Step 33. A representative can use a terminal to access an application.

Step 34. A representative can optionally be authenticated.

Step 35. A representative can input or provide a representative preference into an application.

Step 36. A representative preference and a substantially real time geographical location of a representative can be transmitted from an application to a central server by way of a link.

Step 37. A conveyance service request can be filtered by a central server using a representative preference and a substantially real time geographical location of a representative into a filtered conveyance service request.

Step 38. A filtered conveyance service request can be sorted in an order relating to a weighted average of a representative preference to identify a preferred conveyance service request.

Step 39. A preferred conveyance service request can be identified by a central server as a filtered conveyance service request that has the highest weighted average from a filtered conveyance service request.

Step 40. A preferred conveyance service request can be transmitted from a central server to an application by way of a link. Additional operations within this step include that the application can, for example, display a pop-up with details such as price and a service provider of a preferred conveyance service request. A representative can decline a preferred conveyance service request. A new or different preferred conveyance service request can be identified by a central server and the application can display a new or different pop-up with details, such as price and a service provider of a new or different preferred conveyance service request. The representative can accept a new or different preferred conveyance service request, and the central server can secure an accepted preferred conveyance service request.

Step 41. A secured or obtained preferred conveyance service request can be transmitted from a central server to an application by way of a link.

Step 42. A representative can perform a conveyance service relating to a secured or obtained preferred conveyance service request and a substantially real time geographical location of a representative can update or change, while a Representative Automated Platform can analyze or evaluate a conveyance service request continuously in substantially real time, and then can secure a subsequent or additional preferred conveyance service request, until stopped by a representative This example can be applied to any conveyance of goods or services and may involve more than one conveyance industry segment. In this example, representative 2 can be a driver; a conveyance client 1 can be a passenger or recipient of a conveyance service, and preferred conveyance service requests 17 can be a delivery service request, a ride service request, and a food delivery service request.

As illustrated in FIGS. 1 and 2, representative 2 uses the inventive RAP 13 to secure five preferred conveyance service requests 17. Representative 2 can provide conveyance services based on guidance provided by the RAP 13. Individual preferred conveyance service requests 17 can be secured or obtained and then completed in any order as laid out by a RAP 13. The RAP 13 can apply representative preferences 18 to enable only preferred conveyance service requests 17 to be accepted. A central server 9 can continuously receive conveyance service requests 15 from more than one external server 10 by way of a link 8 in substantially real time and can store, standardize, aggregate, and filter conveyance service requests 15 in substantially real time. A central server 9 can sort filtered conveyance service requests 16 in substantially real time, or use another technique, to identify preferred conveyance service requests 17. A representative 2 can access an application 6 using a terminal 7 to gain knowledge of more than one conveyance industry segment, for example.

Once logged into an application 6, representative 2 can input or provide representative preferences 18 into an application 6. Representative 2 can input or provide two representative preferences 18, an efficiency preference and a service provider 5 inclusion preference. An efficiency preference can be, for example, a preference of three or more preferred conveyance service requests 17 within a specific geographical location that can be performed at the same time or during the same trip. A service provider 5 inclusion preference can be, for example, a preference to include three specific service providers 5 that a representative 2 holds accounts with.

Central server 9 can filter out conveyance service requests 15 that do not match or satisfy the two representative preferences 18 for a representative 2. Benefits of representative preferences 18 can be to allow a representative 2 to better meet their criteria in providing conveyance services such as but not limited to higher earning potential, better efficiencies, more suitable conveyance service requests 15, or a combination thereof. The two representative preferences 18 for this example and the substantially real time geographical location of a representative 2 can be transmitted from an application 6 to a central server 9 by way of a link 8.

Central server 9 can filter conveyance service requests 15 into filtered conveyance service requests 16 by comparing to, for example, the two representative preferences 18 and the substantially real time geographical location of a representative 2. The conveyance service requests 15 that match the indicated two representative preferences 18 can be identified as filtered conveyance service requests 16. The conveyance service requests 15 that do not match the indicated two representative preferences 18 can be discarded or ignored as not being filtered conveyance service requests 16. The filtered conveyance service requests 16 can be sorted by a weighted average of, for example, the two representative preferences 18 to identify preferred conveyance service requests 17. The representative preferences 18 can be but are not limited to unequal weights of, for example, 75% efficiency preference and, for example, 25% service provider 5 inclusion preference when calculating a weighted average. A representative 2 can optionally choose for representative preferences 18 to have equal or unequal weights. In this example, a representative 2 can favor an efficiency preference more than working with specific service providers 5.

The filtered conveyance service requests 16 with a highest weighted average can be identified as preferred conveyance service requests 17. For example, a central server 9 can identify preferred conveyance service requests 17 from filtered conveyance service requests 16 by using the highest weighted averages of an efficiency preference and service provider 5 inclusion preference. Additional conveyance service requests 15 can be received and continuously filtered by a central server 9 into additional filtered conveyance service requests 16. Additional filtered conveyance service requests 16 can be sorted by a central server 9 into preferred conveyance service requests 17.

The preferred conveyance service requests 17 in conjunction with corresponding conveyance data can be transmitted from a central server 9 to an application 6 by way of a link 8. An application 6 can, for example, display a pop-up with details such as but not limited to price and a service provider 5 of preferred conveyance service requests 17. A representative 2 can analyze or evaluate preferred conveyance service requests 17 with corresponding conveyance data and can, for example, decline preferred conveyance service requests 17. New preferred conveyance service requests 17 can be identified by a central server 9 and can be, for example, displayed to a representative 2 via another pop-up on an application 6. Representative 2 can accept new preferred conveyance service requests 17 and a central server 9 can secure new accepted preferred conveyance service requests 17 for a representative 2. Secured or obtained preferred conveyance service requests 17 can be transmitted from a central server 9 to an application 6 by way of a link 8.

An application 6, a central server 9, an external server 10, a terminal 7, a link 8, or a combination thereof, can be combined or integrated. A representative 2 can perform a conveyance service and the substantially real time geographical location of a representative 2 can update or change, while RAP 13 can continuously analyze or evaluate conveyance service requests 15 in substantially real time, and then secure subsequent or additional preferred conveyance service requests 17, until stopped by a representative 2.

In this example, RAP 13 can first secure three preferred conveyance service requests 17 relating to an individual good supplier in the good delivery industry segment accepted by a representative 2 (service request #1, #2, and #3).

For example, a representative 2 can begin performing the conveyance services and can pick up all three good deliveries to be conveyed from the good supplier. Before the completion of service requests #1, #2, and #3, RAP 13 can, for example, secure a preferred conveyance service request 17 in the ride-hail industry segment (service request #4).

Representative 2 can begin service request #4 and pick up a conveyance client 1 at a beginning service geographical location then drop off a conveyance client 1 at an ending service geographical location to complete service request #4. After completion of service request #4, RAP 13 can, for example, secure a preferred conveyance service request 17 in the food delivery industry segment (service request #5).

Representative 2 can begin service request #5 and pick up the requested food at the good supplier geographical location then drop off the requested food at an ending service geographical location to complete service request #5. After completion of service request #5, RAP 13 can indicate to a representative 2 to complete service request #1, for example.

Representative 2 can drop off a delivery at an ending service geographical location to complete service request #1. Next, a RAP 13 can indicate to a representative 2 to complete service request #3, for example. Representative 2 can drop off a delivery at an ending service geographical location to complete service request #3. Lastly, RAP 13 can indicate to a representative 2 to complete service request #2, for example. Representative 2 can drop off a delivery at an ending service geographical location to complete service request #2. A representative 2 can then, for example, turn off a RAP 13.

Example 3: Autonomous Vehicle Automated Platform (AVAP)

In this example, an embodiment of the present invention is described for assisting an autonomous vehicle (AV) in a process of securing or obtaining, within the conveyance industry, a preferred conveyance service request relating to a selected preference.

Figure 4:
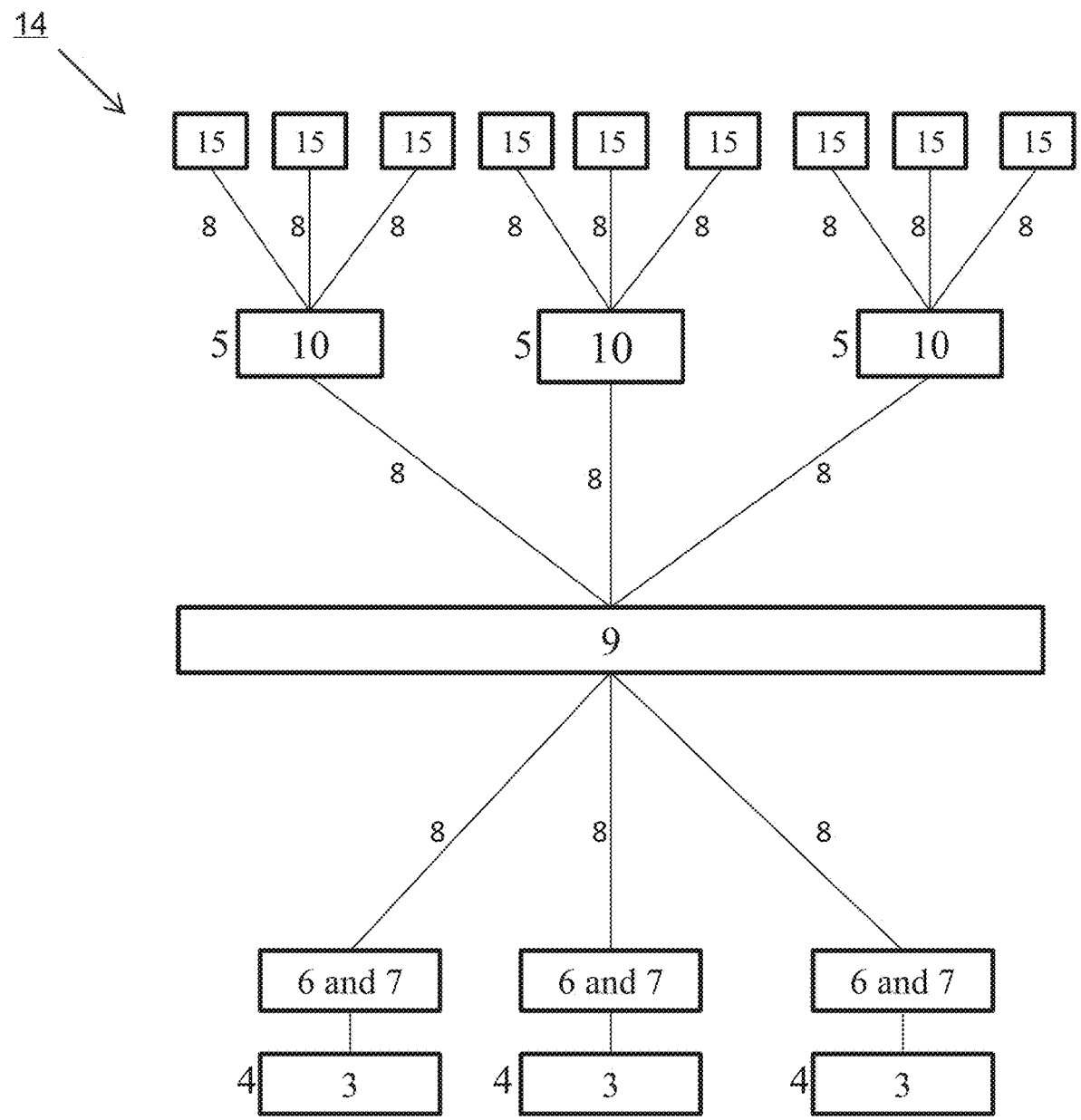
FIG. 4 is a high-level schematic of an automated conveyance platform according to an embodiment for use with Autonomous Vehicles (AVs).

FIG. 4 provides a macro level view of an Autonomous Vehicle Automated Platform (AVAP) 14, automated in whole or in part, where an AV owner/controller 4 can benefit from the present invention. The conveyance service requests 15 can be sourced from an external server 10 and can be transmitted to a central server 9 by way of a link 8. A service provider 5 can be associated with an external server 10. Each service provider 5 is associated with one external server 10. A central server 9 can filter conveyance service requests 15 into filtered conveyance service requests 16 by using a selected preference 19 and the substantially real time geographical location of an AV 3. A central server 9 can calculate the weighted average of a selected preference 19. A central server 9 can sort the filtered conveyance service requests 16 in an order relating to the corresponding weighted averages to identify a preferred conveyance service request 17. A preferred conveyance service request 17 can be identified by a central server 9 from the filtered conveyance service requests 16 that has the highest weighted average. A preferred conveyance service request 17 can be secured or obtained by a central server 9. A secured or obtained preferred conveyance service request 17 can be transmitted from a central server 9 to an application 6 by way of a link 8. An application 6 can operate on a terminal 7 associated with an AV 3. An Autonomous Vehicle Automated Platform 14 can analyze or evaluate and then secure a subsequent or additional preferred conveyance service request 17 continuously in substantially real time, while an AV 3 performs a conveyance service relating to a secured or obtained preferred conveyance service request 17 until the process is stopped by An AV owner/controller 4. A link 8 can be a connection or an association with a software function or a software component relating to an application 6, an owner/controller application, a terminal 7, a central server 9, an external server 10, or a combination thereof.

Figure 5:
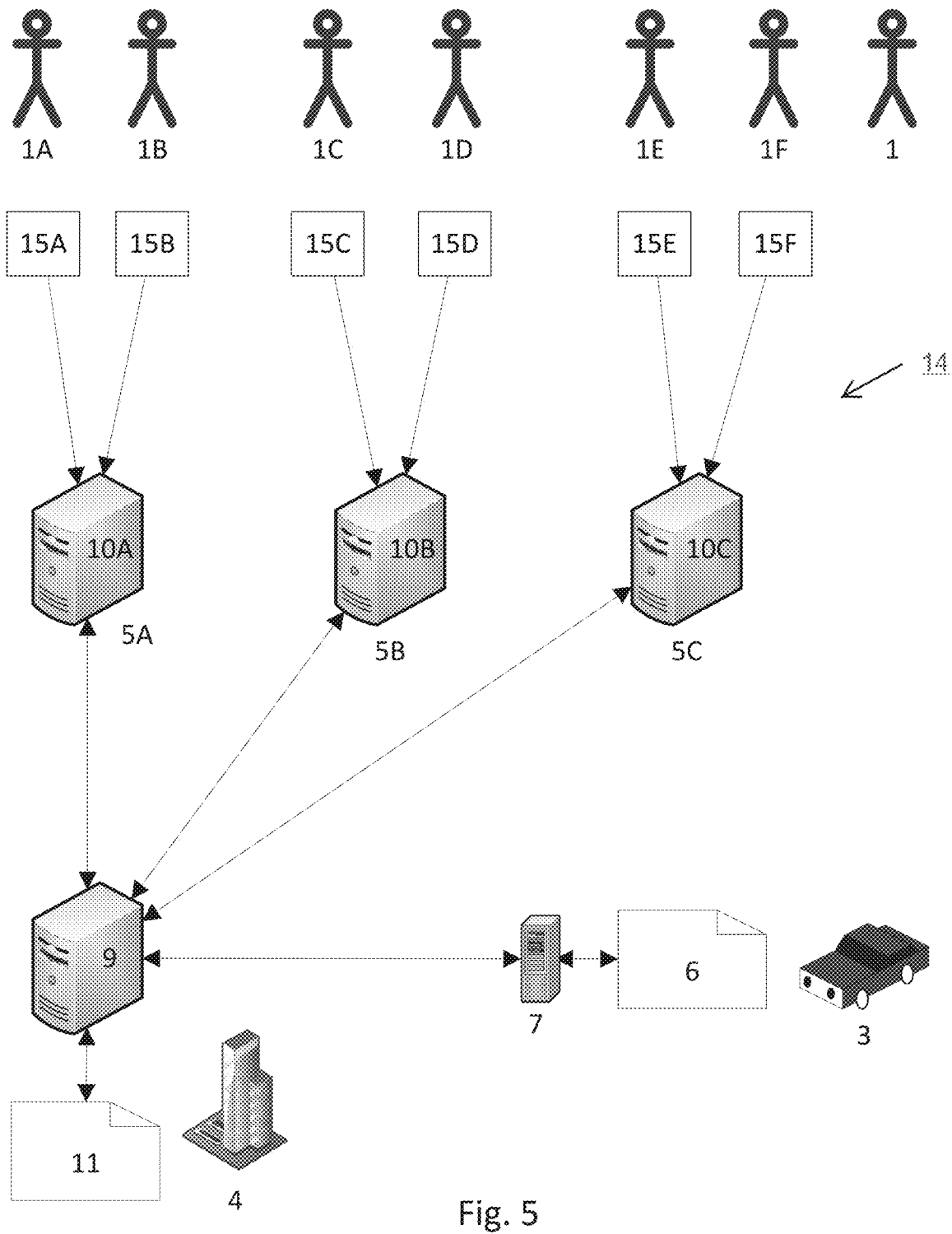
FIG. 5 is a high-level diagram of an automated conveyance platform according to an embodiment for use with AVs.

FIG. 5 provides a macro level view of an exemplary AVAP 14, automated in whole or in part, where an owner or controller of an autonomous vehicle 4 can benefit from the present invention. An individual conveyance service request 15 can be submitted by each individual conveyance client 1A, 1B, 1C, 1D, 1E, and 1F. An individual conveyance service request 15 corresponds with each individual conveyance client 1 in the figure. Conveyance service requests 15A and 15B are submitted by conveyance clients 1A and 1B to external server 10A associated with service provider 5A. Conveyance service requests 15C and 15D are submitted by conveyance clients 1C and 1D to external server 10B associated with service provider 5B. Conveyance service requests 15E and 15F are submitted by conveyance clients 1E and 1F to external server 10C associated with service provider 5C. Each service provider 5 can have an external server 10.

A central server 9 can receive conveyance service requests 15 and then filter the conveyance service requests 15 into filtered conveyance service requests 16 by using a selected preference 19 and the substantially real time geographical location of an autonomous vehicle 3. A central server 9 can calculate the weighted average of a selected preference 19. A central server 9 can sort the filtered conveyance service requests 16 in an order relating to the corresponding weighted averages to identify a preferred conveyance service request 17. A preferred conveyance service request 17 can be identified by a central server 9 from the filtered conveyance service requests 16 that has the highest weighted average.

A preferred conveyance service request 17 can be transmitted from a central server 9 to an owner or controller application 11 by way of a link 8. An AV owner/controller 4 can accept a preferred conveyance service request 17, when an AVAP 14 is automated in part, by using an owner or controller application 11. A central server 9 can then secure a preferred conveyance service request 17. A secured or obtained preferred conveyance service request 17 can be transmitted from a central server 9 to an application 6 by way of a link 8. An application 6 can operate on a terminal 7 associated with an autonomous vehicle 3. An Autonomous Vehicle Automated Platform 14 can analyze or evaluate and then secure a subsequent or additional preferred conveyance service request 17 continuously in substantially real time, while an autonomous vehicle 3 performs a conveyance service relating to a secured or obtained preferred conveyance service request 17, until the process is stopped by an owner or controller of an autonomous vehicle 4.

A link can be a connection or an association with a software function or a software component relating to an application 6, an owner/controller application 11, a terminal 7, a central server 9, an external server 10, or a combination thereof. A link can be a connection or an association with an application 6, an owner/controller application 11, a central server 9, an external server 10, or a combination thereof, on a terminal 7 associated with an AV 3.

Example 4: AV Automated Platform Display

Figure 8:
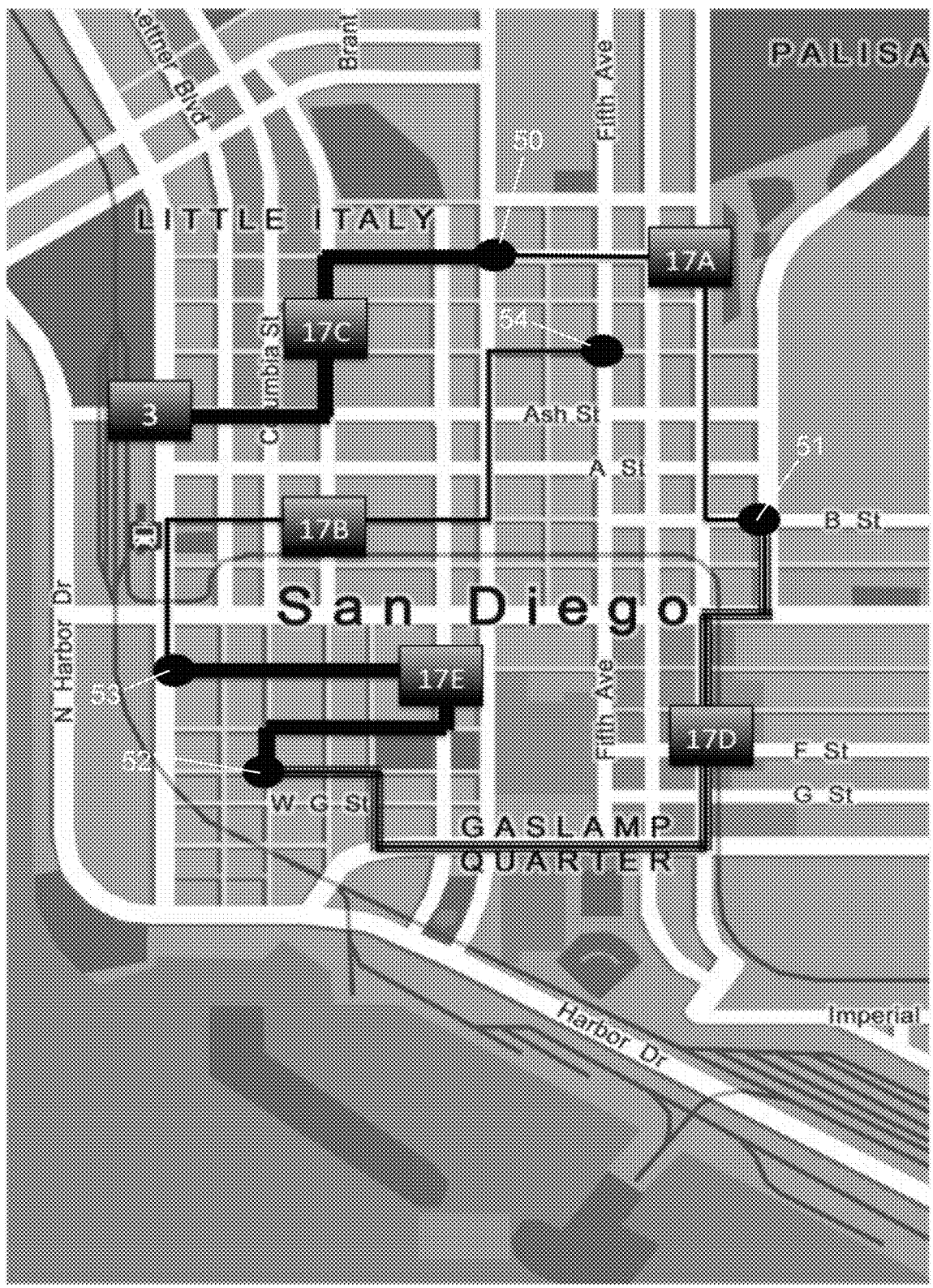
FIG. 8 is a sample display of a dynamic map according to an embodiment of a conveyance platform employing AVs.

FIG. 8 provides a sample visual display within an AVAP 14, automated in whole, being used by an AV 3 to evaluate and then secure, for example, five preferred conveyance service requests 17A-17E. In this example, not all five preferred conveyance service requests 17A-17E were present or available when an AVAP 14 secured a first preferred conveyance service request. After securing a first preferred conveyance service request from 17A-17E, the AVAP 14 can continuously analyze or evaluate conveyance service requests 15 in substantially real time and then secure a subsequent or additional preferred conveyance service request from 17A-17E while an autonomous vehicle 3 is performing the first conveyance service and the substantially real time geographical location of the AV 3 is updated.

The preferred conveyance service requests 17A-17E change continuously and are updated in substantially real time, but for illustration purposes, depicted are all five secured or obtained preferred conveyance service requests 17A-17E. AVAP 14 is not required to secure preferred conveyance service requests 17A, 17B, 17C, 17D, and 17E in any particular order because after a first preferred conveyance service request, in this case, 17C, is secured, an AVAP 14 analyzes or evaluates again or continuously in substantially real time with updated information prior to securing the next preferred conveyance service request from the remaining requests, e.g., 17A, 17B, 17D and 17E.

A first preferred conveyance service request 17C is secured for AV 3 by the AVAP 14. AV 3 picks up the first conveyance client 1 at the beginning service geographical location, displayed as box 17C, and proceeds to the ending service geographical location depicted by the first black circle 50 on the route. Prior to completing the first preferred conveyance service request 17C, the AVAP 14 continuously analyzes or evaluates and then secures a second preferred conveyance service request 17A. AV 3 drops off the first conveyance client 1 at the ending service geographical location and proceeds to the beginning service geographical location for the second preferred conveyance service request 17A, displayed as box 17A.

AV 3 picks up the second conveyance client 1 at the beginning service geographical location and proceeds to the ending service geographical location depicted by the second black circle 51 on the route. Prior to completing the second preferred conveyance service request 17A, AVAP 14 continuously analyzes and then secures a third preferred conveyance service request 17D. AV 3 drops off the second conveyance client 1 at the ending service geographical location and proceeds to the beginning service geographical location for the third preferred conveyance service request 17D, displayed as box 17D.

AV 3 picks up the third conveyance client 1 at the beginning service geographical location and proceeds to the ending service geographical location depicted by the third black circle on the route. Prior to completing the third preferred conveyance service request 17D, AVAP 14 continuously analyzes and then secures a fourth preferred conveyance service request 17E. AV 3 drops off the third conveyance client 1 at the ending service geographical location and proceeds to the beginning service geographical location for the fourth preferred conveyance service request 17E, displayed as box 17E.

An autonomous vehicle 3 picks up the fourth conveyance client 1 at the beginning service geographical location and proceeds to the ending service geographical location depicted by the fourth black circle 53 on the route. Prior to completing the fourth preferred conveyance service request 17E, AVAP 14 continuously analyzes and then secures a fifth preferred conveyance service request 17B. AV 3 drops off the fourth conveyance client 1 at the ending service geographical location and proceeds to the beginning service geographical location for the fifth preferred conveyance service request 17B, displayed as box 17B.

AV 3 picks up the fifth conveyance client 1 at the beginning service geographical location and proceeds to the ending service geographical location depicted by the fifth black circle 54 on the route. An autonomous vehicle 3 drops off the fifth conveyance client 1 at the ending service geographical location. After AV 3 completes the fifth preferred conveyance service request 17B, the AV owner/controller 4 turns off AVAP 14 via an owner/controller application 11.

Example 5: AV Automated Platform

Figure 6:
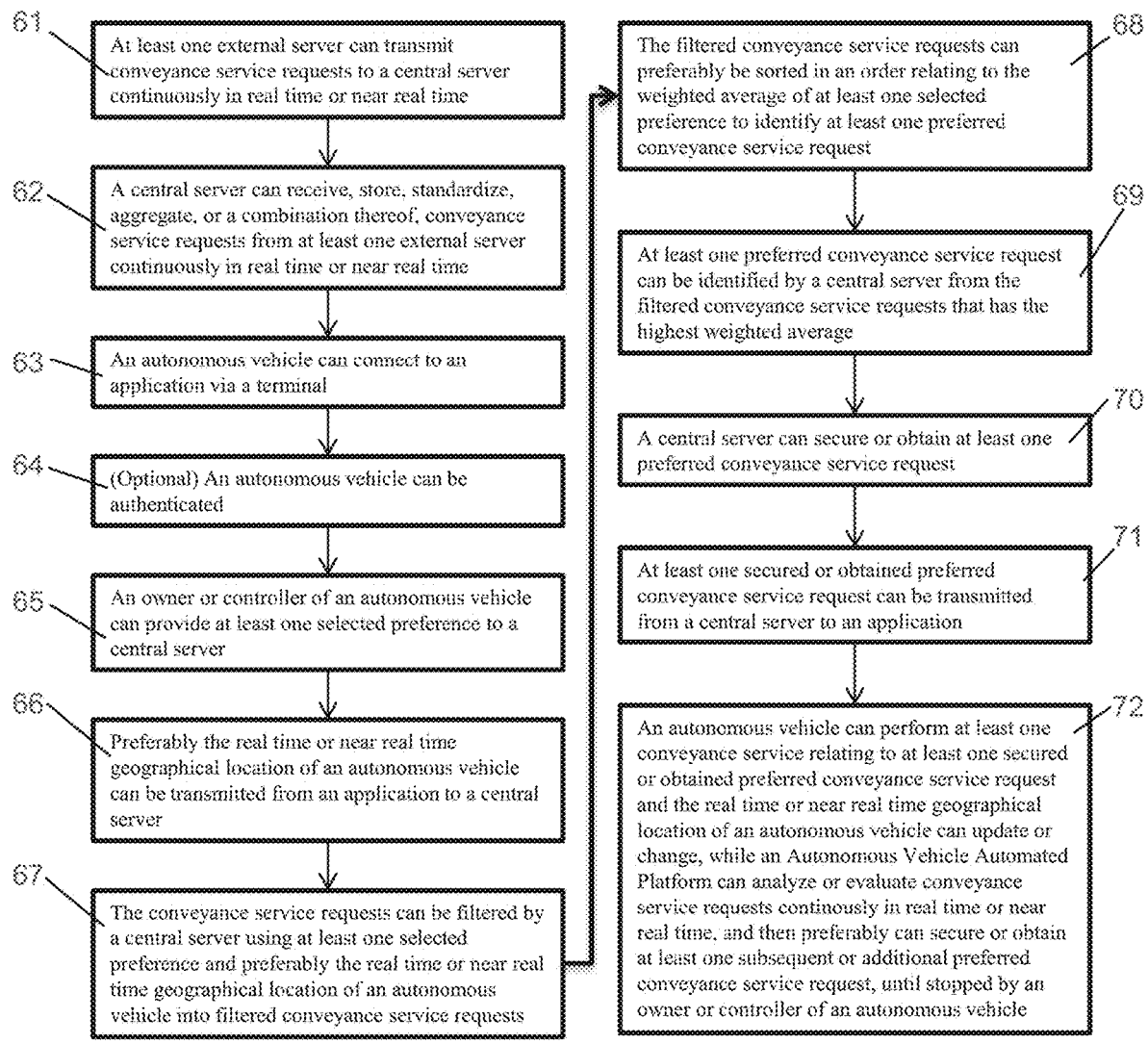
FIG. 6 is a flow diagram of steps according to an embodiment of an automated conveyance platform employing AVs.

FIG. 6 provides a flowchart of steps of an exemplary method in which an AV owner/controller 4 can benefit from the present invention. The flowchart describes steps of how an AVAP 14, automated in whole or in part, can assist an autonomous vehicle 3 or an owner or controller of an autonomous vehicle 4 in analyzing or evaluating and then securing or obtaining a preferred conveyance service request 17. An AVAP 14, automated in whole or in part, after securing or obtaining a preferred conveyance service request 17, can continuously analyze or evaluate conveyance service requests 15 in substantially real time and then secure a subsequent or additional preferred conveyance service request 17 while an autonomous vehicle 3 is performing a conveyance service. A link can be a connection or an association with a software function or a software component relating to an application 6, an owner/controller application, a terminal 7, a central server 9, an external server 10, or a combination thereof.

The steps shown in FIG. 6, can be performed in the order indicated or can be performed in a different order:

Step 61. A conveyance service request can be transmitted from an external server to a central server continuously in substantially real time by way of a link.

Step 62. A conveyance service request can be stored, standardized, aggregated, or a combination thereof, at least once on a central server. An AV owner/controller can input or provide a selected preference into an owner/controller application.

Step 63. An AV can connect to an application via a terminal.

Step 64. An AV can optionally be authenticated.

Step 65. A selected preference can be transmitted from an owner/controller application to a central server by way of a link.

Step 66. A substantially real time geographical location of an AV can be transmitted from an application to a central server by way of a link Step 67. A conveyance service request can be filtered by a central server using a selected preference and a substantially real time geographical location of an AV into a filtered conveyance service request.

Step 68. A filtered conveyance service request can be sorted in an order relating to a weighted average of a selected preference to identify a preferred conveyance service request.

Step 69. A preferred conveyance service request can be identified by a central server as a filtered conveyance service request that has the highest weighted average from a filtered conveyance service request.

Step 70. A central server can secure a preferred conveyance service request.

Step 71. A secured or obtained preferred conveyance service request can be transmitted from a central server to an application by way of a link.

Step 72. An AV can perform a conveyance service relating to a secured or obtained preferred conveyance service request and a substantially real time geographical location of an AV can update or change, while an AV Automated Platform can analyze or evaluate a conveyance service request continuously in substantially real time, and then can secure a subsequent or additional preferred conveyance service request, until stopped by An AV owner/controller While the inventive approach can generally be applied to any conveyance of goods or services, for purposes of illustration, this example relates to an individual service provider 5 that owns or controls a fleet of autonomous vehicles 3 in more than one conveyance industry segment. Even though a fleet of AVs 3 can be controlled or operated in a similar fashion, In this example, the focus is on one autonomous vehicle 3 being controlled or operated by a service provider 5. In this example, a conveyance client 1 can be a passenger or recipient of a conveyance service, an AV owner/controller 4 can be a service provider 5, and preferred conveyance service requests 17 can be a courier service request, a ride service request, and a food delivery service request.

An autonomous vehicle 3 can provide conveyance services based on guidance provided by an AVAP 14. Individual preferred conveyance service requests 17 can be secured or obtained and then completed in any order as laid out by AVAP 14. AVAP 14 can apply selected preferences 19 to enable only preferred conveyance service requests 17 to be accepted. A central server 9 can continuously receive conveyance service requests 15 from, for example, one external server 10 by way of a link 8 in substantially real time and can store, standardize, aggregate, and filter conveyance service requests 15 in substantially real time. A central server 9 can sort filtered conveyance service requests 16 in substantially real time, or use another technique, to identify preferred conveyance service requests 17. An application 6, an owner/controller application 11, a central server 9, an external server 10, a terminal 7, a link 8, or a combination thereof, can be combined or integrated.

An AV owner/controller 4 can input or provide, for example, selected preferences 19 into an owner or controller application 11. In this example, an AV owner/controller 4 can input or provide two selected preferences 19, an industry segment preference and a geographical location preference. An industry segment preference can be, for example, that an autonomous vehicle 3 can provide conveyance services in a courier industry segment, ride-hail industry segment, and food delivery industry segment. A geographical location preference can be, for example, that an autonomous vehicle 3 can provide conveyance services in a certain quadrant or geographical area. A service provider 5 can control where an autonomous vehicle 3 can provide conveyance services across a city or place. For example, a central server 9 can filter out conveyance service requests 15 that do not match or satisfy criteria of the selected preferences 19 for an AV owner/controller 4.

Benefits of selected preferences 19 can be to allow an owner or controller of an autonomous vehicle 4 to better meet their criteria in providing conveyance services such as but not limited to higher earning potential, better efficiencies, greater number of conveyance services provided, more suitable conveyance service requests 15, or a combination thereof. The two selected preferences 19 for this example can be transmitted from an owner or controller application 11 to a central server 9 by way of a link 8. The substantially real time geographical location of an autonomous vehicle 3 can be transmitted from an application 6 to a central server 9 by way of a link 8.

A central server 9 can communicate with an autonomous vehicle 3 by using an application 6 on a terminal 7 associated with an autonomous vehicle 3. An autonomous vehicle 3 can connect to an application 6 via a terminal 7 and can be authenticated.

A central server 9 can filter conveyance service requests 15 into filtered conveyance service requests 16 by comparing to, for example, the two selected preferences 19 and the substantially real time geographical location of an autonomous vehicle 3. The conveyance service requests 15 that match the indicated two selected preferences 19 can be identified as filtered conveyance service requests 16. The conveyance service requests 15 that do not match the indicated two selected preferences 19 can be discarded or ignored as not being filtered conveyance service requests 16. The filtered conveyance service requests 16 can be sorted by a weighted average of, for example, the two selected preferences 19 to identify preferred conveyance service requests 17. An owner or controller of an autonomous vehicle 4 can optionally choose for selected preferences 19 to have equal or unequal weights. The selected preferences 19 can be but are not limited to equal weights, for example, of 50% when calculating a weighted average.

The selected preferences 19 chosen by an AV owner/controller 4 can optionally be given unequal weights, for example but not limited to 70% and 30%. In this non-limiting specific example, an industry segment preference can be given a weight of 70% and can be set to include the ride-hail industry, courier industry, and food delivery industry by an AV owner/controller 4. The filtered conveyance service requests 16 in the ride-hail industry, courier industry, or food delivery industry can be assigned a score of 10 out of 10 by a central server 9. The filtered conveyance service requests 16 not in the ride-hail industry, courier industry, or food delivery industry can be assigned a score of 0 out of 10 by a central server 9. A geographical location preference can be given a weight of 30% and can be set by an AV owner/controller 4 to include filtered conveyance service requests 16 within an area or a perimeter of five miles from the substantially real time geographical location of an autonomous vehicle 3. The filtered conveyance service requests 16 within one mile from the substantially real time geographical location of an autonomous vehicle 3 can be assigned a score of 10 out of 10 by a central server 9. The filtered conveyance service requests 16 within two miles from the substantially real time geographical location of an autonomous vehicle 3 can be assigned a score of 8 out of 10 by a central server 9. The filtered conveyance service requests 16 within three miles from the substantially real time geographical location of an autonomous vehicle 3 can be assigned a score of 6 out of 10 by a central server 9. The filtered conveyance service requests 16 within four miles from the substantially real time geographical location of an autonomous vehicle 3 can be assigned a score of 4 out of 10 by a central server 9. The filtered conveyance service requests 16 within five miles from the substantially real time geographical location of an autonomous vehicle 3 can be assigned a score of 2 out of 10 by a central server 9. The filtered conveyance service requests 16 more than five miles away from the substantially real time geographical location of an autonomous vehicle 3 can be assigned a score of 0 out of 10 by a central server 9. For example, a filtered conveyance service request 16 in the ride-hail industry within three miles from the substantially real time geographical location of an autonomous vehicle 3 can be calculated or determined by a central server 9 as having a weighted average of (70% of 10) plus (30% of 6) that can equal 8.8 based on an industry segment preference and a geographical location preference. A filtered conveyance service request 16 with the highest weighted average of 8.8 in this instance can be identified as a preferred conveyance service request 17 in comparison to other filtered conveyance service requests 16 with lower weighted averages.

A filtered conveyance service request 16 with the highest weighted average can be identified as a preferred conveyance service request 17. For example, a central server 9 can identify a preferred conveyance service request 17 from filtered conveyance service requests 16 by using the highest weighted average of an industry segment preference and a geographical location preference. Additional conveyance service requests 15 can be received and continuously filtered by a central server 9 into additional filtered conveyance service requests 16. Additional filtered conveyance service requests 16 can be sorted by a central server 9 into preferred conveyance service requests 17 when appropriate.

A central server 9 can secure a preferred conveyance service request 17 for an autonomous vehicle 3. A secured or obtained preferred conveyance service request 17 can be transmitted from a central server 9 to an application 6 in an autonomous vehicle 3 by way of a link 8.

An AV 3 can perform a conveyance service and the substantially real time geographical location of an autonomous vehicle 3 can update or change, while an Autonomous Vehicle Automated Platform 14 can analyze or evaluate conveyance service requests 15 continuously in substantially real time, and then secure subsequent or additional preferred conveyance service requests 17, until stopped by an AV owner/controller 4.

In this example, AVAP 14 can be used by an AV 3 to secure, for example, three preferred conveyance service requests 17. AV 3 can perform or provide conveyance services based on guidance provided by AVAP 14. Individual preferred conveyance service requests 17 can be secured or obtain and then completed in any order as laid out by AVAP 14. In this example, AVAP 14 can first accept a preferred conveyance service request 17 in the courier industry segment (service request #1).

For example, AV 3 can begin the conveyance service and can pick up a package to be conveyed. A package can be placed in an autonomous vehicle 3. Before the completion of service request #1, AVAP 14 can, for example, secure an additional preferred conveyance service request 17 in the ride-hail industry segment (service request #2).

AV 3 can begin service request #2 and pick up a conveyance client 1 at a beginning service geographical location then drop off a conveyance client 1 at an ending service geographical location to complete service request #2. After completion of service request #2, AVAP 14 can, for example, secure an additional preferred conveyance service request 17 in the food delivery industry (service request #3).

AV 3 can begin service request #3 and the food to be delivered can be placed in an AV 3 at a good supplier geographical location. An AV 3 can drop off the food delivery at an ending service geographical location to complete service request #3, for example. After completion of service request #3 AVAP 14 can, for example, indicate to an AV 3 to complete service request #1. An AV 3 can drop off the package at an ending service geographical location to complete service request #1, for example. An AV owner/controller 4 can then, for example, turn off AVAP 14.

Example 6: Representative Automated Platform

The following example provides an exemplary use of the RAP by a representative.

Figure 7:
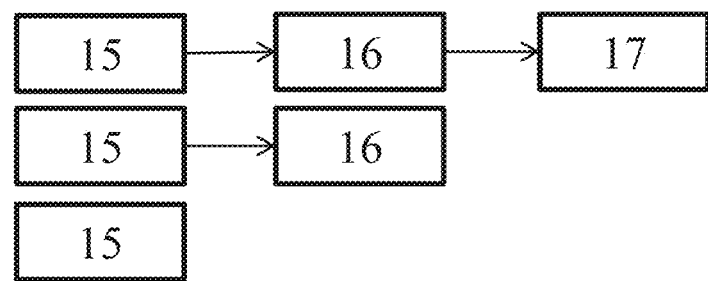
FIG. 7 is a flow diagram of a sample filtering process according to an embodiment of the present invention that utilizes representative preferences.

FIG. 7 provides a flowchart of the transformation of a conveyance service request 15 into a preferred conveyance service request 17. Once a central server 9 receives a conveyance service request 15 from an external server 10, a central server 9 can filter a conveyance service request 15 using a representative preference 18 or a selected preference 19 and the substantially real time geographical location of a representative 2 or an AV 3 into a filtered conveyance service request 16. A central server 9 can calculate the weighted average of a representative preference 18 or a selected preference 19. A central server 9 can sort a filtered conveyance service request 16 in an order relating to the corresponding weighted averages to identify a preferred conveyance service request 17. A preferred conveyance service request 17 can be identified by a central server 9 as a filtered conveyance service request 16 that has the highest weighted average from a filtered conveyance service request 16. Not every conveyance service request 15 can become a filtered conveyance service request 16 and not every filtered conveyance service request 16 can become a preferred conveyance service request 17. A central server 9 can be used by a RAP 13 to analyze and identify a preferred conveyance service request 17. A central server 9 can be used by an Autonomous Vehicle Automated Platform 14 to analyze and identify a preferred conveyance service request 17. A function of a central server 9 or a function of an external server 10 can be performed by an application 6, an owner or controller application 11, or a combination thereof. All or some of conveyance data relating to an AV 3 can be filtered and can be identified as preferred in a same or a similar process to filter and identify a conveyance service request 15 into a preferred conveyance service request 17. A link can be a connection or an association with a software function or a software component relating to an application 6, an owner/controller application, a terminal 7, a central server 9, an external server 10, or a combination thereof.

The present example illustrates how conveyance service requests 15 can become filtered conveyance service requests 16 and then a preferred conveyance service request 17. In this example, a representative 2 can be a driver, a conveyance client 1 can be a passenger or recipient of a conveyance service, and a preferred conveyance service request 17 can be a ride service request. In this example, a representative 2 can use a RAP 13 to secure a preferred conveyance service request 17.

A central server 9 can receive conveyance service requests 15 from an external server 10 continuously or repeatedly in substantially real time. A central server 9 can store, standardize, aggregate, or a combination thereof, conveyance service requests 15 in any order. A representative 2 can input or provide two representative preferences 18, the substantially real time geographical location of a representative, or a combination thereof, to a central server 9.

A central server 9 can compare conveyance service requests 15 to the substantially real time geographical location of a representative 2 and discard or ignore conveyance service requests 15 being further than 10 miles perimeter. A subset of conveyance service requests 15 within 10 miles perimeter that also match or satisfy an industry segment preference can be identified as filtered conveyance service requests 16.

In this non-limiting specific example, an industry segment preference can be given a weight of 40% and can be set to include only the ride-hail industry segment by a representative 2. The filtered conveyance service requests 16 in a ride-hail industry segment can be assigned a score of 10 out of 10 by a central server 9. The filtered conveyance service requests 16 not in a ride-hail industry segment can be assigned a score of 0 out of 10 by a central server 9.

A pricing preference can be given a weight of 60% and can be set by a representative 2 to include filtered conveyance service requests 16 with at least $10.00 revenue per conveyance service performed.

The filtered conveyance service requests 16 with less than $10.00 revenue can be assigned a score of 0 out of 10 by a central server 9. The filtered conveyance service requests 16 with pricing being $10.00-$14.99 revenue can be assigned a score of 4 out of 10 by a central server 9. The filtered conveyance service requests 16 with pricing being $15.00-$19.99 revenue can be assigned a score of 7 out of 10 by a central server 9. The filtered conveyance service requests 16 with pricing of $20.00 or more in revenue can be assigned a score of 10 out of 10 by a central server 9.

For example, a filtered conveyance service request 16 in a ride-hail industry segment with pricing being $17.00 can be calculated or determined by a central server 9 as having a weighted average of (40% of 10) plus (60% of 7) that can equal 8.2 based on an industry segment preference and a pricing preference. A filtered conveyance service request 16 can be sorted in an ascending order relating to a weighted average of 8.2 in this instance and can be identified as a preferred conveyance service request 17 in comparison to other filtered conveyance service requests 16 with lower weighted averages.

A RAP 13 can secure a preferred conveyance service request 17 in a ride-hail industry segment with pricing being $17.00. A representative 2 can perform a conveyance service and the substantially real time geographical location of a representative 2 can update or change, while a RAP 13 can continuously analyze or evaluate conveyance service requests 15 in substantially real time, and then secure a subsequent or additional preferred conveyance service request 17, until stopped by a representative 2. A function of a central server 9 or an external server 10 can be performed by an application 6.

All or some of conveyance data relating to an AV 3 can be filtered and can be identified as preferred in a same or a similar process to filter and identify a conveyance service request 15 into a preferred conveyance service request 17. An application 6, a central server 9, an external server 10, a terminal 7, a link, or a combination thereof, can be combined or integrated.

Example 7: AV Automated Platform

FIGS. 5 and 7 illustrate how conveyance service requests 15 can become filtered conveyance service requests 16 and then a preferred conveyance service request 17. While the present example can be applied to any conveyance of goods or services, for purposes of illustration describes a food delivery industry segment. Here, a conveyance client 1 can be a person that can order food, an autonomous vehicle 3 can perform a conveyance service, an owner or controller of an autonomous vehicle 4 can be a private owner of an autonomous vehicle 3, and a preferred conveyance service request 17 can be a food delivery service request.

A central server 9 can receive conveyance service requests 15 from external servers 10 continuously or repeatedly in substantially real time and can pre-categorize conveyance service requests 15 by zip code. A central server 9 can store, standardize, aggregate, or a combination thereof, conveyance service requests 15 in any order. An owner or controller of an autonomous vehicle 4 can input or provide one selected preference 19 to a central server 9. The substantially real time geographical location of an autonomous vehicle 3 can be transmitted from an application 6 to a central server 9 by way of a link 8.

A central server 9 can compare pre-categorized conveyance service requests 15 to the substantially real time geographical location of an autonomous vehicle 3 and discard or ignore conveyance service requests 15 being in a different zip code area other than an autonomous vehicle 3. A subset of conveyance service requests 15 within the zip code area of an autonomous vehicle 3 that also matches or satisfies an estimated time of arrival preference can be identified as filtered conveyance service requests 16.

In this non-limiting specific example, an estimated time of arrival preference can be given a weight of 100% and can be set by an owner or controller of an autonomous vehicle 4 to less than twenty minutes from an autonomous vehicle 3. The filtered conveyance service requests 16 with an estimated time of arrival of more than twenty minutes can be assigned a score of 10 out of 10 by a central server 9. The filtered conveyance service requests 16 with an estimated time of arrival of less than or equal to twenty minutes can be assigned a score of 0.5 per minute by a central server 9. For example, a filtered conveyance service request 16 with an estimated time of arrival of fourteen minutes can be assigned a score of 7 out of 10 or a filtered conveyance service request 16 with an estimated time of arrival of six minutes can be assigned a score of 3 out of 10.

For example, a filtered conveyance service request 16 in a food delivery industry segment with an estimated time of arrival of four minutes can be calculated or determined by a central server 9 as having a weighted average of (100% of 2) that can equal 2 based on an estimated time of arrival preference. A minimum function can be utilized to identify a filtered conveyance service request 16 having the lowest weighted average in comparison to other filtered conveyance service requests 16 with higher weighted averages as a preferred conveyance service request 17.

An application 6, an owner/controller application 11, a central server 9, an external server 10, a terminal 7, a link, an AV 3, or a combination thereof, can be combined or integrated.

Example 8: AV Automated Platform

Figure 9:
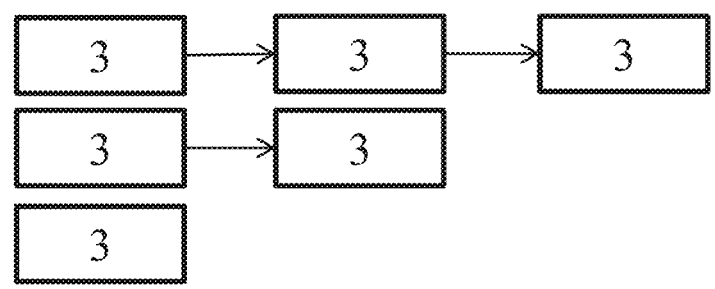
FIG. 9 is a flow diagram of steps according to an embodiment of an automated conveyance platform employing AVs.

FIG. 9 provides a flowchart of the process for identifying or designating an AV 3 as "preferred". The flowchart can be used to display the transformation of all or some of conveyance data relating an AV 3 into all or some of preferred conveyance data relating an AV 3, an AV 3 that can be identified as preferred, or a combination thereof. The left column can represent all or some of conveyance data relating to AV 3, an AV 3, or a combination thereof. The middle column can represent all or some of filtered conveyance data relating an AV 3, an AV 3 that can be filtered, or a combination thereof. The right column can represent all or some of preferred conveyance data relating to AV 3, an AV 3 that can be identified as preferred, or a combination thereof.

Once a central server 9 receives a conveyance service request 15 with corresponding conveyance data, an AV 3 with corresponding conveyance data, all or some of conveyance data relating to AV 3, a substantially real time geographical location of an AV 3, or a combination thereof, from an external server 10, a central server 9 can filter all or some of conveyance data relating an AV 3 using a selected preference 19 and the substantially real time geographical location of an AV 3 into all or some of filtered conveyance data relating to AV 3. A central server 9 can calculate the weighted average of a selected preference 19. A central server 9 can sort all or some of filtered conveyance data relating an AV 3 in an order relating to the corresponding weighted averages to identify an AV 3 that can be identified as preferred, all or some of preferred conveyance data relating an AV 3, or a combination thereof.

All or some of preferred conveyance data relating to AV 3 can be identified by a central server 9 as all or some of filtered conveyance data relating to AV 3 that can have the highest weighted average from all or some of filtered conveyance data relating to AV 3. An AV 3 that can be identified as preferred can be identified by a central server 9 as all or some of filtered conveyance data relating to AV 3 that can have the highest weighted average from all or some of filtered conveyance data relating to AV 3. Not all or some of conveyance data relating an AV 3 can become all or some of filtered conveyance data relating an AV 3 and not all or some of filtered conveyance data relating an AV 3 can become all or some of preferred conveyance data relating an AV 3, an AV 3 that can be identified as preferred, or a combination thereof. Not every AV 3 can become an AV 3 that can be filtered and not every AV 3 that can be filtered can become an AV 3 that can be identified as preferred.

A central server 9 can be used by a RAP 13 to analyze and identify an AV 3 that can be identified as preferred, all or some of preferred conveyance data relating an AV 3, or a combination thereof. A central server 9 can be used by an Autonomous Vehicle Automated Platform to analyze and identify an AV 3 that can be identified as preferred, all or some of preferred conveyance data relating an AV 3, or a combination thereof. A function of a central server 9 or a function of an external server 10 can be performed by an application 6, an owner or controller application 11, an external server 10, or a combination thereof. All or some of conveyance data relating to an AV 3 can be filtered and can be identified as preferred in a same or a similar process to filter and identify a conveyance service request 15 into a preferred conveyance service request 17. A link can be a connection or an association with a software function or a software component relating to an application 6, an owner/controller application, a terminal 7, a central server 9, an external server 10, or a combination thereof.

This example refers generally to FIGS. 4, 5, and 9-12. An individual fleet manager that owns or controls a fleet of autonomous vehicles 3 in a conveyance industry segment can employ the inventive AVAP to avoid delays in delivering conveyance services to a conveyance client 1. In this example, an AVAP can be used by an owner or controller of an autonomous vehicle 4 or a fleet manager to control or operate a fleet of three autonomous vehicles 3A, 3B, and 3C to perform or service all or most conveyance service requests 15. In this example, conveyance clients 1A, 1B, and 1C can be passengers or recipients of the conveyance services, an owner or controller of an autonomous vehicle 4 can be a fleet manager, conveyance service requests 15A, 15B, and 15C can correspond to each respective conveyance client 1A, 1B, and 1C, and a preferred conveyance service request 17C can be the oldest outstanding ride service request. In this example, an owner or controller of an autonomous vehicle 4 or a fleet manager can utilize an Autonomous Vehicle Automated Platform to identify the oldest outstanding conveyance service request 15C as the preferred conveyance service request 17C that needs to be fulfilled or performed as soon as possible by an autonomous vehicle 3 to maintain good consumer sentiment.

An autonomous vehicle 3 can provide conveyance services based on guidance provided by an Autonomous Vehicle Automated Platform. An Autonomous Vehicle Automated Platform can optimize fleet performance and can control or operate a fleet of autonomous vehicles 3A, 3B, and 3C in an efficient manner and maintain good consumer sentiment. In this example, an owner or controller of an autonomous vehicle 4 or a fleet manager can use the selected preferences 19 to identify a preferred conveyance service request 17C, as being the oldest outstanding ride request, for or with an autonomous vehicle 3B that can be identified as preferred. In this example, an Autonomous Vehicle Automated Platform can single out or identify the oldest outstanding conveyance service request 15C as being a preferred conveyance service request 17C. An application 6, an owner/controller application 11, a central server 9, an external server 10, a terminal 7, a link 8, an AV 3, or a combination thereof, can be combined or integrated.

A central server 9 can receive conveyance service requests 15A, 15B, and 15C with corresponding conveyance data, a fleet of autonomous vehicles 3A, 3B, and 3C with corresponding conveyance data, a substantially real time geographical location of a fleet of autonomous vehicles 3A, 3B, and 3C, or a combination thereof, from, for example, two external servers 10 by way of a link 8 in substantially real time. The substantially real time geographical location of a fleet of autonomous vehicles 3A, 3B, and 3C can optionally be transmitted from an application 6 through an external server 10 to a central server 9 by way of a link 8. A central server 9 can store, standardize, aggregate, or a combination thereof, conveyance service requests 15A, 15B, and 15C, conveyance data corresponding to a fleet of autonomous vehicles 3A, 3B, and 3C, a substantially real time geographical location of a fleet of autonomous vehicles 3A, 3B, and 3C, or a combination thereof, in substantially real time. Conveyance service requests 15A, 15B, and 15C can be sent or transmitted from an external server 10 and can be received on a central server 9. A central server 9 can store conveyance service requests 15A, 15B, and 15C in a database and can organize the conveyance service requests 15 in a first database table. In this example, all or some of the conveyance service requests 15 can be stored in a first database table along with exact or specific timestamp of creation. A central server 9 can also store, organize, and analyze conveyance data corresponding to a fleet of autonomous vehicles 3A, 3B, and 3C, a substantially real time geographical location of a fleet of autonomous vehicles 3A, 3B, and 3C, or a combination thereof in a database in a second database table.

An AV owner/controller 4 or a fleet manager can input or provide the selected preferences 19 into an owner or controller application 11, being a website. The selected preferences 19 In this example can be transmitted from an owner or controller application 11, being a website, to a central server 9 by way of a link 8. In this example, an AV owner/controller 4 or a fleet manager can input or provide three selected preferences 19 total and can apply a selected preference 19 to each database table. In this example, the three selected preferences 19 can be an industry segment preference, a distance preference, and an oldest outstanding request preference. In this example, an industry segment preference can be a ride-hail industry segment, a distance preference can identify an autonomous vehicle 3 within a 1 mile perimeter, and an oldest outstanding request preference can identify the oldest outstanding conveyance service request 15 based on the exact or specific timestamp of creation. An AV owner/controller 4 or a fleet manager can utilize any combination of the three selected preferences 19 when filtering and identifying a preferred conveyance service request 17, an autonomous vehicle 3 that can be identified as preferred, or a combination thereof.

As a result of executing a database query, conveyance service requests 15A, 15B, and 15C organized in a first database table can be filtered into a result set of filtered conveyance service requests 16A and 16C by a central server 9. In this non-limiting operation, an industry segment preference, for example, a ride-hail industry segment preference can be applied. Conveyance service requests 15A and 15C being ride-hail conveyance service requests, can match or satisfy the selected preference 19 and can become filtered conveyance service requests 16A and 16C. Conveyance service request 15B can be a food delivery service request, which does not match or satisfy the selected preference 19, and as a result, can get discarded. By applying the oldest outstanding request preference, a central server 9 can sort the filtered conveyance service requests 16A and 16C in ascending or descending order to identify the oldest timestamp or date of creation, and as a result, a filtered conveyance service request 16C can be identified as a preferred conveyance service request 17C. As a result of executing a database query, all or some of conveyance data relating to a fleet of autonomous vehicles 3A, 3B, and 3C organized in a second database table can be filtered into a result set of all or some of filtered conveyance data relating to autonomous vehicles 3A and 3B by a central server 9. In this non-limiting operation, a distance preference, for example, less than 1 mile from a preferred conveyance service request 17C can be applied. All or some of conveyance data relating to a fleet of autonomous vehicles 3A and 3B representing autonomous vehicles 3A and 3B that are located within 1 mile perimeter from a preferred conveyance service request 17C can match or satisfy the selected preference 19 and can become all or some of filtered conveyance data relating to a fleet of autonomous vehicles 3A and 3B. All or some of conveyance data relating to autonomous vehicle 3C representing an autonomous vehicle 3C that can be located further than 1 mile from a preferred conveyance service request 17C does not match or satisfy the selected preference 19, and as a result, can get discarded.

By sorting the remaining all or some of filtered conveyance data relating to a fleet of autonomous vehicles 3A and 3B according to their physical distance from a preferred conveyance service request 17C, a central server 9, can identify all or some of preferred conveyance data relating to an autonomous vehicle 3B or all or some of preferred conveyance data relating to an autonomous vehicle 3B that can be identified as preferred as being within the closest physical distance from a preferred conveyance service request 17C.

After identifying a match between a preferred conveyance service request 17C and an autonomous vehicle 3B that can be identified as preferred, a fleet manager can utilize an Autonomous Vehicle Automated Platform that can automatically secure a preferred conveyance service request 17C for or with an autonomous vehicle 3B and can improve the efficiency and performance of a fleet of autonomous vehicles 3A, 3B, and 3C. In this non limiting example, a fleet manager can maintain good consumer sentiment as the oldest outstanding conveyance service request 15C can be identified as a preferred conveyance service request 17C and can be secured or obtained for or with an autonomous vehicle 3B that can be identified as preferred to be serviced or performed as soon as possible.

Example 9: AV Automated Platform

This example provides an example of an implementation of an embodiment of the inventive platform that benefits an AV owner/controller 4 or a fleet manager. The exemplary steps, described in a particular order in the example, are not limited to the exact order described, but can be varied where appropriate.

Referring to FIGS. 4, 5, and 9-12, AVAP 14 can be used by a fleet manager to control or operate a fleet of autonomous vehicles 3 in more than one conveyance industry segment. The focus here is on two autonomous vehicles 3A and 3B within a fleet that is controlled by a fleet manager. AV 3A operates in a ride-hail industry segment and AV 3B operates in a food delivery industry segment that can be operated or controlled by the same fleet manager or same owner or controller of an autonomous vehicle 4. Conveyance client 1 can be a passenger or recipient of a conveyance service, an owner or controller of an autonomous vehicle 4 can be a fleet manager, and preferred conveyance service requests 17A and 17B can be a ride service request and a food delivery service request respectively. In this example, an Autonomous Vehicle Automated Platform can identify and secure a preferred conveyance service request 17A for the worst performing autonomous vehicle 3A in the ride-hail industry segment first and then can identify and secure a preferred conveyance service request 17B for the worst performing autonomous vehicle 3B in the food delivery industry segment.

An AVAP can optimize fleet performance by controlling or operating a fleet of autonomous vehicles 3 in an efficient manner. An AVAP can manage or control AVs 3 from a single AV 3 perspective, a fleet perspective, an independent third party perspective, or a combination thereof. An AVAP can monitor and single out or pinpoint an AV 3 that is underperforming, due to poor operating performance. In this example, an owner or controller of an autonomous vehicle 4 or a fleet manager can enhance an AV's 3 selected preferences 19 to increase a likelihood of securing or obtaining a preferred conveyance service request 17 for an underperforming AV 3 if so desired. An application 6, an owner/controller application 11, a central server 9, an external server 10, a terminal 7, a link 8, an AV 3, or a combination thereof, can be combined or integrated.

A central server 9 can continuously receive conveyance service requests 15 with corresponding conveyance data, a fleet of autonomous vehicles 3 with corresponding conveyance data, a substantially real time geographical location of a fleet of autonomous vehicles 3, or a combination thereof, from, for example, one external server 10 by way of a link 8 in substantially real time. A central server 9 can store, standardize, aggregate, and filter conveyance service requests 15, conveyance data corresponding to a fleet of autonomous vehicles 3, a substantially real time geographical location of a fleet of autonomous vehicles 3, or a combination thereof, in substantially real time. The substantially real time geographical location of a fleet of AVs 3 can be transmitted from an API on an external server 10 to a central server 9 by way of a link 8.

A central server 9 can categorize or pre-categorize a fleet of autonomous vehicles 3 with corresponding conveyance data in a database. A central server 9 can categorize or pre-categorize conveyance service requests 15 with corresponding conveyance data in a database. In this example, a central server 9 can categorize or pre-categorize a fleet of autonomous vehicles 3 with corresponding conveyance data in a database based on a substantially real time geographical location of a fleet of autonomous vehicles 3. AV 3A with corresponding conveyance data, operating in ride-hail industry segment, can be categorized in first database table and an autonomous vehicle 3B with corresponding conveyance data, operating in food delivery industry segment, can be categorized in second database table. Conveyance service requests 15 from all industry segments can be categorized or pre-categorized in third database table.

A fleet manager can input or provide a selected preference 19 into an owner or controller application 11, being a computer application, that can be communicated with or transmitted to a central server 9 or AVAP by way of a link 8. A fleet manager can use or apply two selected preferences 19 being a longest idle time preference and a ride hail industry segment preference to filter and identify an autonomous vehicle 3A that can be identified as preferred. A fleet manager can also use or apply a selected preference 19 being a geographical location preference or shortest travel time preference to filter and identify a preferred conveyance service request 17A. In this example, an owner or controller of an autonomous vehicle 4 or a fleet manager can input or provide multiple selected preferences 19 and can apply a selected preference 19 to each database. In this example, the AVAP can discover which AV 3 in a ride hail industry segment is waiting the longest time without performing a conveyance service.

As a result of executing a database query, all or some of conveyance data relating to a fleet of AVs 3 organized in first database table can be filtered into a result set of all or some of filtered conveyance data relating to a fleet of autonomous vehicles 3 by a central server 9. All or some of conveyance data relating to a fleet of AVs 3 performing conveyance services in a ride hail industry segment can match or satisfy the selected preference 19 and can become all or some of filtered conveyance data relating to a fleet of autonomous vehicles 3. All or some of filtered conveyance data relating to a fleet of autonomous vehicles 3 can be sorted by idle time and an autonomous vehicle 3 that is waiting the longest time without performing a conveyance service can be identified as the autonomous vehicle 3A that can be identified as preferred. An autonomous vehicle 3 that does not work or operate in the ride-hail industry, can be discarded or ignored and as a result, cannot become an autonomous vehicle 3A that can be identified as preferred. A central server 9 or fleet manager can filter out autonomous vehicles 3 that do not meet or match the two selected preferences 19 and the substantially real time geographical location of a fleet of AVs 3. For example, if AV 3C operates in only the refrigerated freight industry segment due to vehicle requirement restrictions, AV 3C can be filtered out of a database result set.

As a result of executing a database query based on a geographical location preference, conveyance service requests 15 organized in third database table can be filtered and sorted by geographical proximity or travel time from an autonomous vehicle 3A that can be identified as preferred. The conveyance service requests 15 that do not match a selected preference 19 can be discarded or ignored. The filtered conveyance service request 16 with the shortest travel time to an autonomous vehicle 3A that can be identified as preferred, can be identified as a preferred conveyance service request 17A by An Autonomous Vehicle Automated Platform or a central server 9. A preferred conveyance service request 17A can be secured or obtained for or with an autonomous vehicle 3A that can be identified as preferred.

A fleet manager can input or provide a selected preference 19 into an owner or controller application 11, being a computer application, that can be communicated with or transmitted to a central server 9 or AVAP by way of a link 8. A fleet manager can use or apply two selected preferences 19 being a longest idle time preference and a food delivery industry segment preference to filter and identify an autonomous vehicle 3B that can be identified as preferred. A fleet manager can also use or apply a selected preference 19 being geographical location preference or shortest travel time preference to filter and identify a preferred conveyance service request 17B. In this example, an AV owner/controller 4 or a fleet manager can input or provide multiple selected preferences 19 and can apply a selected preference 19 to each database. In this example, an AVAP can discover which AV 3 in a food delivery industry segment is waiting the longest time without performing a conveyance service.

As a result of executing a database query, all or some of conveyance data relating to a fleet of AVs 3 organized in second database table can be filtered into a result set of all or some of filtered conveyance data relating to a fleet of AVs 3 by a central server 9. All or some of conveyance data relating to a fleet of AVs 3 performing conveyance services in a food delivery industry segment can match or satisfy a selected preference 19 and can become all or some of filtered conveyance data relating to a fleet of AVs 3. All or some of filtered conveyance data relating to a fleet of AVs 3 can be sorted by idle time and an autonomous vehicle 3 that can be waiting the longest time without performing a conveyance service can be identified as an autonomous vehicle 3B that can be identified as preferred. A central server 9 or fleet manager can filter out autonomous vehicles 3 that do not meet or match the two selected preferences 19 and the substantially real time geographical location of a fleet of AVs 3. An AV 3 that does not work or operate in the food delivery industry, can be discarded or ignored and cannot become an autonomous vehicle 3B that can be identified as preferred. For example, if autonomous vehicle 3D works or operates in only the biohazard freight industry due to vehicle requirement restrictions, autonomous vehicle 3D can be filtered out of a database result set.

As a result of executing a database query based on a geographical location preference, conveyance service requests 15 organized in third database table can be filtered and sorted by geographical proximity or travel time from AV 3B that can be identified as preferred. The conveyance service requests 15 that do not match a selected preference 19 can be discarded or ignored. The filtered conveyance service request 16 with the closest geographical proximity to an autonomous vehicle 3B that can be identified as preferred, can be identified as a preferred conveyance service request 17B by AVAP or a central server 9. A preferred conveyance service request 17B can be secured or obtained for or with an autonomous vehicle 3B that can be identified as preferred.

Both autonomous vehicle 3A and 3B can perform conveyance services and the substantially real time geographical location of an autonomous vehicle 3A and 3B can update or change, while the AVAP can analyze or evaluate conveyance service requests 15, a fleet of autonomous vehicles 3, conveyance data corresponding to a fleet of autonomous vehicles 3, or a combination thereof, continuously in substantially real time, and then secure subsequent or additional preferred conveyance service requests 17 for or with autonomous vehicles 3A and 3B that can be identified as preferred, until stopped by an owner or controller of an autonomous vehicle 4 or a fleet manager. In this example, a fleet of autonomous vehicles 3 in conjunction with corresponding conveyance data can be filtered and AVs 3A and 3B can be identified as preferred in a same or similar process to filter and identify conveyance service requests 15 into a preferred conveyance service requests 17.

Example 10: AV Automated Platform

This example describes selected features of an exemplary system and method of use of the inventive scheme from which an AV owner/controller 4, a fleet manager, a good supplier, a service provider 5, a logistics provider, a logistics supplier, or a combination thereof, can benefit.

Figure 10:
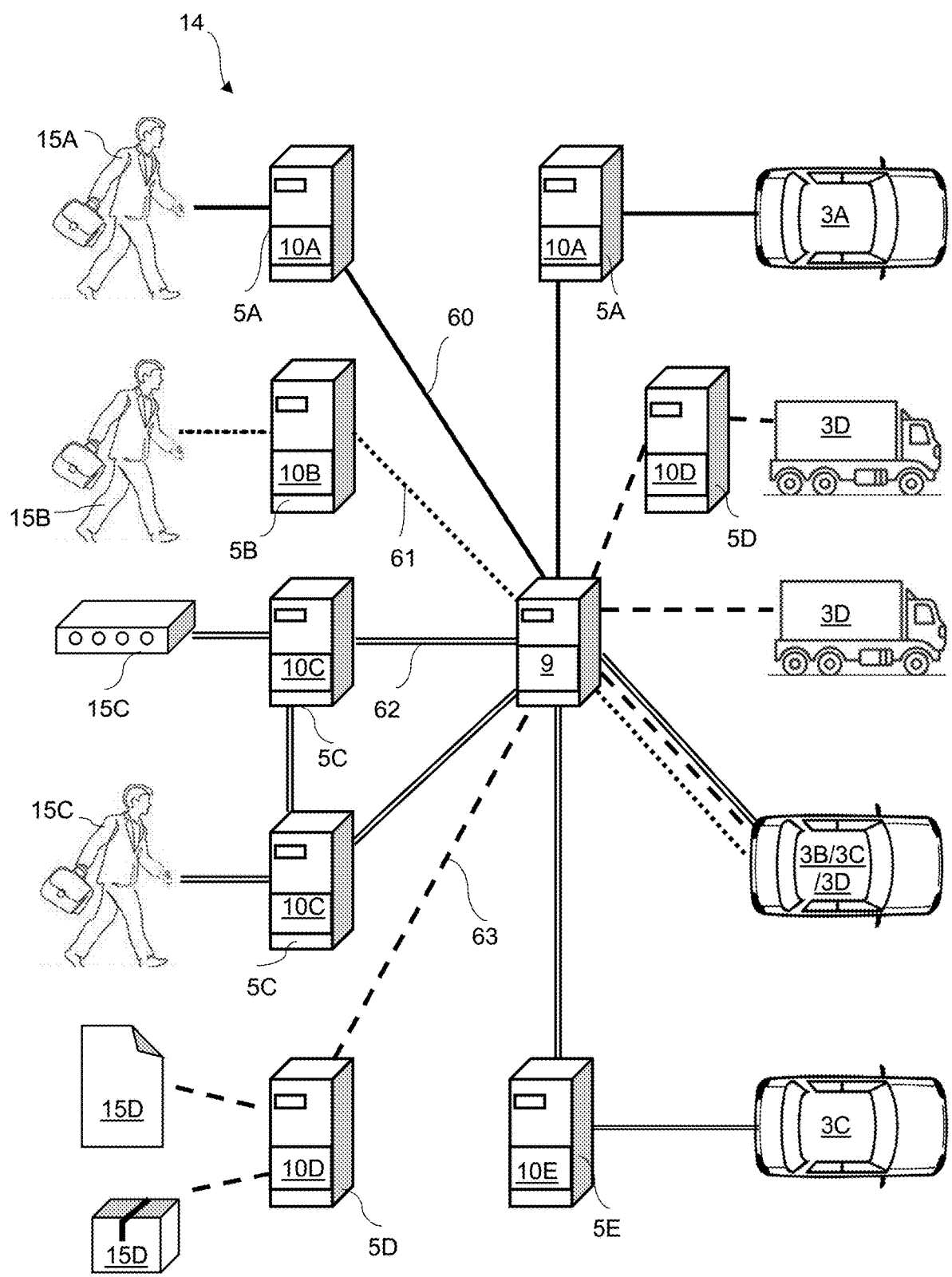
FIG. 10 is a diagram showing an AV automated platform according to embodiment of the present invention.

FIG. 10 illustrates a macro level view of an exemplary AVAP 14, automated in whole or in part, through which an AV owner/controller 4, a fleet manager, a good supplier, a service provider 5, a logistics provider, a logistics supplier, or a combination thereof, can benefit. In this example, at least five different scenarios relating to a service provider 5, can be implemented via the AVAP.

Each individual service provider 5 can be displayed with a corresponding letter A, B, C, D, and E to identify different service providers 5. Each individual service provider 5A, 5B, 5C, and 5D can be displayed for example, with a different or unique line representing direct or indirect connections. A service provider 5E or a fleet manager can manage or operate a fleet of autonomous vehicles 3 for another service provider 5C, which is demonstrated and displayed as having a same double solid line as service provider 5C. Each individual service provider 5 can use or utilize an external server 10 in conjunction with a central server 9.

A conveyance service request 15A can be a ride-hail request submitted to an external server 10A associated with a service provider 5A, as indicated by a single solid line 60. A conveyance service request 15B can be a ride-hail request submitted to an external server 10B associated with a service provider 5B, as indicated by a circular dotted line 61. Conveyance service requests 15C can be a food delivery request and a ride-hail request that can come from two external servers 10C associated with a service provider 5C, as both can be indicated by a double solid line 62. Conveyance service requests 15D can be a courier delivery request and a good delivery request submitted to one external server 10D associated with a service provider 5D or good supplier, as indicated by a dashed line 63. There are no conveyance service requests 15 submitted to external server 10E associated with service provider 5E or fleet manager.

As illustrated, each individual service provider 5 can control, own, operate, or manage a service provider 5 network that can have a different feature or a different variation. Each individual service provider 5 network can be displayed with a different combination of a connection. Each individual service provider 5 network can display a data flow, via a different or unique line, and who each individual service provider 5 can communicate with. A link can be a connection or an association with a software function or a software component relating to an application 6, an owner/controller application, a terminal 7, a central server 9, an external server 10, or a combination thereof.

Figure 11:
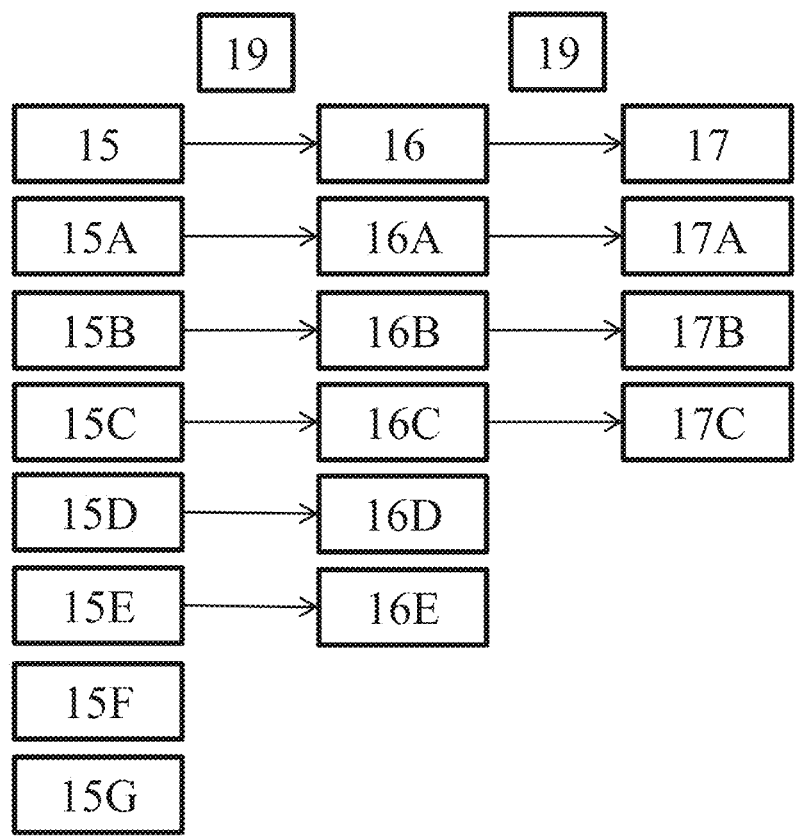
FIG. 11 is a flow diagram of a sample filtering process according to an embodiment of the present invention for an automated AV conveyance platform.

FIG. 11 illustrates an exemplary sequence for transformation of a conveyance service request 15 into a preferred conveyance service request 17. Each individual conveyance service request 15 can be displayed with a corresponding letter A, B, C, D, E, F, and G to identify different service providers associated with each request. A selected preference 19 can be applied to filter conveyance service requests 15 into filtered conveyance service requests 16. The preferred conveyance service requests 17 can be identified from the filtered conveyance service requests 16 by utilizing a selected preference 19. Both conveyance service requests 15F and 15G do not match or satisfy a selected preference 19 and therefore do not become filtered conveyance service requests 16. The filtered conveyance service requests 16, 16A, 16B, 16C, 16D, and 16E can be sorted relating to a selected preference 19 and as a result both filtered conveyance service requests 16D and 16E do not become preferred conveyance service requests 17. The filtered conveyance service requests 16, 16A, 16B, and 16C become preferred conveyance service requests 17, 17A, 17B, and 17C. All or some of conveyance data relating to an AV 3 can be filtered and can be identified as preferred in a same or a similar process to filter and identify a conveyance service request 15 into a preferred conveyance service request 17. A link can be a connection or an association with a software function or a software component relating to an application 6, an owner/controller application, a terminal 7, a central server 9, an external server 10, or a combination thereof.

Figure 12:
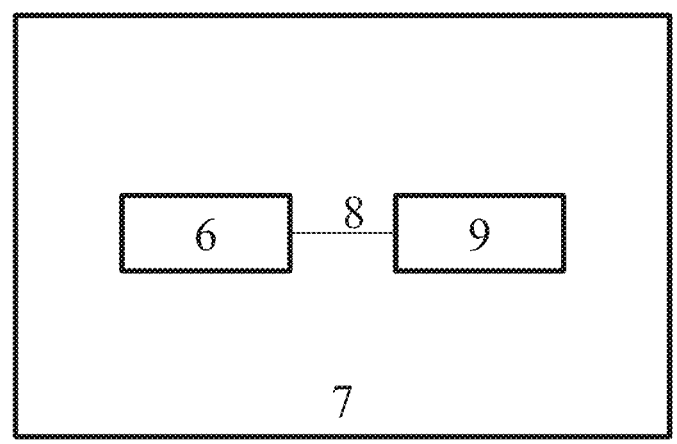
FIG. 12 is a schematic showing a sample integration of hardware and software according to an embodiment of the present invention.

FIG. 12 provides a high-level diagram showing an exemplary integration of hardware and software. An application 6, a central server 9, a terminal 7, a link 8, or a combination thereof, can be combined or integrated. An application 6, a central server 9, a link 8, or a combination thereof, can be combined or integrated on a terminal 7. An application 6, a central server 9, a link 8, or a combination thereof, can be combined or integrated on a terminal 7 associated with an AV. A link 8 can be a connection or an association with a software function or a software component relating to an application 6, an owner/controller application, an AV, a terminal 7, a central server 9, an external server 10, or a combination thereof.

Referring for this example to FIGS. 4, 5, and 9-12, a conveyance service request 15A can be a ride-hail request submitted by a conveyance client 1 to an external server 10A associated with a service provider 5A, as indicated in FIG. 10 by a single solid line 60. A conveyance service request 15B can be a ride-hail request submitted by a conveyance client 1 to an external server 10B associated with a service provider 5B, as indicated by a circular dotted line 61. Conveyance service requests 15C can be a food delivery request and a ride-hail request that can come from two external servers 10C associated with a service provider 5C, as both can be indicated by a double solid line 62. Conveyance service requests 15D can be a courier delivery request and a good delivery request submitted by two conveyance clients 1 to one external server 10D associated with service provider 5D or good supplier, as indicated by a dashes line 63. There are no conveyance service requests 15 submitted to an external server 10E associated with a service provider 5E or fleet manager on FIG. 10.

Each individual service provider 5 can be displayed with a corresponding letter A, B, C, D, and E to identify different service providers 5. Each individual service provider 5 can optionally have or utilize an owner/controller application 11. Each individual service provider 5A, 5B, 5C, and 5D can be displayed for example, with a different or unique line representing direct or indirect lines of connections. A service provider 5E or a fleet manager can manage or operate a fleet of autonomous vehicles 3 for another service provider 5C, which is demonstrated and displayed as having a same double solid line as service provider 5C.

Each service provider 5 can utilize an external server 10 in conjunction with a central server 9. In this example, a ride-hail request, which is illustrated with a human and briefcase icon or visual, can be characterized as a conveyance service request 15A in conjunction with corresponding conveyance data and can be received, managed, operated, or a combination thereof, on or at one external server 10A that can be associated with service provider 5A. In this example, a service provider 5A can utilize one external server 10A in conjunction with a central server 9 to manage a conveyance service request 15A in conjunction with corresponding conveyance data and another or separate external server 10A in conjunction with the central server 9 for managing or controlling an autonomous vehicle 3A, conveyance data relating to an autonomous vehicle 3A, a substantially real time geographical location of an autonomous vehicles 3A, or a combination thereof. In this example, a service provider 5A can utilize two different external servers 10A in conjunction with a central server 9 that can manage an on-demand service provider 5A network and match the supply of an autonomous vehicle 3A for or with the demand for ride-hail requests.

A service provider 5B can be associated with one external server 10B in conjunction with a central server 9, that can receive, store, standardize, aggregate, or a combination thereof, a conveyance service request 15B in conjunction with corresponding conveyance data. In this example, a ride-hail request, which is illustrated with a human and briefcase icon or visual, can be characterized as a conveyance service request 15B in conjunction with corresponding conveyance data and can be received, stored, or managed on or at one external server 10B in conjunction with a central server 9. In this example, a service provider 5B does not own or control one external server 10B in conjunction with a central server 9 to manage or operate an autonomous vehicle 3B, conveyance data relating to an autonomous vehicle 3B, a substantially real time geographical location of an autonomous vehicle 3B, or a combination thereof, but does have direct communication to or with an autonomous vehicle 3B through a central server 9.

Both external servers 10C in conjunction with a central server 9 can utilize a database table for pre-categorizing, categorizing, storing, organizing, or a combination thereof, all or some of conveyance service requests 15C in conjunction with corresponding conveyance data. In this example, a food delivery request, which is illustrated with a pizza box icon or visual, can be characterized as a conveyance service request 15C in conjunction with corresponding conveyance data and can be received, categorized, stored, operated, and/or organized in one external server 10C in conjunction with a central server 9. A ride-hail request, which is illustrated with a human and briefcase icon or visual, can be characterized as a conveyance service request 15C in conjunction with corresponding conveyance data and can be received, categorized, stored, operated, or organized at a separate external server 10C in conjunction with the central server 9. A service provider 5C can utilize two different external servers 10C or at least two different database tables in conjunction with a central server 9 to manage or control all or some of conveyance services based on an individual conveyance industry segment. In this example, a service provider 5C is the only service provider 5 that can configure both external servers 10C communicate directly with each other, as illustrated by a double solid line 62 between both external servers 10C. In this example, a service provider 5C can update or change a selected preference 19 or all or some of conveyance service requests 15C in conjunction with corresponding conveyance data that can be pre-categorized, categorized, stored, and/or organized on one external server 10C, an external server 10C, both external servers 10C, a central server 9, or a combination thereof.

A service provider 5D or good supplier can be associated with two external servers 10D in conjunction with a central server 9, which can store, standardize, and/or aggregate all or some of conveyance service requests 15D in conjunction with corresponding conveyance data, all or some of conveyance data relating to three autonomous vehicles 3D, all or some of the substantially real time geographical location of three autonomous vehicles 3D, or a combination thereof. In this example, a courier delivery request, which is illustrated with a document icon or visual, can be characterized as a conveyance service request 15D in conjunction with corresponding conveyance data and can be standardized, aggregated, organized, and/or managed in one external server 10D in conjunction with a central server 9.

In this example, a good delivery request, which is illustrated with a package icon or visual, can be characterized as a conveyance service request 15D in conjunction with corresponding conveyance data and can be standardized, aggregated, organized, and/or managed on or at the same external server 10D in conjunction with a central server 9. In this example, a service provider 5D or good supplier can utilize one external server 10D or a database table in conjunction with a central server 9 to administer all or some of conveyance services based on two different conveyance industry segments. In this example, a service provider 5D or a good supplier can utilize one external server 10D or a database table in conjunction with a central server 9 to administer all or some of conveyance service requests 15D in conjunction with corresponding conveyance data. In this example, a service provider 5D or a good supplier can utilize another or separate external server 10D or a database table in conjunction with the central server 9 to administer all or some of AVs 3D, all or some of conveyance data relating to three AVs 3D, all or some of the substantially real time geographical location of three AVs 3D, or a combination thereof. In this example, a service provider 5D or a good supplier can utilize two different external servers 10D in conjunction with a central server 9 to manage an on-demand delivery network with one external server 10D facilitating all or some of the supply of autonomous vehicles 3D and the other external server 10D facilitating all or some of the demand for conveyance services.

A service provider 5E or a fleet manager can be associated with one external server 10E in conjunction with a central server 9, which can store, pre-standardize, and/or aggregate conveyance data relating to an AV 3C, a substantially real time geographical location of an autonomous vehicle 3C, or a combination thereof, that can be directly or indirectly sourced or provided by a service provider 5C that can be associated with two external servers 10C in conjunction with a central server 9. In this example, a service provider 5E or a fleet manager can utilize one external server 10E in conjunction with a central server 9 to control or operate an autonomous vehicle 3C, that can only perform all or some of conveyance services for a service provider 5C.

Service provider 5E or a fleet manager can optionally manage or operate an external server 10C directly or indirectly with a central server 9, that can be associated with a service provider 5C. In this example, a ride-hail request, that is illustrated with a human and briefcase icon or visual, can be characterized as a conveyance service request 15C in conjunction with corresponding conveyance data that can be matched and secured or obtained for or with an autonomous vehicle 3C through an external server 10C, a central server 9, one external server 10E, or a combination thereof.

External servers 10A, 10B, 10C, 10D, and 10E, can be connected to a central server 9 by way of a link 8. Each link 8 can be displayed for example, with a different or unique line representing direct or indirect lines of connections between individual network participants contained therein.

A service provider 5A can only perform ride-hail requests because service provider 5A can only operate in the ride-hail industry segment, as evident with no other conveyance service requests 15 associated with a service provider 5A or an external server 10A. A service provider 5A can employ an Autonomous Vehicle Automated Platform that can only utilize an autonomous vehicle 3A to perform a conveyance service relating to a conveyance service request 15A. In this example, a service provider 5A can have their own autonomous vehicle 3A controlled or operated by a central server 9 in conjunction with one external server 10A and can have their own conveyance service request 15A controlled or operated by the central server 9 in conjunction with the other external server 10A.

Service provider 5A can optionally have direct or indirect communication between a central server 9 and an external server 10A by way of a link 8. In this example, a service provider 5A can demonstrate a preferred system, a preferred method, or a combination thereof, when operating a closed-end or private service provider 5 network. A service provider 5 can however utilize an Autonomous Vehicle Automated Platform that can allow or facilitate other autonomous vehicles 3 to perform conveyance services, as evident by an autonomous vehicle 3C being operated or controlled by a service provider 5E for a service provider 5C.

A service provider 5B can only provide ride-hail requests because service provider 5B can only operate in the ride-hail industry segment, as evident with no other conveyance service requests 15 associated with service provider 5B or external server 10B. In this example, a service provider 5B does have their own autonomous vehicle 3B, however, service provider 5B does not have the appropriate software or logistics to perform and execute conveyance services in an efficient manner and requires resources from a logistics provider. In this example, a service provider 5B can access logistics to perform a conveyance service from a service provider 5E or a fleet manager, as a service provider 5E is also a logistics provider and can provide access to service provider's 5E logistics capabilities for a fee. In this example, a service provider 5B can directly contract or use an autonomous vehicle 3B that can be associated with a service provider 5B by employing an AVAP that utilizes logistics from a service provider 5E to perform a ride-hail request relating to a conveyance service request 15B. In this example, an autonomous vehicle 3B can be illustrated as an autonomous vehicle 3B that can be operated, controlled, and/or managed on other service provider 5C and 5D networks, as indicated with the autonomous vehicle 3B having an additional 3C and 3D and displayed in FIG. 10 as AV 3B/3C/3D.

A service provider 5C can perform a ride-hail request and a food delivery request because a service provider 5C can operate in both the ride-hail industry segment and the food delivery industry segment, as evident with no other conveyance service requests 15 associated with a service provider 5C or both external servers 10C. In this example, a service provider 5C is the only service provider 5 that can categorize or pre-categorize all or some of conveyance service requests 15C in conjunction with corresponding conveyance data on two external servers 10C or at least two database tables in conjunction with a central server 9, based on an individual conveyance industry segment, which can improve efficiencies when a service provider 5 has the correct infrastructure, including both hardware and/or software. A service provider 5C can access and utilize an autonomous vehicle 3C through a central server 9 in conjunction with an external server 10C to perform a conveyance service relating to a conveyance service request 15C, being a food delivery request.

Service provider 5C can manage or operate an autonomous vehicle 3C that can be associated with a service provider 5C by employing an AVAP to perform a food delivery request relating to a conveyance service request 15C. In this example, a service provider 5C is the only service provider 5 that can own and lease out AV 3C to a service provider 5E or a fleet manager along with a conveyance service request 15C being the ride-hail request associated with an external server 10C, in return for access to service provider's 5E logistics. In this example, a service provider 5C needs service provider's 5E logistics as a service provider 5C cannot fulfill or execute conveyance services in an efficient manner due to a greater number of conveyance service requests 15 in multiple conveyance industry segments relative to a smaller number of AVs 3. As a result, a service provider 5E or a fleet manager can utilize an AVAP to gain access and operate on service provider's 5C network to perform or execute a conveyance service request 15C relating to a ride-hail request.

A service provider 5D can also be perceived or referred to as a good supplier. A service provider 5D or a good supplier can perform a courier delivery request and a good delivery request because a service provider 5D or a good supplier can operate in both, the courier industry segment and the good delivery industry segment, as evident with no other conveyance service requests 15 associated with a service provider 5D or an external server 10D. In this example, a service provider 5D or a good supplier is the only service provider 5 that can store, standardize, aggregate, manage, or a combination thereof, all or some of conveyance service requests 15D in conjunction with corresponding conveyance data on one external server 10D or a database table in conjunction with a central server 9, and the conveyance services are related to two different conveyance industry segments. In this example, a service provider 5D or good supplier can optionally utilize at least two database tables on a central server 9 in conjunction with one external server 10D relating to each individual conveyance industry segment.

A service provider 5D or good supplier can directly or indirectly access and utilize all or some of the three autonomous vehicles 3D to perform conveyance services relating to both conveyance service requests 15D. In this example, a service provider 5D or a good supplier is the only service provider 5 that controls or operates two different types of autonomous vehicles 3D. In this example, an autonomous vehicle 3D can be connected and controlled through both external servers 10D and a central server 9, which is illustrated with an autonomous truck icon or visual, that can be characterized as all or some of conveyance data relating to an autonomous vehicle 3D, a substantially real time geographical location of an autonomous vehicle 3D, or a combination thereof, on or at one external server 10D. In this example, an autonomous vehicle 3D can be connected and controlled through one external server 10D and a central server 9, which is illustrated with an autonomous truck icon or visual, that can be characterized as all or some of conveyance data relating to AV 3D, a substantially real time geographical location of an autonomous vehicle 3D, or a combination thereof, on the central server 9.

Autonomous vehicle 3D can be connected and controlled through one external server 10D and a central server 9, which is illustrated with an AV 3D icon or visual, that can be characterized as all or some of conveyance data relating to AV 3D, a substantially real time geographical location of an autonomous vehicle 3D, or a combination thereof, on the central server 9.

In this example, a service provider 5D or a good supplier can employ an AVAP to access and utilize the autonomous vehicle 3D with a truck icon through a central server 9 in conjunction with both external servers 10D to perform a conveyance service relating to a conveyance service request 15D, being a courier delivery request. In this example, a service provider 5D or a good supplier can employ an AVAP to access and utilize the autonomous vehicle 3D with a truck icon through a central server 9 in conjunction with one external server 10D to perform a conveyance service relating to a conveyance service request 15D, being a good delivery request. In this example, a service provider 5D or a good supplier can employ an AVAP to utilize and optionally lease time on the remaining autonomous vehicle 3D through a central server 9 in conjunction with an external server 10D to perform a conveyance service, when a service provider 5D or good supplier has excess supply of autonomous vehicles 3 or a lack of conveyance service requests 15.

A service provider 5E can also be perceived or referred to as a fleet manager and as a result, a service provider 5E or fleet manager has optimized vehicle utilization with great efficiency over time and is also a logistics provider. A service provider 5E or a fleet manager can perform a ride-hail request and optionally a food delivery request because a service provider 5E or a fleet manager can operate in both the ride-hail industry segment and the food delivery industry segment because a service provider 5E or fleet manager operates on a service provider's 5C network.

A service provider 5E or a fleet manager is also a logistics provider and can provide logistics capabilities to a service provider 5B for a fee. A service provider 5E or a logistics provider can provide logistics capabilities to a service provider 5C in exchange for operating or controlling an autonomous vehicle 3C and performing a conveyance service request 15C, being the ride-hail request associated with an external server 10C on service provider's 5C network. In this example, a service provider 5E or a fleet manager does not have their own conveyance network of autonomous vehicles 3 or conveyance service requests 15 and can employ an AVAP to access and utilize service provider's 5C network to perform a conveyance service request 15C relating to the ride-hail request. In this example, a service provider 5B and a service provider 5C can employ an AVAP to access and utilize service provider's 5E logistics capabilities to perform conveyance services.

An application 6, an owner/controller application 11, a central server 9, an external server 10, a terminal 7, a link, an AV 3, or a combination thereof, can be combined or integrated.

The following provides further definitions and examples of terms and concepts used herein:

Near Real Time or Substantially Real Time: The following are illustrative, non-limiting examples of "near real time" or "substantially real time" as used in the invention disclosure:

Near real time can pertain to a delay introduced, by automated data processing, between an occurrence of an event and use of the processed data. Near real time can refer to the timeliness of data or information, which can be delayed by the time required for electronic communication and automatic data processing. Near real time can imply no significant delays. Near real time can refer to the highest level of development or state of the art.

Near real time can be in or similar to real time. Near real time can depict an event or a situation as it existed at the current time less the processing time. A function of a system, a method, or a combination thereof, can be performed in substantially real time. A substantially real time geographical location of an AV can be updated in substantially real time. A substantially real time geographical location of a conveyance client can be updated in substantially real time. A substantially real time geographical location of a representative can be updated in substantially real time.

Conveyance Client: The following are illustrative, non-limiting examples of a "conveyance client" as used in the present disclosure:

A conveyance client includes one or more of a person, an entity, a robot, a machine, or a combination thereof, that can evaluate and then secure a preferred conveyance service offering. A conveyance client does not have to be a consumer of a conveyance service. A conveyance client can secure a conveyance service offering for one or more of another person, another machine, another conveyance client, or a combination thereof. A conveyance client or a consumer of a service can receive or request a conveyance service.

A conveyance client can, for example, input or generate a conveyance service request, which can become a filtered conveyance service request and/or a preferred conveyance service request for or with including but not limited to a representative, an AV, An AV owner/controller, a service provider, a good supplier, a fleet manager, a logistics provider, a logistics supplier, or a combination thereof.

To provide a few examples, the conveyance client can be a passenger in the ride-hail industry segment, a one consumer of a food item in the food delivery industry segment, a consumer of freight in the freight delivery industry segment. The conveyance client can analyze or evaluate all or some of conveyance data relating to an AV. The conveyance client can utilize a front end application relating to an AVAP to analyze or evaluate all or some of conveyance data relating to an AV operating for or with an AV owner/controller, a service provider, a good supplier, a fleet manager, a logistics provider, a logistics supplier, or a combination thereof.

Service Provider: The following are illustrative, non-limiting examples of a "service provider" as used in the present disclosure:

A service provider can be an entity or business that can retain or contract with one or more of a representative, an AV, an AV owner/controller, a good supplier, a fleet manager, a logistics provider, a logistics supplier, a map provider, a third party, or a combination thereof, to provide a conveyance service. A service provider can facilitate a conveyance service between a representative, an AV, an AV owner/controller, a good supplier, a fleet manager, a conveyance client, a logistics provider, a logistics supplier, a map provider, a third party, or a combination thereof. A service provider can be an entity or business that can provide or perform a service, a delivery service, or a combination thereof.

A service provider, via one or more external server, can be a source or provider of some or all conveyance service requests with corresponding conveyance data, all or some conveyance service offerings with corresponding conveyance data, or a combination thereof, relating to a conveyance industry segment. A service provider can use a central server, an external server, an application, or a combination thereof, to facilitate and perform a conveyance service.

A service provider can operate in one or more conveyance industry segment. A service provider can operate, own, or control an AV. A service provider can operate, own, or control an AV on behalf of a third party. A service provider can operate, own, or control a network to facilitate a conveyance service in a conveyance industry segment. A service provider can operate, own, or control an AV on a network. A service provider can operate, own, or control an AV on another network. A service provider can operate, own, or control an AV on behalf of a third party on a network.

A service provider can use a RAP to facilitate, operate, or manage a conveyance service. A service provider can use an AVAP to facilitate, operate, or manage a conveyance service. A service provider can use an AVAP to control or operate an AV. A service provider can use an AVAP to secure a preferred conveyance service request for or with an AV that can be identified as preferred, an AV, or a combination thereof.

A service provider can use including but not limited to a central server, an external server, an application, an owner/controller application, or a combination thereof, to facilitate and perform a conveyance service. A service provider can operate in a conveyance industry segment. A service provider can independently control or operate including but not limited to a conveyance network of a representative, an AV, a good supplier, a fleet manager, a logistics provider, a logistics supplier, a conveyance client, An AV owner/controller, or a combination thereof. A service provider can optionally be perceived or referred to as an AV owner/controller. A service provider can utilize Information Technology infrastructure relating to including but not limited to a service provider, a good supplier, an AV owner/controller, a fleet manager, a logistics provider, a logistics supplier, or a combination thereof. A service provider can perform a function in substantially real time being updated or refreshed in the highest level of development or state of the art. A service provider can accept or decline a preferred conveyance service request, an AV that can be identified as preferred, or a combination thereof.

A service provider can be but is not limited to a vehicle that can have or utilize a designated locker that can be a good supplier or an AV. A service provider can be but is not limited to a vehicle that can have or utilize a compartment that can be a mobile good supplier, a mobile autonomous vehicle, a mobile store front, a last mile delivery vehicle, a mobile logistics provider, a mobile logistics supplier, or a combination thereof.

The service provider can be but is not limited to a controller of a rideshare service, a ride-hail service, a car-share service, a taxi service, a shuttle service, a person delivery service, a food delivery service, a good delivery service, an animal delivery service, a medical service and delivery, a courier service, an item delivery service, a freight delivery service, a peer-to-peer conveyance service, a transportation service, or a combination thereof.

A service provider can be perceived or referred to as a representative when utilizing an AV. A service provider can be perceived or referred to as an AV, a fleet of AVs, a representative, a good supplier, a fleet manager, An AV owner/controller, a logistics provider, a logistics supplier, a third party, or a combination thereof.

A service provider can operate in an individual conveyance industry segment. A service provider can be a source or a provider of all or some of a conveyance service request in conjunction with corresponding conveyance data, all or some of conveyance data relating to an AV, all or some of an AV, all or some of a substantially real time geographical location of an AV, all or some of conveyance data relating to a fleet of AVs, all or some of a fleet of AVs, all or some of a substantially real time geographical location of a fleet of AVs, or a combination thereof.

A service provider can have or utilize an API that can provide all or some of a conveyance service request with corresponding conveyance data, all or some of an AV with corresponding conveyance data, all or some of a substantially real time geographical location of an AV, all or some of conveyance data relating to a fleet of AVs, all or some of a substantially real time geographical location of a fleet of AVs, or a combination thereof. A service provider can have or generate all or some of conveyance data.

A service provider can operate or control an AV for or on behalf of an OEM or an auto manufacturer to provide a conveyance service. A service provider can control or operate an AV or a fleet of AVs for or on behalf of an OEM on a network that can operate in a conveyance industry segment. A service provider can utilize an external server for or with a conveyance industry segment. A service provider can lease or sublease an AV. A service provider can lease or sublease a fleet of AVs. A service provider can lease or sublease an AV or a fleet of AVs from a third party.

A service provider can be, for example, an entity or a business that can retain or contract with including but not limited a fleet of AVs to provide a conveyance service. A service provider can retain or contract a fleet of AVs in a conveyance industry segment. A service provider can use an AVAP to control or operate a fleet of AVs.

A service provider can own, operate, or control a fleet of AVs. A service provider can own, operate, or control a fleet of AVs on a network. A service provider can own, operate, or control a fleet of AVs on another network. A service provider can own, operate, or control a fleet of AVs on behalf of a third party on a network.

A service provider can for example utilize an external server that can be a source or a provider of all or some of a fleet of AVs, all or some of conveyance data relating to a fleet of AVs, all or some of a substantially real time geographical location of a fleet of AVs, any data or information related to a fleet of AVs, or a combination thereof, relating to a conveyance industry segment.

A service provider can input or provide a selected preference into an owner/controller application, being a computer program and a selected preference can be transmitted to a central server, an external server, an application, or a combination thereof. A service provider can use an AVAP, a RAP, or a combination thereof, to facilitate, operate, and/or perform a conveyance service in a conveyance industry segment.

Good Supplier: The following are illustrative, non-limiting examples of a "good supplier" as used in the present disclosure:

A good supplier can be an entity or a business that can provide or supply a good, an article, a thing, an item, or a combination thereof, to be conveyed in a conveyance service. A good supplier can be an entity or a business that provides or supplies a service, a delivery service, or a combination thereof. A good supplier can own, operate, or control an AV.

A good supplier can be an entity or a business that can retain or contract with one or more of a representative, an AV, an AV owner/controller, a service provider, a fleet manager, a logistics provider, a logistics supplier, a map provider, a third party, or a combination thereof, to provide a conveyance service. A good supplier can facilitate a conveyance service between one or more of a representative, an AV, an AV owner/controller, a service provider, a fleet manager, a logistics provider, a logistics supplier, a conveyance client, a map provider, a third party, or a combination thereof.

A good supplier can utilize an external server that can be a source or a provider of a conveyance service request with corresponding conveyance data, a conveyance service offering with corresponding conveyance data, or a combination thereof, relating to a conveyance industry segment. A good supplier can use one or more of a central server, an external server, an application, or a combination thereof, to facilitate and perform a conveyance service.

A good supplier can operate, own, or control an AV. A good supplier can operate, own, or control an AV on behalf of a third party. A good supplier can operate, own, or control a network to facilitate a conveyance service in a conveyance industry segment. A good supplier can operate, own, or control an AV on a network. A good supplier can operate, own, or control an AV on another network. A good supplier can operate, own, or control an AV on behalf of a third party on a network.

A good supplier can use a RAP to facilitate, operate, or manage a conveyance service. A good supplier can use an AVAP to facilitate, operate, or manage a conveyance service. A good supplier can use an AVAP to control or operate an AV. A good supplier can use an AVAP to secure a preferred conveyance service request for or with an AV that can be identified as preferred, an AV, or a combination thereof.

A good supplier can use including but not limited to a central server, an external server, an application, an owner/controller application, or a combination thereof, to facilitate and perform a conveyance service. A good supplier can operate in a conveyance industry segment. A good supplier can independently control or operate including but not limited to a conveyance network of a representative, an AV, a service provider, a fleet manager, a logistics provider, a logistics supplier, a conveyance client, an AV owner/controller, or a combination thereof. A good supplier can optionally be perceived or referred to as an AV owner/controller. A good supplier can utilize Information Technology infrastructure relating to including but not limited to a good supplier, a service provider, An AV owner/controller, a fleet manager, a logistics provider, a logistics supplier, or a combination thereof.

A good supplier can operate for or with a service provider. A good supplier can accept or decline a preferred conveyance service request, an AV that can be identified as preferred, or a combination thereof. A good supplier can perform a function in substantially real time being updated or refreshed in the highest level of development or state of the art. A good supplier can accept or decline a preferred conveyance service request.

A good supplier can be but is not limited to a vehicle that can have or utilize a designated locker that can be a service provider or an AV. A good supplier can be but is not limited to a vehicle that can have or utilize a compartment that can be a mobile service provider, a mobile autonomous vehicle, a mobile store front, a last mile delivery vehicle, a mobile logistics provider, a mobile logistics supplier, or a combination thereof.

A good supplier can be but is not limited to a food delivery service controller, a good delivery service controller, an animal delivery service controller, a medical service and delivery controller, a courier service controller, an item delivery service controller, a freight delivery service controller, a peer-to-peer conveyance service controller, a delivery service controller, a transportation service controller, or a combination thereof.

A good supplier can be perceived or referred to as a service provider. A good supplier can be perceived or referred to as an AV, a fleet of AVs, a representative, a service provider, a fleet manager, an AV owner/controller, a logistics provider, a logistics supplier, or a combination thereof.

A good supplier can be a food truck. A good supplier can be an entity that produces or supplies freight. A good supplier can operate in an individual conveyance industry segment. A good supplier can be a source or a provider of a conveyance service request. A good supplier can provide or perform a conveyance service relating to a food item.

A good supplier can operate for or on behalf of an individual service provider. A good supplier can be a source or a provider of all or some of a conveyance service request in conjunction with corresponding conveyance data, all or some of conveyance data relating to an AV, all or some of an AV, all or some of a substantially real time geographical location of an AV, all or some of conveyance data relating to a fleet of AVs, all or some of a fleet of AVs, all or some of a substantially real time geographical location of a fleet of AVs, or a combination thereof. A good supplier can have or generate all or some of conveyance data.

A good supplier can have or utilize an API that can provide all or some of a conveyance service request with corresponding conveyance data, all or some of an AV with corresponding conveyance data, all or some of a substantially real time geographical location of an AV, all or some of conveyance data relating to a fleet of AVs, all or some of a substantially real time geographical location of a fleet of AVs, or a combination thereof.

A good supplier can operate or control an AV for or on behalf of an OEM or an auto manufacturer to provide a conveyance service. A good supplier can control or operate an AV or a fleet of AVs for or on behalf of an OEM on a network that can operate in a conveyance industry segment. A good supplier can utilize an external server for a conveyance industry segment. A good supplier can lease or sublease an AV. A good supplier can lease or sublease a fleet of AVs. A good supplier can lease or sublease an AV or a fleet of AVs from a third party.

A good supplier can be for example an entity or a business that can retain or contract with including but not limited a fleet of AVs to provide a conveyance service. A good supplier can retain or contract a fleet of AVs in a conveyance industry segment. A good supplier can use an AVAP to control or operate a fleet of AVs.

A good supplier can own, operate, or control a fleet of AVs. A good supplier can own, operate, or control a fleet of AVs on a network. A good supplier can own, operate, or control a fleet of AVs on another network. A good supplier can own, operate, or control a fleet of AVs on behalf of a third party on a network.

A good supplier can for example utilize an external server that can be a source or a provider of all or some of a fleet of AVs, all or some of conveyance data relating to a fleet of AVs, all or some of a substantially real time geographical location of a fleet of AVs, any data or information related to a fleet of AVs, or a combination thereof, relating to a conveyance industry segment.

A good supplier can input or provide a selected preference into an owner/controller application, being a website and a selected preference can be transmitted to a central server, an external server, an application, or a combination thereof. A good supplier can use an AVAP Automated Platform, a RAP, or a combination thereof, to facilitate, operate, and/or perform a conveyance service in a conveyance industry segment.

Representative: The following are illustrative, non-limiting examples of a "representative" as used in the present disclosure:

A representative can be a person, an entity, a robot, or a machine, that can secure a preferred conveyance service request, a filtered conveyance service request, a conveyance service request, or a combination thereof. A representative can provide or perform a conveyance service of one or more of a person, a good, an article, a thing, an item, a conveyance client, or a combination thereof. A representative can be retained by or contracted with a service provider, a good supplier, an AV owner/controller, a fleet manager, a logistics provider, a logistics supplier, or a combination thereof. A representative can be an entity or a person that can provide or perform a service, a delivery service, or a combination thereof. A representative can own, operate, or control an AV.

A representative can, at any time, sign on and/or sign off of one or more of a service provider network, an AV owner/controller, a fleet manager network, a logistics provider network, a logistics supplier network, an application, a central server, an external server, or a combination thereof. A representative can sign in to one or more of a service provider network, an owner/controller of an AV network, a fleet manager network, a logistics provider network, a logistics supplier network, a central server, an external server, or a combination thereof. Once a beginning service geographical location, an ending service geographical location, pricing information, or a combination thereof, is known, a conveyance service offering relating to a representative can be generated.

A representative can input or provide a representative preference to be used to filter a conveyance service request. A representative can input or provide a representative preference used to identify one or more of a preferred conveyance service request, a filtered conveyance service request, or a combination thereof.

A representative can use an application to access a service provider network, a good supplier network, an owner/controller of an AV network, a fleet manager network, a logistics provider network, a logistics supplier network, or a combination thereof, via including a terminal, a central server, an external server, an application, or a combination thereof, to facilitate a conveyance service. A representative can provide a conveyance service in a conveyance industry segment. A representative can provide a conveyance service for a service provider, a good supplier, an AV owner/controller, a fleet manager, a logistics provider, a logistics supplier, or a combination thereof. A representative can use Information Technology infrastructure relating to one or more of a service provider, a good supplier, an AV owner/controller, a fleet manager, a logistics provider, a logistics supplier, or a combination thereof. A representative can perform a function in substantially real time being updated or refreshed in the highest level of development or state of the art.

A representative can secure a filtered conveyance service request other than a preferred conveyance service request. A representative can secure a preferred conveyance service request using an application, a central server, an external server, or a combination thereof. A representative can use a visual representation such as a dynamic map, a heat map, or a combination thereof, to evaluate and then secure a preferred conveyance service request.

A representative can be perceived or referred to as a service provider when utilizing an AV. A representative can be perceived or referred to as an AV owner/controller when utilizing an AV. A representative can be perceived or referred to as an AV, an AV owner/controller, a service provider, a good supplier, a fleet manager, a logistics provider, a logistics supplier, a third party, or a combination thereof. A representative can use an AV to perform a conveyance service. A representative can be perceived or referred to as a good supplier when utilizing an AV. A representative can use a scooter or a bicycle.

A representative can be an independent third party. A representative can be an independent contractor. In the ride-hail/ride-share industry segment, a representative can be a driver. In the food delivery industry segment, a representative can be a driver picking up a food item and dropping a food item off to a conveyance client. In the courier industry segment, a representative can be a person picking up and dropping off a good, a thing, an article, or a combination thereof. A representative can provide a conveyance service in an individual conveyance industry segment. A representative can provide a conveyance service for an individual service provider.

A representative can utilize or perform a function of a visual representation the same or similar as a conveyance client. A representative can be managed or operated with an AV or a fleet of AVs to perform a conveyance service. A service provider, a fleet manager, a logistics provider, or a logistics supplier can use a representative and an AV to perform a conveyance service in a conveyance industry segment. A representative can have or generate all or some of conveyance data.

A representative can perform all or some of a conveyance service. A representative can perform all or some of a conveyance service in conjunction with an AV. A representative can perform part of a conveyance service and an AV can perform another part of a conveyance service. A representative can perform part of a conveyance service during a waypoint and an AV can perform another part of a conveyance service.

A representative can pick up food and put the food in an AV to be delivered. A representative can order food and put the food in an AV to be delivered. A representative can put food in an AV, such as a drone, to be delivered. A representative can put food in an AV, such as an autonomous ground vehicle to be delivered. A representative can be perceived as or similar to a scooter, a scooter service, a bicycle, or a bicycle service.

A representative can use a RAP, an AVAP, or a combination thereof, to facilitate, operate, and/or perform a conveyance service in a conveyance industry segment.

Autonomous Vehicle (AV): An AV can be but is not limited to a machine, a robot, or a car that performs a conveyance service. An AV can be perceived as an entity or a business that can for example provide or perform a service, a delivery service, or a combination thereof. An AV can be for example a self-governing machine, a self-maneuvering machine, or a self-driving machine that can be used to convey or transport including but not limited to a person, a good, a thing, an article, an item, a conveyance client, or a combination thereof, from a geographical location to another geographical location.

When an AV is considered, an AV that can be filtered, an AV that can be identified as preferred, or a combination thereof, can also be considered. When all or some of a substantially real time geographical location of an AV is considered, all or some of a substantially real time geographical location of an AV that can be filtered, all or some of a substantially real time geographical location of an AV that can be identified as preferred, or a combination thereof, can also be considered.

An AV can communicate with an AV owner/controller, a service provider, a good supplier, a fleet manager, a logistics provider, a logistics supplier, a conveyance client, a representative, or a combination thereof, using a link between a central server, an external server, an owner/controller application, an application, or a combination thereof.

An AV can sign in to including but not limited to a service provider network, an AV owner/controller network, a good supplier network, a fleet manager network, a logistics provider network, a logistics supplier network, a central server, an application, an external server, an owner/controller application, or a combination thereof. Once a beginning service geographical location, An ending service geographical location, pricing information, or a combination thereof, is known, a conveyance service offering relating to an AV can be generated. An AV can provide or perform a conveyance service for a conveyance client or an entity.

An AV can be partially autonomous, or semi-autonomous. and may be characterized by different levels of autonomy corresponding to the Society of Automotive Engineers' levels (SAE) adopted by the National Highway Traffic Safety Administration for automated driving systems, ranging from complete human driver control to full autonomy. An AV can include hardware and/or software alone or in a combination. An AV can utilize or be associate with a terminal, an application, a link, a central server, an external server, an owner/controller application, or a combination thereof. An AV can perform a function in substantially real time being updated or refreshed in the highest level of development or state of the art.

An AV can for example communicate a conveyance service request in conjunction with corresponding conveyance data, a filtered conveyance service request in conjunction with corresponding conveyance data, a preferred conveyance service request in conjunction with corresponding conveyance data, all or some of conveyance data relating to an AV, all or some of filtered conveyance data relating to an AV, all or some of preferred conveyance data relating to an AV, all or some of a substantially real time geographical location of an AV, a selected preference, or a combination thereof, to or with a central server, an external server, a terminal, an application, an owner/controller application, or a combination thereof, relating to An AV owner/controller, a service provider, a good supplier, a fleet manager, a logistics provider, or a logistics supplier.

An AV can provide or perform a conveyance service in a conveyance industry segment. An AV can provide or perform a conveyance service relating to a service provider, An AV owner/controller, a good supplier, a fleet manager, a logistics provider, a logistics supplier, or a combination thereof, operating in a conveyance industry segment.

An AV can be controlled or operated by a service provider, a good supplier, a fleet manager, a logistics provider, a logistics supplier, an AV owner/controller, or a third party operating in a conveyance industry segment. An AV can be accessed, utilized, controlled, or operated remotely by, for example, a service provider, an AV owner/controller, a good supplier, a logistics provider, a logistics supplier, or a fleet manager utilizing a central server, an external server, an application, an owner/controller application, or a combination thereof, by way of or with a link. An application or an owner/controller application can operate on or control a terminal that can be associated with an AV and can interface with an AV function. A selected preference can be used to secure including but not limited to a preferred conveyance service request, a filtered conveyance service request, or a combination thereof, for or with an AV or an AV that can be identified as preferred.

An AV can be sourced or provided by a service provider, a good supplier, a fleet manager, a logistics provider, a logistics supplier, An AV owner/controller, or a combination thereof. All or some of conveyance data relating to an AV can be sourced or provided by an external server that can be associated with a service provider, a good supplier, a fleet manager, a logistics provider, a logistics supplier, An AV owner/controller, or a combination thereof.

An AV can have or generate all or some of conveyance data relating to an AV. An AV can have or be associated with all or some of conveyance data relating to an AV. An AV that can be filtered can have or be associated with all or some of filtered conveyance data relating to an AV. An AV that can be identified as preferred can have or be associated with all or some of preferred conveyance data relating to an AV.

An AVAP can secure a preferred conveyance service request for or with an AV, an AV that can be filtered, an AV that can be identified as preferred, or a combination thereof. An AVAP can secure an AV, an AV that can be filtered, an AV that can be identified as preferred, or a combination thereof, for or with a preferred conveyance service request. An AV can utilize an AVAP to secure a proposed or recommended conveyance service request other than a preferred conveyance service request. An AV can be utilized with an AVAP to secure a proposed or recommended autonomous vehicle other than an AV can be identified as preferred. An AV can be geofenced when utilized, operated, or controlled by or with an AVAP.

An AV can utilize machine learning technology to analyze or evaluate and then secure a preferred conveyance service request or propose or recommend a different conveyance service request other than a preferred conveyance service request. An AV can utilize machine learning technology to analyze or evaluate and then secure an AV that can be identified as preferred or propose or recommend a different autonomous vehicle other than an AV that can be identified as preferred. An AV can utilize machine learning technology to facilitate a conveyance service. An AV can utilize machine learning technology to communicate with another autonomous vehicle.

An AV can be but is not limited to a vehicle that can have or utilize a designated locker. An AV can be but is not limited to a vehicle that can have or utilize a designated locker that can be a service provider or a good supplier. An AV can be but is not limited to a vehicle that can have or utilize a compartment that can be a mobile service provider, a mobile good supplier, a mobile store front, a last mile delivery vehicle, a mobile logistics provider, a mobile logistics supplier, or a combination thereof.

An AV can communicate all or some of information or data with a central server, an external server, an application, an owner/controller application, an AV, or a combination thereof.

An AV can be but is not limited to a car, an automobile, a van, a delivery van, a delivery vehicle, a last mile delivery vehicle, a vehicle that can have or utilize a locker, a vehicle that can have or utilize a storage unit, a vehicle that can have or utilize a compartment, a RV, a truck, a delivery truck, a semi-trailer truck, a shuttle, a helicopter, a boat, a vessel, an aircraft, a spacecraft, a bus, a train, a wagon, a rickshaw, a scooter, a bike, a moped, a trike, an all-terrain vehicle, a eighteen wheeler, a transportation machine, a drone, a medical vehicle, or a combination thereof.

An AV can be a machine, a robot, or a car that can perform a conveyance service without the aid of a human driver. An AV can secure a filtered conveyance service request other than a preferred conveyance service request. An AV, an AV owner/controller, or a combination thereof, can secure an autonomous vehicle that can be filtered other than an AV that can be identified as preferred. An AV can be owned or controlled by a service provider, an entity, a business, an individual, an AV owner/controller, a good supplier, a fleet manager, a third party, a logistics provider, a logistics supplier, or a combination thereof.

A terminal associated with an AV can be accessed, utilized, controlled, or operated by an application or an owner/controller application through an In-Vehicle infotainment, an interface, a touchscreen, a keypad, a heads up display, a voice recognition, a voice control, or a combination thereof. A terminal associated with an AV can have an input source such as but not limited to a touchscreen, a keypad, a voice recognition, a voice control, a heads up display, or an In-Vehicle infotainment system.

A terminal can be for example an AV that can be utilized to combine or integrate an application, an owner/controller application, a central server, an external server, a terminal, a link, or a combination thereof. An application, an owner/controller application, an AV, a terminal, a central server, an external server, a link, or a combination thereof, can be combined or integrated.

An AV can be perceived or referred to as a representative, a service provider, a good supplier, An AV owner/controller, a fleet manager, a third party, a logistics provider, a logistics supplier, or a combination thereof. An AV can accept or decline a preferred conveyance service request using an application, a central server, an external server, an owner/controller application, or a combination thereof.

An AV can be used to convey freight from a geographical location to another geographical location. An AV can perform a conveyance service while An AV owner/controller is at work. An AV can be used for a medical service and delivery. An AV can provide a conveyance service in an individual conveyance industry segment. An AV can provide a conveyance service relating to an individual service provider. An AV can be a tuk-tuk, a remorque, or a rickshaw. An AV can be characterized as level 0, level 1, level 2, level 3, level 4, and level 5 autonomy in accordance with the Society of Automotive Engineers' levels (SAE).

An AV can be but is not limited to a delivery van, a delivery vehicle, a van with a locker, storage unit or compartment, or a combination thereof, that can transport or convey a delivery item or a delivery good. An AV can be a delivery vehicle that can transport or convey a good or perform or provide a service that can operate on a sidewalk, or a bike lane.

When an AV is updated in substantially real time, a physical substantially real time geographical location of an AV can be updated in substantially real time. When an AV is updated in substantially real time, a physical substantially real time geographical location of an AV as well as a digital representation can be updated in substantially real time. A physical autonomous vehicle can be updated in substantially real time as well as a digital representation on a visual representation, an infotainment, an application, a central server, an owner/controller application, or a combination thereof.

When an AV is considered, a fleet of AVs can also be considered. An AV can be part of a fleet of a AV. When a fleet of AVs is considered, a fleet of AVs that can be filtered, a fleet of AVs that can be identified as preferred, or a combination thereof, can also be considered.

An AV can be controlled or operated by more than one service provider, more than one good supplier, more than one fleet manager, more than one owner or more than one controller of more than one autonomous vehicle, more than one logistics provider, or more than one logistics supplier operating in a conveyance industry segment. An AV can be controlled or operated by an OEM operating in a conveyance industry segment. An AV can be owned by an OEM and controlled or operated by a service provider operating in a conveyance industry segment. An AV or a fleet of AVs can be controlled or operated by a fleet manager. An AV can be owned by an OEM and controlled or operated by a fleet manager operating in a conveyance industry segment. An AV can be owned by an OEM and controlled or operated by a third party operating in a conveyance industry segment. An AV can be utilized by a service provider to facilitate a conveyance service for or on behalf of a good supplier. An AV or a fleet of AVs can be controlled or operated by An AV owner/controller.

An AV can be controlled or operated by a logistics provider, a logistics supplier, or a combination thereof. An AV owner/controller, a service provider, a good supplier, a fleet manager, a logistics provider, logistics supplier, or a combination thereof, can control or operate an AV for a third party. A third party can control or operate an AV for An AV owner/controller, a service provider, a good supplier, a fleet manager, a logistics provider, a logistics supplier, or a combination thereof.

An AV can have or generate all or some of conveyance data relating to an AV relating to an AV sensor. An AV can have or generate all or some of conveyance data relating to an AV battery level. All or some of conveyance data relating to an AV can be all or some data relating to one autonomous vehicle or a fleet of AVs. Conveyance data relating to an AV can include substantially real time geographical location of an AV, a fleet of AVs, an AV fleet, or a combination thereof. An AV can generate all or some of conveyance data relating to an AV that can be stored or cached on an application associated with an AV.

When an AV is considered, all or some of conveyance data relating to an AV can also be considered. When an AV that can be filtered is considered, all or some of filtered conveyance data relating to an AV can also be considered. When an AV that can be identified as preferred is considered, all or some of preferred conveyance data relating to an AV can also be considered. An AV can be utilized by or with an AVAP, a RAP, or a combination thereof, to facilitate, operate, and/or perform a conveyance service in a conveyance industry segment.

Owner or Controller of an Autonomous Vehicle (AV): An AV owner/controller can be but is not limited to a person, an entity, a robot, a machine, or a combination thereof, that can for example own, operate, or control an AV used to provide a conveyance service for a conveyance client. An AV owner/controller can be an entity or a person that can for example provide or perform a service, a delivery service, or a combination thereof. An AV owner/controller can own, operate, or control an AV. An AV owner/controller can analyze or evaluate and then secure a preferred conveyance service request for or with an AV, an AV that can be identified as preferred, or a combination thereof.

An AV owner/controller can for example retain, contract with, or be including but not limited to a representative, an AV, a service provider, a good supplier, a fleet manager, a logistics provider, a logistics supplier, or a combination thereof, to provide a conveyance service. An AV owner/controller can facilitate a conveyance service between including but not limited to a representative, an AV, a service provider, a good supplier, a fleet manager, a conveyance client, a logistics provider, a logistics supplier, or a combination thereof.

An AV owner/controller can for example have or be associated with an external server that can be a source or a provider of a conveyance service request with corresponding conveyance data, an AV, all or some of conveyance data relating to an AV, all or some of a substantially real time geographical location of an AV, any data or information related to an AV, or a combination thereof, relating to a conveyance industry segment.

An AV owner/controller can operate, own, or control one or more AV. An AV owner/controller can operate, own, or control an AV on behalf of a third party. An AV owner/controller can operate, own, or control a network to facilitate a conveyance service in a conveyance industry segment. An AV owner/controller can operate, own, or control an AV on a network. An AV owner/controller can operate, own, or control an AV on another network. An AV owner/controller can operate, own, or control an AV on behalf of a third party on a network.

An AV owner/controller can use an AVAP to facilitate, operate, or manage a conveyance service. An AV owner/controller can use an AVAP to control or operate an AV. An AV owner/controller can use an AVAP to secure a preferred conveyance service request for or with an AV that can be identified as preferred, an AV, or a combination thereof.

An AV owner/controller can use including but not limited to a central server, an external server, an application, an owner/controller application, or a combination thereof, to facilitate and perform a conveyance service. An AV owner/controller can independently control or operate, including but not limited to, a conveyance network of a representative, an AV, a good supplier, a fleet manager, a logistics provider, a logistics supplier, a conveyance client, a service provider, or a combination thereof. An AV owner/controller can use including but not limited to an application or an owner/controller application to access a service provider network via a terminal, a central server, an external server, or a combination thereof, to facilitate a conveyance service.

An AV owner/controller can use including but not limited to an application or an owner/controller application to analyze or evaluate and then secure a preferred conveyance service request for or with an AV that can be identified as preferred, an AV, or a combination thereof. An AV owner/controller can identify an AV or an AV that can be identified as preferred, to be secured or obtained for or with a preferred conveyance service request.

An AV owner/controller can at any time sign on and/or sign off of including but not limited to a service provider network, a good supplier network, a fleet manager network, a logistics provider network, a logistics supplier network, a central server, an external server, an owner/controller application, or a combination thereof. An AV owner/controller can use Information Technology infrastructure relating to including but not limited to a service provider, a good supplier, a fleet manager, a logistics provider, a logistics supplier, a third party, or a combination thereof.

An AV owner/controller can operate in a conveyance industry segment. An AV owner/controller can optionally be perceived or referred to as a fleet manager operating in a conveyance industry segment. An AV owner/controller can be an independent third party. An AV owner/controller can be a private individual person. An AV owner/controller can accept or decline a preferred conveyance service request, an AV that can be identified as preferred, or a combination thereof.

An AV owner/controller can work for or be associated with a service provider, a good supplier, a fleet manager, a logistics provider, a logistics supplier, a third party, or a combination thereof. An AV owner/controller can control or operate an AV in a conveyance industry segment. An AV owner/controller can control or operate an AV relating to a service provider, a good supplier, a fleet manager, a logistics provider, a logistics supplier, or a combination thereof. An AV owner/controller can perform a function in substantially real time being updated or refreshed in the highest level of development or state of the art.

An AV owner/controller can input or provide a selected preference into an owner/controller application, an application, a central server, or a combination thereof. An AV owner/controller can input or provide a selected preference to be used to filter a conveyance service request for an AV. An AV owner/controller can input or provide a selected preference used to identify including but not limited to a preferred conveyance service request, a filtered conveyance service request, or a combination thereof. An AV owner/controller can input or provide a selected preference to be used to filter all or some of conveyance data relating to an AV. An AV owner/controller can input or provide a selected preference used to identify including but not limited to an AV that can be filtered, all or some of filtered conveyance data relating to an AV, an AV that can be identified as preferred, all or some of preferred conveyance data relating to an AV, or a combination thereof.

An AV owner/controller can for example filter two variables when utilizing an AVAP if desired, being a conveyance service request and an AV, using a selected preference. An AV owner/controller can for example identify two preferred variables when utilizing an AVAP if desired, being a preferred conveyance service request, an AV that can be identified as preferred, all or some of preferred conveyance data relating to an AV, or a combination thereof, using a selected preference.

An AVAP can secure a preferred conveyance service request, an AV that can be identified as preferred, or a combination thereof, for An AV owner/controller. An AV owner/controller can utilize an AVAP to secure a proposed or recommended different conveyance service request other than a preferred conveyance service request. An AV owner/controller can utilize an AVAP to secure a proposed or recommended different autonomous vehicle other than an AV can be identified as preferred. An AV owner/controller can accept or decline a preferred conveyance service request when using an AVAP. An AV owner/controller can use an AVAP to identify and secure a preferred conveyance service request for or with an AV, an AV that can be identified as preferred, or a combination thereof.

Examples of an AV owner/controller include an entity operating one or more of a rideshare service, a ride-hail service, a car-share service, a taxi service, a shuttle service, a person delivery service, a food delivery service, a good delivery service, an animal delivery service, a medical service and delivery, a courier service, an item delivery service, a freight delivery service, a peer-to-peer conveyance service, a delivery service, or a transportation service.

An AV owner/controller can be perceived or referred to as a fleet manager, a service provider, a good supplier, a logistics provider, a logistics supplier, a third party, an AV, a fleet of AVs, or a combination thereof.

An AV owner/controller can operate in an individual conveyance industry segment. AV owner/controller can be a source or a provider of all or some of a conveyance service request in conjunction with corresponding conveyance data, all or some of conveyance data relating to an AV, all or some of an AV, all or some of a substantially real time geographical location of an AV, all or some of conveyance data relating to a fleet of AVs, all or some of a fleet of AVs, all or some of a substantially real time geographical location of a fleet of AVs, or a combination thereof.

An AV owner/controller can have or utilize an API that can provide all or some of a conveyance service request with corresponding conveyance data, all or some of an AV with corresponding conveyance data, all or some of a substantially real time geographical location of an AV, all or some of conveyance data relating to a fleet of AVs, all or some of a substantially real time geographical location of a fleet of AVs, or a combination thereof.

An AV owner/controller can operate or control an AV for or on behalf of an OEM or an auto manufacturer to provide a conveyance service. An AV owner/controller can control or operate an AV or a fleet of AVs for or on behalf of an OEM on a network that can operate in a conveyance industry segment. An AV owner/controller can control or operate an AV or a fleet of AVs for or on behalf of an OEM on a service provider network that can operate in a conveyance industry segment.

An AV owner/controller can utilize an external server for or with a conveyance industry segment. An AV owner/controller can lease or sublease an AV. An AV owner/controller can lease or sublease a fleet of AVs. An AV owner/controller can lease or sublease an AV or a fleet of AVs from a third party. An AV owner/controller can be a lessee of an AV.

An AV owner/controller can secure a filtered conveyance service request other than a preferred conveyance service request. An AV owner/controller can secure an AV that can be filtered other than an AV that can be identified as preferred. An AV owner/controller can accept or decline a preferred conveyance service request using an owner/controller application, an application, a central server, an external server, or a combination thereof.

An AV owner/controller can be for example an entity or a business that can retain or contract with including but not limited a fleet of AVs to provide a conveyance service. An AV owner/controller can retain or contract a fleet of AVs in a conveyance industry segment. An AV owner/controller can use an AVAP to control or operate a fleet of AVs.

An AV owner/controller can own, operate, or control a fleet of AVs. An AV owner/controller can own, operate, or control a fleet of AVs on a network. An AV owner/controller can own, operate, or control a fleet of AVs on another network. An AV owner/controller can own, operate, or control a fleet of AVs on behalf of a third party on a network.

An AV owner/controller can for example utilize an external server that can be a source or a provider of all or some of a fleet of AVs, all or some of conveyance data relating to a fleet of AVs, all or some of a substantially real time geographical location of a fleet of AVs, any data or information related to a fleet of AVs, or a combination thereof, relating to a conveyance industry segment.

An AV owner/controller can input or provide a selected preference into an owner/controller application, being a computer program, and a selected preference can be transmitted to a central server, an application, or a combination thereof. An AV owner/controller can use an AVAP, a RAP, or a combination thereof, to facilitate, operate, or perform a conveyance service in a conveyance industry segment.

An AV owner/controller can identify an AV that can be identified as preferred, that can be waiting the longest to perform a conveyance service and secure a preferred conveyance service request for or with an AV that can be identified as preferred. An AV owner/controller can identify an AV that is not performing as expected and secure a preferred conveyance service request for or with an AV that can be identified as preferred, an AV, or a combination thereof. An AV owner/controller can identify a fleet of AVs that can be moved towards a football stadium to perform a conveyance service when a game ends.

Representative Automated Platform (RAP): The following are illustrative, non-limiting examples of a "representative automated platform" as used in the present disclosure:

A RAP can be a system and/or a method that can for example facilitate an operation or a function to secure a preferred conveyance service request. A RAP can be a system and/or a method that can for example be utilized or operated by a service provider, a good supplier, a fleet manager, a logistics provider, a logistics supplier, a representative, or a combination thereof.

A RAP can utilize a rules based approach. A RAP can utilize a rules based system, a rules based method, or a combination thereof. A RAP can be a software as a service (SaaS). A RAP can be a subscription service. A RAP can optimize vehicle utilization for or with a representative, a service provider, a good supplier, a fleet manager, a logistics provider, a logistics supplier, a representative, or a combination thereof.

A RAP, automated in whole or in part, can for example analyze or evaluate a conveyance service request relating to a representative preference and a substantially real time geographical location of a representative to secure a preferred conveyance service request for a representative. Any a conveyance service request secured, obtained, or identified by a RAP can be perceived or referred to as a preferred conveyance service request. A RAP can be a computer program product. A RAP can be used by including but not limited to a representative, a service supplier, a good supplier, An AV owner/controller, or a combination thereof.

A RAP can provide or identify a route or a dispatching instruction to or for an AV. A RAP can provide or identify a route or a dispatching instruction to or for an AV owner/controller, a service provider, a good supplier, a fleet manager, a logistics provider, a logistics supplier, or a combination thereof. A RAP can have an entity, a person, an entity, or a computer manage logistics on a backend system, a frontend system, or a combination thereof.

A RAP can have or be utilized from a perspective. A RAP can have or be utilized from a different perspective. A RAP can have or be utilized from a perspective at the same time. A RAP can have or be utilized from a perspective relating to an AV owner/controller, a representative, a service provider, a good supplier, a fleet manager, a logistics provider, or a logistics supplier. A RAP can implement or utilize machine learning technology. A RAP can implement or utilize machine learning technology to analyze or evaluate information or data sourced or provided by an input source.

A preferred conveyance service request can be secured or obtained and can be displayed to a representative. A RAP can secure a subsequent or additional preferred conveyance service request after a first preferred conveyance service request is secured or obtained.

A RAP, when automated in part, can allow a representative to use including but not limited to an application or a central server to analyze or evaluate and then secure a preferred conveyance service request. A preferred conveyance service request in conjunction with corresponding conveyance data, a filtered conveyance service request in conjunction with corresponding conveyance data, or a combination thereof, can be transmitted from a central server to an application and displayed as but not limited to a pop-up, an icon, a visual, a symbol, a pattern, a marker, a notification, an alert, a message, a short message service, a multimedia messaging service, a smart messaging service, or an extended message service. A representative can accept or decline including but not limited to a preferred conveyance service request, a filtered conveyance service request, or a combination thereof, that can be displayed on an application. If a representative declines a preferred conveyance service request or a filtered conveyance service request, a new or different preferred conveyance service request or a new or different filtered conveyance service request can be identified by a RAP and displayed.

A RAP can secure a preferred conveyance service request provided or sourced by including but not limited to a service provider, an external server, a central server, or a combination thereof. A RAP can secure a preferred conveyance service request in a conveyance industry segment. A RAP can secure, for a representative, a subsequent or additional preferred conveyance service request in a different conveyance industry segment. A RAP can secure a preferred conveyance service request relating to a service provider.

A RAP can update a preferred conveyance service request, a filtered conveyance service request, a conveyance service request, or a combination thereof, in substantially real time as a substantially real time geographical location of a representative changes or updates. A RAP can identify and secure a new or different preferred conveyance service request as a substantially real time geographical location of a representative updates or changes. A RAP can update a preferred conveyance service request, a filtered conveyance service request, a conveyance service request, or a combination thereof, as traffic information updates.

A RAP can be updated or refreshed in substantially real time and can refer to being updated or refreshed in the highest level of development or state of the art. A RAP can perform a function in substantially real time and can refer to being updated or refreshed in the highest level of development or state of the art.

A RAP can repeatedly or continuously analyze or evaluate a conveyance service request in substantially real time and secure a subsequent or additional preferred conveyance service request while a representative performs a conveyance service and a substantially real time geographical location of a representative updates or changes. A RAP can update or notify a representative while performing a conveyance service of including but not limited to a direction, a route, a conveyance client, a conveyance service request, a filtered conveyance service request, a preferred conveyance service request, a beginning service geographical location, An ending service geographical location, traffic information, or a combination thereof. A RAP can update or change an order of which a conveyance service is to be performed by repeatedly or continuously analyzing or evaluating in substantially real time, including but not limited to, a conveyance service request, a filtered conveyance service request, a preferred conveyance service request, a substantially real time geographical location of a representative, a representative preference, or a combination thereof. A RAP can unsecure or cancel a secured or obtained preferred conveyance service request or a secured or obtained filtered conveyance service request.

A RAP can use machine learning technology to propose or recommend and optionally secure a preferred conveyance service request, a filtered conveyance service request, a conveyance service request, or a combination thereof. A RAP can propose or recommend a different conveyance service request other than a preferred conveyance service request based on including but not limited to a historical conveyance service, a historical pattern, a trend of a representative, the current substantially real time environment, a substantially real time geographical location of a representative, a representative preference, a different representative preference, a different combination of a representative preference, or a combination thereof. A representative can rank a representative preference for a RAP to make a proposal or recommendation. A RAP can propose, recommend, or notify a representative of an alternative or a different conveyance service request in addition to or replacement of a preferred conveyance service request. A proposal or recommendation of a different conveyance service request can assist a representative perform an additional conveyance service request. Any proposed or recommended a conveyance service request by a RAP that is secured or obtained can be identified as a preferred conveyance service request.

A preferred conveyance service request, a filtered conveyance service request, or a conveyance service request can be secured or obtained without any interaction with a representative. A RAP can secure a preferred conveyance service request in an individual conveyance industry segment. A RAP can secure a preferred conveyance service request relating to an individual service provider.

A RAP can secure a filtered conveyance service request or a conveyance service request other than a preferred conveyance service request. A RAP can update or notify a representative of a preferred conveyance service request identified by a central server, an application, or a combination thereof, that can be accepted or declined by a representative. A different conveyance service request can be accepted or selected by a representative other than a preferred conveyance service request identified by a RAP.

A secured or obtained conveyance service can be performed at the same time or during the same or similar trip. A RAP can create and/or optimize a route of a preferred conveyance service request based on including but not limited to a representative preference, a substantially real time geographical location of a representative, or a combination thereof. A RAP can show a preferred conveyance service request on a visual representation, an application, a central server, or a combination thereof. A RAP can utilize an application, a terminal, a central server, an external server, a link, or a combination thereof, that can be combined or integrated.

A RAP can unsecure or cancel a secured or obtained preferred conveyance service request or a secured or obtained filtered conveyance service request if a better preferred conveyance service request or a better filtered conveyance service request becomes available such as but not limited to in substantially real time.

A RAP can propose or recommend a different conveyance service request in another geographical location or another area based on a historical conveyance service. A RAP can propose or recommend a preferred conveyance service request, a filtered conveyance service request, a conveyance service request, or a combination thereof, based on elevated pricing when a representative has chosen a specific conveyance industry segment preference and a level of service preference as a representative preference and a pricing preference not being a representative preference. An application can propose or recommend a different conveyance service request other than a preferred conveyance service request.

A RAP can automatically secure a preferred conveyance service request after a pop-up or a notification has had a given amount of time elapse. A representative can accept or decline a preferred conveyance service request identified by a RAP by swiping or using another gesture on an application. A RAP can utilize a neural network. A RAP can utilize quantum computing. A RAP can display a preferred conveyance service request or a filtered conveyance service request and a representative can secure a preferred conveyance service request or a filtered conveyance service request. More than one preferred conveyance service request can be secured or obtained concurrently for a representative.

An AV owner/controller, a service provider, a good supplier, a fleet manager, a logistics provider, a logistics supplier, or a combination thereof, can utilize a RAP in conjunction with an AVAP to facilitate or perform a conveyance service. A representative can perform all or some of a conveyance service utilizing a RAP. A representative can perform all or some of a conveyance service in conjunction with an AV utilizing a RAP, an AVAP, or a combination thereof. A representative can perform part of a conveyance service and an AV can perform another part of a conveyance service utilizing a RAP, an AVAP, or a combination thereof.

Autonomous Vehicle (AV) Automated Platform: The following are illustrative, non-limiting examples of an "AV automated platform" as used in the present disclosure:

An AVAP, automated in whole or in part, can be a system and/or a method that can facilitate an operation to secure a preferred conveyance service request, an AV that can be identified as preferred, or a combination thereof. An AVAP, automated in whole or in part, can be a system and/or a method that can for example be utilized or operated by An AV owner/controller, a service provider, a good supplier, a fleet manager, a logistics provider, a logistics supplier, an AV, or a combination thereof. An AVAP can optimize vehicle utilization for or with An AV owner/controller, a service provider, a good supplier, a fleet manager, a logistics provider, a logistics supplier, or a combination thereof.

An AVAP can be a computer program product. An AVAP can utilize a rules based approach. An AVAP can utilize a rules based system, a rules based method, or a combination thereof. An AVAP can be a software as a service (SaaS). An AVAP can be a subscription service.

An AVAP can manage, control, or operate an AV. An AVAP, automated in whole or in part, can for example analyze or evaluate a conveyance service request relating to a selected preference and a substantially real time geographical location of an AV to secure a preferred conveyance service request for or with an AV, an AV that can be identified as preferred, or a combination thereof. When a preferred conveyance service request is secured or obtained for or with an AV, an AV that can be identified as preferred can also be considered. Any a conveyance service request secured, obtained, or identified by an AVAP can be perceived or referred to as a preferred conveyance service request.

An AVAP, automated in whole or in part, can for example analyze or evaluate all or some of conveyance data relating to an AV relating to a selected preference and a substantially real time geographical location of an AV to secure an AV, an AV that can be identified as preferred, or a combination thereof, for or with a preferred conveyance service request. When an AV is considered, an AV that can be filtered, an AV that can be identified as preferred, or a combination thereof, can also be considered. Any an AV secured, obtained, or identified by an AVAP can be perceived or referred to as an AV that can be identified as preferred.

An AVAP can provide or identify a route or a dispatching instruction to or for an AV. An AVAP can provide or identify a route or a dispatching instruction to or for An AV owner/controller, a service provider, a good supplier, a fleet manager, a logistics provider, a logistics supplier, or a combination thereof. An AVAP can be used by including but not limited to An AV owner/controller, an AV, a service provider, a good supplier, a fleet manager, a logistics provider, a logistics supplier, or a combination thereof.

An AVAP can have or be utilized from a perspective. An AVAP can have or be utilized from a different perspective. An AVAP can have or be utilized from a perspective at the same time. An AVAP can have or be utilized from a perspective relating to an AV owner/controller, a service provider, a good supplier, a fleet manager, a logistics provider, or a logistics supplier. An AVAP can optimize fleet performance and can control or operate an AV in an efficient manner. An AVAP can optimize fleet performance by taking perspective from a single autonomous vehicle to a fleet of AVs. An AVAP can single out or identify an AV that may be underperforming and enhance a selected preference for that AV, to increase a likelihood of securing or obtaining a preferred conveyance service request for the underperforming AV.

An AVAP can have an entity, a person, an entity, or a computer manage logistics for an AV owner/controller, an AV, a service provider, a good supplier, a fleet manager, a logistics provider, a logistics supplier, or a combination thereof. An AVAP can have an entity, a person, an entity, or a computer manage logistics on a backend system, a frontend system, or a combination thereof.

An AVAP can secure a preferred conveyance service request, an AV, an AV that can be identified as preferred, or a combination thereof, relating to a service provider, An AV owner/controller, a good supplier, a fleet manager, a logistics provider, or a logistics supplier. A preferred conveyance service request can be secured or obtained for or with an AV, an AV that can be identified as preferred, or a combination thereof. An AVAP can secure a subsequent or additional preferred conveyance service request after a first preferred conveyance service request is secured or obtained for or with an AV, an AV that can be identified as preferred, or a combination thereof.

An AVAP can secure a preferred conveyance service request, an AV, an AV that can be identified as preferred, or a combination thereof, provided or sourced by including but not limited to a service provider, a good supplier, a fleet manager, a logistics provider, a logistics supplier, An AV owner/controller, an external server, a central server, an application, an owner/controller application, or a combination thereof. An AVAP can secure a preferred conveyance service request, an AV, an AV that can be identified as preferred, or a combination thereof, in a conveyance industry segment. An AVAP can secure, for an AV or an AV that can be identified as preferred, a subsequent or additional preferred conveyance service request in a different conveyance industry segment. An AVAP can secure a subsequent or additional preferred conveyance service request in a different conveyance industry segment for or with an AV that is identified as preferred.

An AVAP can secure a preferred conveyance service request, an AV, an AV that can be identified as preferred, or a combination thereof, on or at a central server, an external server, an application, an owner/controller application, or a combination thereof. An AVAP can secure a preferred conveyance service request on a central server and secure an AV that can be identified as preferred on another central server. An AVAP can secure another a preferred conveyance service request for an AV that can be identified as preferred if the previously secured or obtained a preferred conveyance service request is rejected or not available.

An AVAP can manage, operate, or control a fleet of AVs for or with a service provider, An AV owner/controller, a good supplier, a fleet manager, a logistics provider, or a logistics supplier. An AVAP can facilitate all or some of a conveyance service. An AVAP can facilitate part of a conveyance service and contract out another part of a conveyance service. An AVAP can be utilized with a RAP to facilitate a conveyance service. An AVAP can use a unique identifier or a unique number to manage, operate, or control an AV.

An AVAP can update a preferred conveyance service request, a filtered conveyance service request, a conveyance service request, all or some of conveyance data relating to an AV, all or some of filtered conveyance data relating to an AV, all or some of preferred conveyance data relating to an AV, or a combination thereof, in substantially real time as all or some of a substantially real time geographical location of an AV changes or updates. An AVAP can identify and secure a new or different preferred conveyance service request or a new or different autonomous vehicle that can be identified as preferred, as all or some of a substantially real time geographical location of an AV updates or changes. An AVAP can update a preferred conveyance service request, a filtered conveyance service request, a conveyance service request, all or some of conveyance data relating to an AV, all or some of filtered conveyance data relating to an AV, all or some of preferred conveyance data relating to an AV, or a combination thereof, as traffic information updates.

An AVAP can be updated or refreshed in substantially real time and can refer to being updated or refreshed in the highest level of development or state of the art. An AVAP can perform a function in substantially real time and can refer to being updated or refreshed in the highest level of development or state of the art. An AVAP can use a selected preference to enable only a preferred conveyance service request to be secured or obtained for or with an AV that can be identified as preferred. An AVAP can apply a selected preference to enable only an AV that can be identified as preferred to be secured or obtained for or with a preferred conveyance service request.

An AVAP can repeatedly or continuously analyze or evaluate a conveyance service request in substantially real time and secure a subsequent or additional preferred conveyance service request while an AV performs or provides a conveyance service and all or some of a substantially real time geographical location of an AV updates or changes. An AVAP can repeatedly or continuously analyze or evaluate an AV or all or some of conveyance data relating to an AV in substantially real time and secure a subsequent or additional preferred conveyance service request while an AV or an AV that can be identified as preferred, performs or provides a conveyance service and all or some of a substantially real time geographical location of an AV updates or changes.

The AVAP can update or notify an AV or an AV owner/controller while performing a conveyance service of including but not limited to a direction, a route, a conveyance client, a conveyance service request, a filtered conveyance service request, a preferred conveyance service request, a beginning service geographical location, An ending service geographical location, traffic information, all or some of conveyance data relating to an AV, all or some of filtered conveyance data relating to an AV, all or some of preferred conveyance data relating to an AV, or a combination thereof.

An AVAP can update or change an order of which a conveyance service is to be performed by repeatedly or continuously analyzing or evaluating, in substantially real time, including but not limited to, a conveyance service request, a filtered conveyance service request, a preferred conveyance service request, all or some of conveyance data relating to an AV, all or some of filtered conveyance data relating to an AV, all or some of preferred conveyance data relating to an AV, a substantially real time geographical location of an AV, a selected preference, or a combination thereof.

An AVAP can unsecure or cancel a secured or obtained preferred conveyance service request or a secured or obtained filtered conveyance service request. An AVAP can unsecure or cancel a conveyance service request, a filtered conveyance service request, a preferred conveyance service request, all or some of conveyance data relating to an AV, all or some of filtered conveyance data relating to an AV, all or some of preferred conveyance data relating to an AV, an AV, an AV that can be filtered, an AV that can be identified as preferred, or a combination thereof.

An AVAP can unsecure or cancel a conveyance service request, a filtered conveyance service request, a preferred conveyance service request, all or some of conveyance data relating to an AV, all or some of filtered conveyance data relating to an AV, all or some of preferred conveyance data relating to an AV, an AV, an AV that can be filtered, an AV that can be identified as preferred, or a combination thereof, on a central server, an external server, an application, an owner/controller application, or a combination thereof.

The AVAP can utilize machine learning technology for a number of different functions including to analyze or evaluate information or data sourced or provided by an input source, to propose or recommend and, optionally, secure a preferred conveyance service request, a filtered conveyance service request, a conveyance service request, an AV that can be identified as preferred, an AV that can be filtered, an AV, or a combination thereof. An AV owner/controller, a service provider, a good supplier, a fleet manager, a logistics provider, or a logistics supplier can rank a selected preference for an AVAP to make a proposal or recommendation.

An AVAP can propose or recommend a different conveyance service request other than a preferred conveyance service request based on including but not limited to a historical conveyance service, a historical pattern, a trend of an AV, the current substantially real time environment, a substantially real time geographical location of an AV, a selected preference, a different selected preference, a different combination of a selected preference, or a combination thereof. An AVAP can propose or recommend a different autonomous vehicle other than an AV that can be identified as preferred.

An AVAP can propose, recommend, or notify an AV, An AV owner/controller, a service provider, a good supplier, a fleet manager, a logistics provider, a logistics supplier, or a combination thereof, of an alternative or a different conveyance service request in addition to or replacement of a preferred conveyance service request. A proposal or recommendation of a different conveyance service request can assist An AV owner/controller, an AV, a service provider, a good supplier, a fleet manager, a logistics provider, a logistics supplier, or a combination thereof, perform or provide an additional conveyance service request. Any proposed or recommended a conveyance service request by an AVAP that is secured or obtained can be identified as a preferred conveyance service request. Any proposed or recommended an AV by an AVAP that is secured or obtained can be identified as an AV that can be identified as preferred.

An AVAP, when automated in part, can allow an AV owner/controller or a service provider to use an application, an owner/controller application, a central server, an external server, or a combination thereof, to analyze or evaluate and then secure a preferred conveyance service request. A preferred conveyance service request in conjunction with corresponding conveyance data, a filtered conveyance service request in conjunction with corresponding conveyance data, all or some of preferred conveyance data relating to an AV, all or some of filtered conveyance data relating to an AV, or a combination thereof, can be transmitted from a central server to an application or an owner/controller application and displayed as but not limited to a pop-up, an icon, a visual, a symbol, a pattern, a marker, a notification, an alert, a message, a short message service, a multimedia messaging service, a smart messaging service, or an extended message service.

An AV owner/controller or a service provider can accept or decline including but not limited to a preferred conveyance service request, a filtered conveyance service request, all or some of preferred conveyance data relating to an AV, all or some of filtered conveyance data relating to an AV, or a combination thereof, that can be displayed on an application or an owner/controller application.

If an AV owner/controller or a service provider declines a preferred conveyance service request or a filtered conveyance service request, a new or different preferred conveyance service request or a new or different filtered conveyance service request can be identified by the AVAP and displayed. If an AV owner/controller or a service provider declines an AV that can be identified as preferred or an AV that can be filtered, a new or different autonomous vehicle that can be identified as preferred or a new or different AV that can be filtered can be identified by the AVAP and displayed.

A preferred conveyance service request, a filtered conveyance service request, a conveyance service request, an AV, an AV that can be filtered, an AV that can be identified as preferred, or a combination thereof, can be secured or obtained without any interaction by an AV owner/controller. An AVAP can secure a preferred conveyance service request for or with an AV, an AV that can be identified as preferred, or a combination thereof, in an individual conveyance industry segment. An AVAP can secure a preferred conveyance service request for or with an AV, an AV that can be identified as preferred, or a combination thereof, relating to an individual service provider.

An AVAP can secure a filtered conveyance service request or a conveyance service request other than a preferred conveyance service request. An AVAP can secure an AV that can be filtered or an AV other than an AV that can be identified as preferred. An AVAP can update or notify An AV owner/controller or a service provider of a preferred conveyance service request identified by a central server, an application, an owner/controller application, or a combination thereof, that can be accepted or declined by An AV owner/controller, or a service provider. A different conveyance service request can be accepted or selected by an AV owner/controller or a service provider other than a preferred conveyance service request identified by an AVAP. A different autonomous vehicle can be accepted or selected by An AV owner/controller, or a service provider other than an AV that can be identified as preferred that can be identified by an AVAP.

An AVAP can be used by an AV owner/controller, a service provider, a good supplier, a fleet manager, a logistics provider, a logistics supplier, or a combination thereof, to facilitate a conveyance service. An AVAP can benefit a fleet manager, a service provider, a good supplier, an AV owner/controller, a logistics provider, or a logistics supplier by having a third party control, manage, or operate an AV to provide or perform a conveyance service. An AVAP can benefit a third party by having a fleet manager, a service provider, a good supplier, An AV owner/controller, a logistics provider, or a logistics supplier control, manage, or operate an AV to provide or perform a conveyance service.

A secured or obtained conveyance service can be performed at the same time or during the same or similar trip. An AVAP can create and/or optimize a route of a preferred conveyance service request based on including but not limited to a selected preference, a substantially real time geographical location of an AV, or a combination thereof. An AVAP can show a preferred conveyance service request or an AV that can be identified as preferred on an owner/controller application, an application, a central server, a visual representation, or a combination thereof. An AVAP can utilize an application, an owner/controller application, an AV, a terminal, a central server, an external server, a link, or a combination thereof, that can be combined or integrated.

An AVAP can unsecure or cancel a secured or obtained preferred conveyance service request or a secured or obtained filtered conveyance service request if a better preferred conveyance service request or a better filtered conveyance service request becomes available such as but not limited to in substantially real time. An AVAP can unsecure or cancel a secured or obtained autonomous vehicle that can be identified as preferred or a secured or obtained autonomous vehicle that can be filtered if a better autonomous vehicle that can be identified as preferred or a better autonomous vehicle that can be filtered becomes available such as but not limited to in substantially real time. An AVAP can unsecure or cancel an AV that can be identified as preferred if an AV that can be identified as preferred is or becomes unavailable.

An AVAP can propose or recommend a different conveyance service request in another geographical location or another area based on a historical conveyance service. An AVAP can propose or recommend a preferred conveyance service request, a filtered conveyance service request, a conveyance service request, an AV, an AV that can be filtered, an AV that can be identified as preferred, or a combination thereof, based on high conveyance service request density when An AV owner/controller has chosen a specific conveyance industry segment preference and a level of service preference as a selected preference. A central server, an application, an owner/controller application, or a combination thereof, can propose or recommend a different conveyance service request other than a preferred conveyance service request. A central server, an application, an owner/controller application, or a combination thereof, can propose or recommend a different autonomous vehicle other than an AV that can be identified as preferred.

An AVAP, automated in whole or in part, can be used as a tool to help a service provider, An AV owner/controller, a good supplier, a fleet manager, a logistics provider, a logistics supplier, or a combination thereof, integrate an AV to a conveyance industry segment. An AVAP can be an operating system, an operating method, a backend operating system, a backend operating method, or a combination thereof.

An AVAP can automatically secure a preferred conveyance service request, an AV, an AV that can be identified as preferred, or a combination thereof, after a pop-up or a notification has had a given amount of time elapse. An AV owner/controller can accept or decline a preferred conveyance service request, an AV, an AV that can be identified as preferred, or a combination thereof, identified by an AVAP by swiping or using another gesture on an owner/controller application or an application. An AVAP can utilize a neural network. An AVAP can utilize quantum computing. More than one preferred conveyance service request can be secured or obtained concurrently for or with an AV, an AV that can be identified as preferred, or a combination thereof.

An AVAP can manage, control, or operate a fleet of AVs. An AVAP can manage, control, or operate a fleet of AVs for or with An AV owner/controller, a service provider, a good supplier, a fleet manager, a logistics provider, or a logistics supplier. An AVAP can secure a preferred conveyance service request for or with a fleet of AVs. An AVAP can secure a fleet of AVs that can be identified as preferred for or with a preferred conveyance service request.

An AVAP can assign a unique identifier or a unique number to an AV or a fleet of AVs. An AVAP can use a unique identifier or a unique number to manage, control, or operate an AV or a fleet of AVs. An AVAP can use a unique identifier or a unique number to manage, control, or operate An AV owner/controller, a service provider, a good supplier, a fleet manager, a logistics provider, a logistics supplier, or a combination thereof.

An AVAP can optimize fleet performance by taking perspective from a single autonomous vehicle from multiple autonomous vehicles. An AVAP can license or hire at least on third party to manage logistics for an AV owner/controller, a service provider, a good supplier, a fleet manager, a logistics provider, a logistics supplier, or a combination thereof.

An AVAP can be utilized to manage, control, or operate a robot taxi service. An AVAP can be utilized to manage, control, or operate a food delivery service. An AVAP can be utilized to manage, control, or operate a package delivery service. An AVAP can be utilized to manage, control, or operate multiple conveyance industry segments.

An AVAP can integrate or incorporate an input source or an API, such as for example, a driving navigation application. An AVAP can use or utilize information or data from a third party API or service, such as a routing or mapping service. An AVAP can integrate or incorporate a high-definition map or a mapping provider. An AVAP can integrate information or data from a third party. An AVAP can integrate information or data from a map provider. An AVAP can improve with a "network effect."

An AV owner/controller, a service provider, a good supplier, a fleet manager, a logistics provider, a logistics supplier, or a combination thereof, can utilize an AVAP in conjunction with a RAP to facilitate or perform a conveyance service. A representative can perform all or some of a conveyance service utilizing an AVAP. A representative can perform all or some of a conveyance service in conjunction with an AV utilizing an AVAP. A representative can perform part of a conveyance service and an AV can perform another part of a conveyance service utilizing an AVAP.

An AVAP can allow or ask a conveyance client or a recipient of a conveyance service to select or choose a route for a conveyance service. An AVAP can identify a preferred conveyance service request and then secure an AV that can be identified as preferred on a central server relating to a service provider, An AV owner/controller, a good supplier, a fleet manager, a logistics provider, a logistics supplier, or a third party. An AVAP can identify a preferred conveyance service request or an AV that can be identified as preferred and can be secured or obtained on another server relating to a service provider, An AV owner/controller, a good supplier, a fleet manager, a logistics provider, a logistics supplier, or a third party.

An AVAP can utilize a database table to filter and identify a preferred conveyance service request. An AVAP can use a database table to filter and identify an AV that can be identified as preferred. An AVAP can use a database table to filter and identify a preferred conveyance service request and an AV that can be identified as preferred.

An AVAP can identify a traffic based information, for example, a car accident and communicate a traffic based information to an AV, An AV owner/controller, a service provider, a good supplier, a fleet manager, a logistics provider, a logistics supplier, an application, an owner/controller application, a central server, or a combination thereof.

An AVAP can communicate with or connect to a central server relating to An AV owner/controller, a service provider, a good supplier, a fleet manager, a logistics provider, a logistics supplier, or a combination thereof. An AVAP can communicate with or connect to another central server relating to An AV owner/controller, a service provider, a good supplier, a fleet manager, a logistics provider, a logistics supplier, or a combination thereof. An AVAP can communicate with or connect to three central servers, being one central server to manage, control, or operate an AVAP, one central server associated with a fleet manager, and another central server associated with a service provider.

The following are different examples of a present invention used by various parties or entities:

An independent third party can own or develop a present invention and can license including but not limited to all or some of a software, a Software as a service (SaaS), a subscription service, a technology, an AVAP, a RAP, a system, a method, or a combination thereof, to an OEM, where an OEM can control, manage, or operate a present invention. For example, Independent Company A can own or develop a present invention and can license an AVAP to OEM Company B, where OEM Company B can control, manage, or operate the backend logistics. Independent Company A can own or develop a present invention and can license an AVAP to multiple OEM Companies, where multiple OEM Companies can control, manage, or operate the backend logistics.

An independent third party can own, manage, and/or operate a present invention, including but not limited to all or some of a software, a Software as a service (SaaS), a subscription service, a technology, an AVAP, a RAP, a system, a method, or a combination thereof, for an OEM. For example, Independent Company A can own or license an AVAP and Independent Company A can control, manage, or operate the backend logistics for OEM Company B. Independent Company A can own or license an AVAP and Independent Company A can control, manage, or operate the backend logistics for multiple OEM Companies.

An OEM can own or license a present invention, including but not limited to all or some of a software, a Software as a service (SaaS), a subscription service, a technology, an AVAP, a RAP, a system, a method, or a combination thereof, and an OEM can control, manage, or operate a present invention on their own OEM conveyance network. OEM Company C can own or license an AVAP, where OEM Company C can control, manage, or operate the backend logistics for their own conveyance network. OEM Company C can own or license an AVAP, where OEM Company C can control, manage, or operate the backend logistics in multiple conveyance industry segments on their own conveyance network.

An OEM can own or license a present invention, including but not limited to all or some of a software, a Software as a service (SaaS), a subscription service, a technology, an AVAP, a RAP, a system, a method, or a combination thereof, and an OEM can control, manage, or operate a present invention on another conveyance network. For example, OEM Company C can own or license an AVAP, where OEM Company C can control, manage, or operate the backend logistics for Service Provider Company A's conveyance network. In another example, OEM Company C can own or license an AVAP, where OEM Company C can control, manage, or operate the backend logistics for other multiple service provider's conveyance network.

A service provider can own or license the inventive platform or portion(s) thereof including all or some of the software, a Software as a service (SaaS), a subscription service, a technology, an AVAP, a RAP, a system, a method, or a combination thereof, and a service provider can control, manage, or operate a present invention on their own service provider conveyance network. In one example, Service Provider Company B can own or license an AVAP, where Service Provider Company B can control, manage, or operate the backend logistics for their own conveyance network. In another example, Service Provider Company B can own or license an AVAP where Service Provider Company B can control, manage, or operate the backend logistics in multiple conveyance industry segments on their own conveyance network.

A service provider can own or license the inventive platform or portion(s) thereof including all or some of a software, a Software as a service (SaaS), a subscription service, a technology, an AVAP, a RAP, a system, a method, or a combination thereof, and an independent third party can control, manage, or operate a present invention on the service provider conveyance network. For example, Service Provider Company C can own or license an AVAP in which Independent Company B can control, manage, or operate the backend logistics for Service Provider Company C's conveyance network. In another example, Service Provider Company C can own or license an AVAP, and Independent Company B can control, manage, or operate the backend logistics for multiple service provider conveyance networks.

Visual Representation: The following are illustrative, non-limiting examples and embodiments of "visual representation" as used in the present disclosure:

A visual representation can be a tool used to assist a representative analyze or evaluate a conveyance service request or a conveyance service request metric on, for example, a geographical map to secure a preferred conveyance service request. A visual representation can be viewed from including but not limited to a perspective, a point of reference, a point of interest, or a combination thereof.

A visual representation can be, for example, a geographical map that can display including but not limited to a preferred conveyance service request in conjunction with corresponding conveyance data, a filtered conveyance service request in conjunction with corresponding conveyance data, a conveyance service request in conjunction with corresponding conveyance data, a metric relating to a respective request, a substantially real time geographical location of a representative, a substantially real time geographical location of an AV, a substantially real time geographical location of An AV owner/controller, a substantially real time geographical location of a service provider, a substantially real time geographical location of a good supplier, a substantially real time geographical location of a fleet manager, a substantially real time geographical location of a conveyance client, a substantially real time geographical location of a logistics provider, a substantially real time geographical location of a logistics supplier, a selected preference, a representative preference, or a combination thereof. A visual representation can be, for example, a geographical map that can display including but not limited to all or some of conveyance data relating to an AV, all or some of filtered conveyance data relating to an AV, all or some of preferred conveyance data relating to an AV, or a combination thereof.

A visual representation can be, for example, a geographical map that can display including but not limited to a preferred conveyance service offering in conjunction with corresponding conveyance data, a filtered conveyance service offering in conjunction with corresponding conveyance data, a conveyance service offering in conjunction with corresponding conveyance data, a metric relating to a respective offering, or a combination thereof.

A visual representation can be displayed in or on an AV. A visual representation can be displayed in or on an AV to show a route or a path for an AV. A visual representation can be utilized by a conveyance client in an AV. A visual representation can have or be associated with a commercial or an advertisement. A visual representation can be an interactive map. A visual representation can be an interactive map that can be used by a conveyance client. A visual representation can be an interactive map that can be used by a conveyance client to communicate with, including but not limited to, a service provider, a good supplier, a fleet manager, An AV owner/controller, a logistics provider, a logistics supplier, an AV, or a combination thereof.

A visual representation can be displayed on including but not limited to an application, a central server, an owner/controller application, a remote display, or a combination thereof. A visual representation can be in any form or format, visual. A variation in the form, format, and order of a visual representation component is within the scope of the present invention. A visual representation can be updated or refreshed in substantially real time and can refer to being updated or refreshed in the highest level of development or state of the art. A visual representation can perform a function in substantially real time and can refer to being updated or refreshed in the highest level of development or state of the art.

A visual representation can display including but not limited to a conveyance service request, a conveyance service request metric, or a combination thereof, in a conveyance industry segment on a geographical map. A visual representation can be a tool that can display including but not limited to a conveyance service request, a conveyance service request metric, or a combination thereof, relating to a service provider on a geographical map. A visual representation can display a route from a representative or an AV to a beginning service geographical location and then to An ending service geographical location.

An AV owner/controller, a service provider, a good supplier, a fleet manager, a logistics provider, a logistics supplier, or a combination thereof, can be displayed on or with a visual representation that can display a level of service preference. An AV owner/controller, a service provider, a good supplier, a fleet manager, a logistics provider, a logistics supplier, or a combination thereof, can be displayed on or with a dynamic map that can display a level of service preference. An AV owner/controller, a service provider, a good supplier, a fleet manager, a logistics provider, a logistics supplier, or a combination thereof, can be displayed on or with a heat map that can display a level of service preference.

A visual representation can be including but not limited to a dynamic map, a substantially real time heat map, a historical heat map, a predictive heat map, or a combination thereof. A visual representation can be compiled on a third party server such as but not limited to a map provider server. A visual representation can be compiled with information or data from a map provider. A representative can use a visual representation to analyze or evaluate pricing information or another metric from a service provider.

A visual representation can utilize an application, an owner/controller application, an AV, a terminal, a central server, an external server, a link, or a combination thereof, that can be combined or integrated.

A visual representation can be used to analyze or evaluate an area on a geographical map that can show a metric relating to an individual conveyance industry segment. A visual representation can be used to analyze or evaluate an area on a geographical map that can show a metric relating to an individual service provider. A visual representation can be, for example, a geographical map that can display a substantially real time geographical location of an AV fleet. Application: The following are illustrative, non-limiting examples of an "application" as used in the present disclosure:

An application can be a software that can for example facilitate an operation or a function to secure a preferred conveyance service request, an AV that can be identified as preferred, or a combination thereof. An application can be a software that can for example be utilized or operated by An AV owner/controller, a service provider, a good supplier, a fleet manager, a logistics provider, a logistics supplier, or a combination thereof. An application can be a software for example a computer application, a computer program, an API, a website, a web application, a smartphone application, a cloud application, or a service.

An application can be but is not limited to software that can for example facilitate analyzing, evaluating, securing, obtaining, accepting, declining, canceling, displaying, communicating, or a combination thereof, a preferred conveyance service request in conjunction with corresponding conveyance data, all or some of preferred conveyance data relating to an AV, all or some of a substantially real time geographical location of an AV, or a combination thereof. An application can be provided in any form or format, such as but not limited to any appropriate tangible or intangible medium of expression, but can be provided in an electronic form. An application can be associated with, including but not limited to, a central server, a link, an external server, a good supplier, an AV, an owner/controller application, a service provider, An AV owner/controller, a good supplier, a fleet manager, a logistics provider, a logistics supplier, or a combination thereof.

An application can be software appropriate for communicating to or with including but not limited to a central server, an external server, a good supplier, an AV, a terminal, an owner/controller application, a service provider, An AV owner/controller, a good supplier, a fleet manager, a logistics provider, a logistics supplier, a representative, a conveyance client, or a combination thereof. An application can operate on including but not limited to a terminal, a central server, an external server, or a combination thereof. An application can standardize or convert a conveyance service request in conjunction with corresponding conveyance data, all or some of conveyance data relating to an AV, all or some of a substantially real time geographical location of an AV, or a combination thereof, structured in a different format, into a uniform format. A representative can input or provide a representative preference into an application.

An application can provide including but not limited to a substantially real time geographical location of a representative, a substantially real time geographical location of an AV, a substantially real time geographical location of a service provider, a substantially real time geographical location of a good supplier, a substantially real time geographical location of a fleet manager, a substantially real time geographical location of a logistics provider, a substantially real time geographical location of a logistics supplier, a substantially real time geographical location of An AV owner/controller, or a combination thereof, using a geographical location module of a terminal. Information and/or data inputted or discovered by an application can be cached. An application can be updated or refreshed in substantially real time and can refer to being updated or refreshed in the highest level of development or state of the art. An application can perform a function in substantially real time and can refer to being updated or refreshed in the highest level of development or state of the art.

An application can communicate information or data including but not limited to all or some of a preferred conveyance service request in conjunction with corresponding conveyance data, all or some of a filtered conveyance service request in conjunction with corresponding conveyance data, all or some of a conveyance service request in conjunction with corresponding conveyance data, all or some of preferred conveyance data relating to an AV, all or some of filtered conveyance data relating to an AV, all or some of conveyance data relating to an AV, all or some of a substantially real time geographical location of an AV, a representative preference, a selected preference, a secured or obtained preferred conveyance service request, a secured or obtained autonomous vehicle that can be identified as preferred, or a combination thereof. An application can communicate all or some of information or data with a central server, an external server, an application, an owner/controller application, an AV, or a combination thereof.

An application can filter and identify including but not limited to all or some of a preferred conveyance service request in conjunction with corresponding conveyance data, all or some of a filtered conveyance service request in conjunction with corresponding conveyance data, all or some of a conveyance service request in conjunction with corresponding conveyance data, all or some of preferred conveyance data relating to an AV, all or some of filtered conveyance data relating to an AV, all or some of conveyance data relating to an AV, all or some of a substantially real time geographical location of an AV, a representative preference, a selected preference, a secured or obtained preferred conveyance service request, a secured or obtained autonomous vehicle that can be identified as preferred, or a combination thereof, together or separately.

An application can be a software that can for example facilitate an operation or a function to secure a conveyance service request, a filtered conveyance service request, a preferred conveyance service request, an AV, an AV that can be filtered, an AV that can be identified as preferred, or a combination thereof.

An application can be used to analyze, evaluate, secure, obtain, accept, decline, cancel, or communicate a preferred conveyance service request, an AV that can be identified as preferred, all or some of preferred conveyance data relating to an AV, or a combination thereof. An application can be used by including but not limited to a representative, an AV, a service provider, a good supplier, An AV owner/controller, a fleet manager, a logistics provider, a logistics supplier, or a combination thereof. An application can be used, accessed, controlled, or operated by including but not limited to An AV owner/controller, a service provider, a good supplier, a fleet manager, a logistics provider, a logistics supplier, or a combination thereof, to optionally analyze or evaluate and then secure a preferred conveyance service request, an AV that can be identified as preferred, or a combination thereof.

An application can display a visual representation. An application can display a secured or obtained preferred conveyance service request, a secured or obtained autonomous vehicle that can be identified as preferred, all or some of preferred conveyance data relating to an AV, or a combination thereof. An application can display a preferred conveyance service request, an AV that can be identified as preferred, all or some of preferred conveyance data relating to an AV, or a combination thereof, that can be accepted or declined. An application can display conveyance data relating to including but not limited to a conveyance service request, a filtered conveyance service request, a preferred conveyance service request, or a combination thereof. An application can display all or some of conveyance data relating to an AV, all or some of filtered conveyance data relating to an AV, all or some of preferred conveyance data relating to an AV, or a combination thereof.

There can be a different variation of an application used by a representative, an AV, a service provider, a good supplier, An AV owner/controller, a fleet manager, a logistics provider, a logistics supplier, or a combination thereof. An application can transmit an Inertial Measurement Unit (IMU) reading of a terminal to a central server to determine an orientation or a direction of a representative, an AV, a service provider, a good supplier, An AV owner/controller, a fleet manager, a logistics provider, a logistics supplier, or a combination thereof. An application can be in a form of but is not limited to a mobile application, a non-mobile application, a website, a plugin, or a combination thereof.

An application can operate on a central server, an external server, an owner/controller application, or a combination thereof. An application can perform a central server function or an external server function. An application can perform a similar function as a central server or an external server function to identify a preferred conveyance service request, an AV that can be identified as preferred, all or some of preferred conveyance data relating to an AV, or a combination thereof. There can be a different application used by a representative, an AV, a service provider, a good supplier, An AV owner/controller, a fleet manager, a logistics provider, a logistics supplier, or a combination thereof.

A preferred conveyance service request in conjunction with corresponding conveyance data, an AV that can be identified as preferred, all or some of preferred conveyance data relating to an AV, or a combination thereof, can be transmitted to an application and can be displayed as a pop-up, an icon, a visual, a symbol, a pattern, a marker, a notification, an alert, a message, a short message service, a multimedia messaging service, a smart messaging service, an extended message service, or a combination thereof.

An application can secure a preferred conveyance service request, a filtered conveyance service request, a conveyance service request, an AV that can be identified as preferred, an AV that can be filtered, an AV, or a combination thereof, and can communicate directly or indirectly with a central server, an external server, an application, an owner/controller application, an AV, An AV owner/controller, a service provider, a good supplier, a fleet manager, a logistics provider, a logistics supplier, a third party, or a combination thereof.

An application can secure a preferred conveyance service request, a filtered conveyance service request, or a combination thereof, and can communicate indirectly with an external server via a central server. An application can secure a preferred conveyance service request, a filtered conveyance service request, or a combination thereof, and can communicate directly with an external server, or a service provider. An application can be a service provider application.

An application can secure an AV that can be identified as preferred, an AV that can be filtered, or a combination thereof, and can communicate indirectly with an external server via a central server. An application can secure an AV that can be identified as preferred, an AV that can be filtered, or a combination thereof, and can communicate directly with an external server, or a service provider. An application can be a service provider application, An AV owner/controller application, a good supplier application, a fleet manager application, a logistics provider application, a logistics supplier application, or a combination thereof.

One or more applications can be on or associated with an AV. Additional or multiple applications with different functions can reside on or be associated with one autonomous vehicle. For example, there can be two different applications on or associated with one autonomous vehicle, first being a dealership application allowing for vehicle maintenance and second an application integrated with a central server that facilitates conveyance services.

An application can be associated with an AV. An application can be associated with a fleet of AVs. An application can be accessed, controlled, or operated remotely by a service provider, An AV owner/controller, an AV, a good supplier, a fleet manager, a logistics provider, a logistics supplier, a representative, or a combination thereof, to optionally analyze or evaluate and then secure a preferred conveyance service request and/or an AV that can be identified as preferred. An application, an owner/controller application, an AV, a terminal, a central server, an external server, a link, or a combination thereof, can be combined or integrated.

A conveyance service request or all or some of conveyance data relating to an AV can be filtered in substantially real time on an application. A preferred conveyance service request can be identified in real time, from a filtered conveyance service request on an application. An AV that can be identified as preferred, all or some of preferred conveyance data relating to an AV, or a combination thereof, can be identified in substantially real time, from all or some of filtered conveyance data relating to an AV on an application. A representative can input or provide a representative preference into or to an application.

A different geographical location can be used other than a substantially real time geographical location of a representative when filtering a conveyance service request. A different geographical location can be used other than a substantially real time geographical location of an AV when filtering a conveyance service request. A different geographical location can be used other than a substantially real time geographical location of an AV when filtering all or some of conveyance data relating to an AV. An application can expose or be accessed through an API relating to a service provider, An AV owner/controller, a good supplier, a fleet manager, a logistics provider, a logistics supplier, or a third party.

The following are different examples of an application used by various parties:

A representative can access an application via a terminal. A representative can analyze or evaluate and then secure a preferred conveyance service request. An application can be used with a RAP to secure a preferred conveyance service request for a representative.

An AV can access an application via a terminal. A service provider, a good supplier, An AV owner/controller, a fleet manager, a logistics provider, a logistics supplier, or a combination thereof, can analyze or evaluate and then secure a preferred conveyance service request, an AV that can be identified as preferred, or a combination thereof.

An AV owner/controller, a service provider, a good supplier, a fleet manager, a logistics provider, a logistics supplier, a third party, or a combination thereof, can access an application to manage, control, and/or operate an AV.

An application can be used with an AVAP to secure a preferred conveyance service request for or with an AV that can be identified as preferred. An application can be used with an AVAP to secure an AV that can be identified as preferred for or with a preferred conveyance service request. An application can secure a preferred conveyance service request relating to a service provider operating in a conveyance industry segment. An application can secure an AV that can be identified as preferred relating to a fleet provider operating in a conveyance industry segment.

Owner/Controller Application: The following are illustrative, non-limiting examples of an "owner/controller application" as used in the present disclosure:

An owner/controller application can be a software that can for example facilitate an operation or a function to secure a preferred conveyance service request, an AV that can be identified as preferred, or a combination thereof. An owner/controller application can be a software that can for example be utilized or operated by An AV owner/controller, a service provider, a good supplier, a fleet manager, a logistics provider, a logistics supplier, or a combination thereof.

An owner/controller application can be a software for example a computer application, a computer program, an API, a website, a web application, a smartphone application, a cloud application, or a service. An owner/controller application can be software to facilitate analyzing, evaluating, securing, obtaining, accepting, declining, canceling, displaying, communicating, or a combination thereof, a preferred conveyance service request in conjunction with corresponding conveyance data, all or some of preferred conveyance data relating to an AV, all or some of a substantially real time geographical location of an AV, or a combination thereof, that can be used by an AV owner/controller, or a service provider. An owner/controller application can for example control or operate an AV or a fleet of AVs. An owner/controller application can be provided in any form or format, such as but not limited to any appropriate tangible or intangible medium of expression, but can be provided in electronic form.

An owner/controller application can be associated with including but not limited to a central server, an external server, a link, a good supplier, an AV, an application, a service provider, An AV owner/controller, a fleet manager, a logistics provider, a logistics supplier, or a combination thereof. An AV owner/controller, a service provider, a good supplier, a fleet manager, a logistics provider, a logistics supplier, or a combination thereof, can input or provide a selected preference into an owner/controller application.

An owner/controller application can operate on including but not limited to a terminal, a central server, an external server, or a combination thereof. An owner/controller application can be used in conjunction with or in addition to an application associated with an AV. Information and/or data inputted or discovered by an owner/controller application can be cached.

An owner/controller application can be updated or refreshed in substantially real time and can refer to being updated or refreshed in the highest level of development or state of the art. An owner/controller application can perform a function in substantially real time and can refer to being updated or refreshed in the highest level of development or state of the art.

An owner/controller application can communicate information or data including but not limited to all or some of a preferred conveyance service request in conjunction with corresponding conveyance data, all or some of a filtered conveyance service request in conjunction with corresponding conveyance data, all or some of a conveyance service request in conjunction with corresponding conveyance data, all or some of preferred conveyance data relating to an AV, all or some of filtered conveyance data relating to an AV, all or some of conveyance data relating to an AV, all or some of a substantially real time geographical location of an AV, a representative preference, a selected preference, a secured or obtained preferred conveyance service request, a secured or obtained autonomous vehicle that can be identified as preferred. An owner/controller application can communicate all or some of information or data with a central server, an external server, an application, an owner/controller application, an AV, or a combination thereof.

An owner/controller application can filter and identify including but not limited to all or some of a preferred conveyance service request in conjunction with corresponding conveyance data, all or some of a filtered conveyance service request in conjunction with corresponding conveyance data, all or some of a conveyance service request in conjunction with corresponding conveyance data, all or some of preferred conveyance data relating to an AV, all or some of filtered conveyance data relating to an AV, all or some of conveyance data relating to an AV, all or some of a substantially real time geographical location of an AV, a representative preference, a selected preference, a secured or obtained preferred conveyance service request, a secured or obtained autonomous vehicle that can be identified as preferred, or a combination thereof, together or separately.

An owner/controller application can be a software that can for example facilitate an operation or a function to secure a conveyance service request, a filtered conveyance service request, a preferred conveyance service request, an AV, an AV that can be filtered, an AV that can be identified as preferred, or a combination thereof.

An owner/controller application can secure a preferred conveyance service request, a filtered conveyance service request, a conveyance service request, an AV that can be identified as preferred, an AV that can be filtered, an AV, or a combination thereof, and can communicate directly or indirectly with a central server, an external server, an application, an owner/controller application, an AV, An AV owner/controller, a service provider, a good supplier, a fleet manager, a logistics provider, a logistics supplier, a third party, or a combination thereof.

An owner/controller application can be but is not limited to software that can for example be used to input or provide a selected preference. An owner/controller application can be used to analyze, evaluate, secure, obtain, accept, decline, cancel, or communicate a preferred conveyance service request, an AV that can be identified as preferred, all or some of preferred conveyance data relating to an AV, or a combination thereof. An owner/controller application can be used by including but not limited to a service provider, an AV, An AV owner/controller, a representative, a good supplier, a fleet manager, a logistics provider, a logistics supplier, or a combination thereof, to secure a preferred conveyance service request for or with an AV or an AV that can be identified as preferred. An owner/controller application can be used, accessed, controlled, or operated by including but not limited to a service provider, a good supplier, An AV owner/controller, a fleet manager, a logistics provider, a logistics supplier, or a combination thereof, remotely to secure a preferred conveyance service request, an AV that can be identified as preferred, or a combination thereof.

An owner/controller application can display a visual representation. An owner/controller application can display a secured or obtained preferred conveyance service request, a secured or obtained autonomous vehicle that can be identified as preferred, all or some of preferred conveyance data relating to an AV, or a combination thereof. An owner/controller application can display a preferred conveyance service request, an AV that can be identified as preferred, all or some of preferred conveyance data relating to an AV, or a combination thereof, that can be accepted or declined. An owner/controller application can display conveyance data relating to including but not limited to a conveyance service request, a filtered conveyance service request, a preferred conveyance service request, or a combination thereof. An owner/controller application can display all or some of conveyance data relating to an AV, all or some of filtered conveyance data relating to an AV, all or some of preferred conveyance data relating to an AV, or a combination thereof.

There can be different variations of an owner/controller application used by a representative, an AV, a service provider, a good supplier, an AV owner/controller, a fleet manager, a logistics provider, a logistics supplier, or a combination thereof. An owner/controller application can for example control or operate a fleet of AVs. An owner/controller application can be a service provider application, An AV owner/controller application, a good supplier application, a fleet manager application, a logistics provider application, a logistics supplier application, or a combination thereof.

A preferred conveyance service request in conjunction with corresponding conveyance data, an AV that can be identified as preferred, all or some of preferred conveyance data relating to an AV, or a combination thereof, can be transmitted to an owner/controller application and can be displayed as a pop-up, an icon, a visual, a symbol, a pattern, a marker, a notification, an alert, a message, a short message service, a multimedia messaging service, a smart messaging service, an extended message service, or a combination thereof.

An owner/controller application can perform a similar function as a central server, an application, or an external server, or a combination thereof, to identify a preferred conveyance service request, an AV that can be identified as preferred, all or some of preferred conveyance data relating to an AV, or a combination thereof. A function of a central server, an application, an external server, or a combination thereof, can be performed by an owner/controller application. An owner/controller application can operate on a central server, an application, an external server, or a combination thereof. An application, an owner/controller application, an AV, a terminal, a central server, an external server, a link, or a combination thereof, can be combined or integrated.

An owner/controller application can standardize or convert a conveyance service request in conjunction with corresponding conveyance data, all or some of conveyance data relating to an AV, all or some of a substantially real time geographical location of an AV, or a combination thereof, structured in a different format, into a uniform format. An owner/controller application can be associated with an AV. An owner/controller application can be associated with a fleet of AVs. An owner/controller application can be in a form of but is not limited to a mobile application, a non-mobile application, a website, a plugin, or a combination thereof.

A conveyance service request or all or some of conveyance data relating to an AV can be filtered in substantially real time on an owner/controller application. A preferred conveyance service request can be identified in substantially real time, from a filtered conveyance service request on an owner/controller application. An AV that can be identified as preferred, all or some of preferred conveyance data relating to an AV, or a combination thereof, can be identified in substantially real time, from all or some of filtered conveyance data relating to an AV on an owner/controller application.

An owner/controller application can secure a preferred conveyance service request, a filtered conveyance service request, or a combination thereof, and can communicate indirectly with an external server via a central server. An owner/controller application can secure a preferred conveyance service request, a filtered conveyance service request, or a combination thereof, and can communicate directly with an external server. An owner/controller application can secure a preferred conveyance service request, a filtered conveyance service request, or a combination thereof, and can communicate directly with a service provider. An owner/controller application can be a service provider application.

An owner/controller application can secure an AV that can be identified as preferred, an AV that can be filtered, or a combination thereof, and can communicate indirectly with an external server via a central server. An owner/controller application can secure an AV that can be identified as preferred, an AV that can be filtered, or a combination thereof, and can communicate directly with an external server, a service provider, An AV owner/controller, a good supplier, a fleet manager, a logistics provider, or a logistics supplier.

An owner/controller application can secure a preferred conveyance service request relating to a service provider operating in a conveyance industry segment. An owner/controller application can be accessed, controlled, or operated remotely by a service provider, An AV owner/controller, an AV, a good supplier, a fleet manager, a logistics provider, a logistics supplier, a representative, or a combination thereof, to optionally analyze or evaluate and then secure a preferred conveyance service request and/or an AV that can be identified as preferred. A representative can input or provide a selected preference into or to an owner/controller application.

An owner/controller application can expose or be accessed through an API relating to a service provider, An AV owner/controller, a good supplier, a fleet manager, a logistics provider, a logistics supplier, or a third party.

Terminal: The following are illustrative, non-limiting examples of a "terminal" as used in the present disclosure:

A terminal can be a hardware that can for example facilitate an operation or a function to secure a preferred conveyance service request, an AV that can be identified as preferred, or a combination thereof. A terminal can be a hardware that can for example be utilized or operated by An AV owner/controller, a service provider, a good supplier, a fleet manager, a logistics provider, a logistics supplier, or a combination thereof.

A terminal can be for example an AV that can be utilized to combine or integrate an application, an owner/controller application, a central server, an external server, a terminal, a link, or a combination thereof. A terminal can be but is not limited to a device that can for example facilitate operating an application. A terminal can for example be capable of communicating with a central server, an external server, an application, an owner/controller application, an AV, or a combination thereof, by way of a link. A terminal can be but is not limited to an electronic computing device that can include a computer processor, a computer readable memory, an input source, a geographical location module, a display, a network interface, or a combination thereof. A terminal can encompass hardware and/or software alone or in a combination.

A terminal can be used to access including but not limited to an application, an owner/controller application, or a combination thereof. An application can operate on a terminal. A terminal can be associated with an AV. A operating system can run on a terminal. A terminal can facilitate including but not limited to a display function, an input function, an operation, or a combination thereof, of an application. An application can provide a substantially real time geographical location of including but not limited to a representative, an AV, a service provider, a good supplier, a fleet manager, a logistics provider, a logistics supplier, An AV owner/controller, or a combination thereof, using a geographical location module of a terminal. A terminal can be associated with a display or a remote display.

A terminal can be but is not limited to a computer, a smartphone device, a plug-in device, a mobile computing device, a handheld computing device, a tablet computing device, a laptop computing device, a wearable computing device, a portable computing device, a fixed computing device, a non-fixed computing device, a physiologically embedded computing device, a biologically integrated computing device, an In-Vehicle infotainment device, an Internet of Things (IoT) device, a projecting device, a computing device embedded in a vehicle, a head-up display, a voice recognition, a voice control, or a combination thereof.

An Inertial Measurement Unit (IMU) reading of a terminal can be used to determine an orientation or a direction least one representative, an AV, a service provider, a good supplier, a fleet manager, a logistics provider, a logistics supplier, An AV owner/controller, or a combination thereof. A geographical location module of a terminal can include but is not limited to a Global Positioning System (GPS), a satellite tracking, a RFID tracking, a radiolocation, a WiFi positioning system, a geofencing, a global system for mobile communications, a cell phone triangulation, an Internet tracking, or a combination thereof.

A central server can optionally be located on a terminal that can be associated with an AV. An owner/controller application can optionally be located on a terminal. An input source of a terminal can be but is not limited to a touchscreen, a keypad, a keyboard, a voice controlled input, or a combination thereof. A visual representation can be displayed on an application using a display of a terminal. A terminal can be embedded in or attached to an AV. A terminal can be inside or outside of an AV. A terminal can be a smartphone that can be used by a representative, a conveyance client, An AV owner/controller, a service provider, a good supplier, a fleet manager, a logistics provider, a logistics supplier, or a combination thereof.

An application, an owner/controller application, a central server, an external server, a link, an AV, or a combination thereof, can be combined or integrated on a terminal, such as a smartphone. A terminal can be associated with a fleet of AVs. A terminal, using a geographical location module of a terminal, can provide a substantially real time geographical location of a fleet of AVs.

Link: The following are illustrative, non-limiting examples of a "link" as used in the present disclosure:

A link can be a software and/or a hardware that include an electronic communication network channel to allow an efficient, rapid, and/or accurate transmission of information or data. A link can be provided via the Internet and can be encrypted. The definition of a link can encompass hardware and/or software alone or in a combination.

A link can be in a form of a software interface or API. A link can be an inter-process communication. A link can be any appropriate connection, such as one or more of type of connection selected from WiFi, a wireless, an ethernet, LTE, 3G, 4G, 5G, 6G or 7G, RFID, Bluetooth, BLE, PAN, LAN, MAN, WAN, WLAN, GSM, GPRS, UMTS, dial-up, broadband, mobile, DSL, cable, wired, satellite, ISDN, fiber-optic, infrared, client-server network such as a cloud computing network, another appropriate method, means, hardware and/or software capable of conveying information, or a combination thereof.

Central Server: The following are illustrative, non-limiting examples and embodiments of "central server" as used in the present disclosure:

A central server can be a software and/or a hardware that can for example facilitate an operation or a function to secure a preferred conveyance service request, an AV that can be identified as preferred, or a combination thereof. A central server can be a software and/or a hardware that can for example be utilized or operated by An AV owner/controller, a service provider, a good supplier, a fleet manager, a logistics provider, a logistics supplier, a conveyance client, or a combination thereof. A central server can be a software and/or a hardware for example a computer application, a computer program, a website, a web application, a cloud application, or a service.

A central server can for example facilitate an operation or a function to secure a preferred conveyance service request for or with an AV, an AV that can be identified as preferred, or a combination thereof. A central server can include but is not limited to a computer processor, a computer readable memory, a network interface, or a combination thereof. A central server can be but is not limited to a computer network system. A central server can encompass hardware and/or software alone or in a combination.

A central server can be used to manage or operate logistics for a service provider, a good supplier, a fleet manager, an AV owner/controller, a third party, a logistics provider, a logistics supplier, or a combination thereof. A central server can be used to control, manage, or operate an AV for a service provider, a good supplier, a fleet manager, An AV owner/controller, a third party, a logistics provider, a logistics supplier, or a combination thereof. A central server can be associated with including but not limited to an external server, a link, a terminal, a central server, an owner/controller application, a good supplier, an AV, an application, a service provider, a fleet manager, a logistics provider, a logistics supplier, An AV owner/controller, a representative, a conveyance client, or a combination thereof.

A central server can encompass different hardware and/or software alone or in a combination. A central server can include or connect to a database. A computer readable memory of a central server can be or include a database that a central server can use or connect to. A central server can store, retrieve, or utilize any information or data from a database, a real time database, a near real time database, a database trigger, a database table, a database row, a database column, a database result set, a database node, a database edge, a database property, a blockchain, a blockchain technology, or a combination thereof. A central server can store or retrieve any information or data in a database, a schemaless database, a graph database, a relational database, a non-relational database, a distributed database, or a parallel database.

A central server can connect to or communicate with including but not limited to an application, an external server, a central server, an owner/controller application, a terminal, or a combination thereof, by way of a link. A central server can control a flow of information or data between including but not limited to an application, an owner/controller application, an external server, a central server, or a combination thereof, in either direction. A central server can be a server in an individual geographical location or an additional geographical location. A central server can relate to a single Internet location, but that need not be the case.

A central server can communicate information or data including but not limited to all or some of a preferred conveyance service request in conjunction with corresponding conveyance data, all or some of a filtered conveyance service request in conjunction with corresponding conveyance data, all or some of a conveyance service request in conjunction with corresponding conveyance data, all or some of preferred conveyance data relating to an AV, all or some of filtered conveyance data relating to an AV, all or some of conveyance data relating to an AV, all or some of a substantially real time geographical location of an AV, a representative preference, a selected preference, a secured or obtained preferred conveyance service request, a secured or obtained autonomous vehicle that can be identified as preferred. A central server can communicate all or some of information or data with a central server, an external server, an application, an owner/controller application, an AV, or a combination thereof.

A central server can filter and identify including but not limited to all or some of a preferred conveyance service request in conjunction with corresponding conveyance data, all or some of a filtered conveyance service request in conjunction with corresponding conveyance data, all or some of a conveyance service request in conjunction with corresponding conveyance data, all or some of preferred conveyance data relating to an AV, all or some of filtered conveyance data relating to an AV, all or some of conveyance data relating to an AV, all or some of a substantially real time geographical location of an AV, a representative preference, a selected preference, a secured or obtained preferred conveyance service request, a secured or obtained autonomous vehicle that can be identified as preferred, or a combination thereof, together or separately.

A central server can be a software and/or a hardware that can for example facilitate an operation or a function to secure a conveyance service request, a filtered conveyance service request, a preferred conveyance service request, an AV, an AV that can be filtered, an AV that can be identified as preferred, or a combination thereof.

A central server can secure a preferred conveyance service request, a filtered conveyance service request, a conveyance service request, an AV that can be identified as preferred, an AV that can be filtered, an AV, or a combination thereof, and can communicate directly or indirectly with a central server, an external server, an application, an owner/controller application, a terminal, an AV, An AV owner/controller, a service provider, a good supplier, a fleet manager, a logistics provider, a logistics supplier, a third party, or a combination thereof.

A central server can standardize or convert a conveyance service request, all or some of conveyance data relating to an AV, all or some of a substantially real time geographical location of an AV, or a combination thereof, structured in a different format, into a uniform format. A central server can be a secure server. A central server can be made secure using hardware and/or software commercially available. Additionally, a central server can include encryption software such that communications entering or exiting a server are encrypted. Encryption hardware and/or software are commercially available. A central server can be updated or refreshed in substantially real time and can refer to being updated or refreshed in the highest level of development or state of the art. A central server can perform a function in substantially real time and can refer to being updated or refreshed in the highest level of development or state of the art. A central server can use machine learning technology to identify a pattern that can improve an AVAP, a RAP, a visual representation, or a combination thereof.

A central server can use a database, a database table, or a result set to filter a conveyance service request. A central server can use a database, a database table, or a result set to identify a preferred conveyance service request. A central server can use a database to filter all or some of conveyance data relating to an AV. A central server can use a database, a database table, or a result set to identify an AV that can be identified as preferred. A central server can use a database, a database table, or a result set, to identify all or some of preferred conveyance data relating to an AV.

A central server can filter a conveyance service request or all or some of conveyance data relating to an AV relating to a representative preference and a substantially real time geographical location of a representative, to identify a filtered conveyance service request or all or some of filtered conveyance data relating to an AV by a process including but not limited to a of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

A central server can filter a conveyance service request or all or some of conveyance data relating to an AV relating to a representative preference, to identify a filtered conveyance service request or all or some of filtered conveyance data relating to an AV by a process including but not limited to a of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

A central server can filter a conveyance service request or all or some of conveyance data relating to an AV relating to a selected preference and a substantially real time geographical location of an AV, to identify a filtered conveyance service request or all or some of filtered conveyance data relating to an AV by a process including but not limited to a of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

A central server can filter a conveyance service request or all or some of conveyance data relating to an AV relating to a selected preference, to identify a filtered conveyance service request or all or some of filtered conveyance data relating to an AV by a process including but not limited to a of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

A central server can filter and identify a preferred conveyance service request first and then filter and identify an AV that can be identified as preferred, which can be matched together and secured or obtained to perform a conveyance service. A central server can filter and identify an AV that can be identified as preferred first and then filter and identify a preferred conveyance service request, which can be matched together and secured or obtained to perform a conveyance service. Filtering and identifying a preferred conveyance service request, an AV that can be identified as preferred, or a combination thereof, can be done in either order or either direction.

A central server can filter or categorize a conveyance service request, all or some of conveyance data relating to an AV, all or some of a substantially real time geographical location of an AV, or a combination thereof, upon being received. A central server can filter a conveyance service request, all or some of conveyance data relating to an AV, or a combination thereof, more than once. A central server can, including but not limited to, receive, transmit, store, standardize, aggregate, or a combination thereof, a conveyance service request in any order prior to filtering a conveyance service request or all or some of conveyance data relating to an AV. A central server can, including but not limited to, receive, transmit, store, standardize, aggregate, or a combination thereof, all or some of conveyance data relating to an AV or all or some of a substantially real time geographical location of an AV, in any order prior to filtering a conveyance service request or all or some of conveyance data relating to an AV.

A central server can identify a preferred conveyance service request from a filtered conveyance service request or a pre-filtered conveyance service request. A central server can identify all or some of preferred conveyance data relating to an AV from all or some of filtered conveyance data relating to an AV or all or some of pre-filtered conveyance data relating to an AV. A central server can identify an AV that can be identified as preferred from all or some of filtered conveyance data relating to an AV or all or some of pre-filtered conveyance data relating to an AV.

A preferred conveyance service request relating to a representative preference or a selected preference can be identified from a filtered conveyance service request by using including but not limited to a sorting algorithm, a selection algorithm, a search algorithm, a merge algorithm, a maximum function, a minimum function, a graph algorithm, a graph search algorithm, a tree algorithm, a tree search algorithm, a matrix calculation, a matrix algorithm, a comparison, or a combination thereof.

A preferred conveyance service request relating to a selected preference can be identified from all or some of plurality of filtered conveyance service requests, an AV that can be identified as preferred or all or some of preferred conveyance data relating to an AV, relating to a selected preference from or all or some of filtered conveyance data relating to an AV, or a combination thereof, by using a sorting algorithm, a selection algorithm, a search algorithm, a merge algorithm, a maximum function, a minimum function, a graph algorithm, a graph search algorithm, a tree algorithm, a tree search algorithm, a matrix calculation, a matrix algorithm, a comparison, or a combination thereof.

A central server can sort a filtered conveyance service request or all or some of filtered conveyance data relating to an AV using a representative preference or a selected preference to identify a preferred conveyance service request, an AV that can be identified as preferred, all or some of preferred conveyance data relating to an AV, or a combination thereof.

A central server can sort a filtered conveyance service request in an order relating to a weighted average of a representative preference to identify a preferred conveyance service request. A central server can sort a filtered conveyance service request in an order relating to a weighted average of a selected preference to identify a preferred conveyance service request. A weighted average of a selected preference can be used to identify all or some of preferred conveyance data relating to an AV or an AV that can be identified as preferred from all or some of filtered conveyance data relating to an AV, a preferred conveyance service request that can be identified from all or some of plurality of filtered conveyance service requests, or a combination thereof.

A central server can process or facilitate including but not limited to a conveyance service request, a filtered conveyance service request, a preferred conveyance service request, all or some of conveyance data relating to an AV, all or some of filtered conveyance data relating to an AV, all or some of preferred conveyance data relating to an AV, an AV that can be identified as preferred, or a combination thereof, relating to a service provider operating in a conveyance industry segment. A central server can use or have a default representative preference, a default selected preference, or a combination thereof.

When a RAP or an AVAP is used, a central server can analyze or evaluate a conveyance service request or all or some of conveyance data relating to an AV in substantially real time. A conveyance service request can be filtered by using a representative preference or a selected preference and a substantially real time geographical location of a representative or an AV respectively. All or some of conveyance data relating to an AV can be filtered by using a selected preference and a substantially real time geographical location of an AV.

If a conveyance service request is pre-filtered or pre-categorized, then a conveyance service request can be perceived or referred to as a filtered conveyance service request and a central server can identify a preferred conveyance service request. If all or some of conveyance data relating to an AV is pre-filtered or pre-categorized, then all or some of conveyance data relating to an AV can be perceived or referred to as all or some of filtered conveyance data relating to an AV and a central server can identify all or some of preferred conveyance data relating to an AV, an AV that can be identified as preferred, or a combination thereof.

A filtered conveyance service request can be sorted relating to a weighted average of a representative preference or a selected preference, however, sorting is not required to identify a preferred conveyance service request respectively. All or some of filtered conveyance data relating to an AV can be sorted relating to a weighted average of a selected preference, however, sorting is not required to identify all or some of preferred conveyance data relating to an AV, an AV that can be identified as preferred, or a combination thereof. A preferred conveyance service request can be identified and then secured or obtained. An AV that can be identified as preferred, all or some of preferred conveyance data relating to an AV, or a combination thereof, can be identified and then secured or obtained.

A computer readable memory of a central server can be but is not limited to a database, a database table, a database result set, a cloud storage, a hard disk drive, a solid state drive, an optical disk drive, a flash memory, a Random Access Memory (RAM), or a tape.

A central server can include a distinct server operably linked in the same or a different geographical location. A central server can optionally be part of a terminal. A central server can optionally be part of an application or an owner/controller application. A central server can optionally be located on a terminal. An application, an owner/controller application, or a combination thereof, can optionally operate on a central server. A function of a central server or an external server can be performed by an application, an owner/controller application, or a combination thereof. A function of an application, an owner/controller application, or a combination thereof, can be performed by a central server or an external server. A function of a central server can be performed by an external server. A central server can include or utilize quantum computing. A central server can include or utilize a neural network. A central server can include or utilize machine learning technology. A central server can be dispersed or located across a geographical location such as Los Angeles and New York.

A central server can aggregate a conveyance service request, all or some of conveyance data relating to an AV, or a combination thereof, within a service provider, An AV owner/controller, a good supplier, a fleet manager, a logistics provider, a logistics supplier, or a combination thereof. A central server can process or facilitate a conveyance service request, a filtered conveyance service request, a preferred conveyance service request, all or some of conveyance data relating to an AV, all or some of filtered conveyance data relating to an AV, all or some of preferred conveyance data relating to an AV, an AV that can be identified as preferred, or a combination thereof, from an individual service provider relating to an individual conveyance industry segment. A central server can compile a visual representation to be transmitted to an application or an owner/controller application. A central server can control or operate a fleet of AVs. An application, an owner/controller application, an AV, a terminal, a central server, an external server, a link, or a combination thereof, can be combined or integrated.

A conveyance service request, all or some of conveyance data relating to an AV, all or some of a substantially real time geographical location of an AV, or a combination thereof, can be transmitted from an external server to a central server by way of a link. A conveyance service request, all or some of conveyance data relating to an AV, all or some of a substantially real time geographical location of an AV, or a combination thereof, can be transmitted from a service provider, An AV owner/controller, a good supplier, a fleet manager, a logistics provider, a logistics supplier, or a combination thereof, to a central server by way of a link. A conveyance service request, all or some of conveyance data relating to an AV, all or some of a substantially real time geographical location of an AV, or a combination thereof, can be structured in a uniform format prior to being transmitted from an external server and is not needed to be standardized.

A central server can execute a function for a representative and/or an AV including but not limited to receiving, storing, standardizing, aggregating, filtering, and sorting, a conveyance service request in conjunction with corresponding conveyance data, and securing or obtaining a preferred conveyance service request. A central server can execute a function of the present invention for An AV owner/controller including but not limited to receiving, storing, standardizing, aggregating, filtering, and sorting, all or some of conveyance data relating to an AV, and securing or obtaining an AV that can be identified as preferred.

A different geographical location can be used other than a substantially real time geographical location of a representative or a substantially real time geographical location of an AV when filtering a conveyance service request, all or some of conveyance data relating to an AV, or a combination thereof.

A representative preference, a substantially real time geographical location of a representative, or a combination thereof, can be transmitted to a central server at any time prior to filtering a conveyance service request. A selected preference, a substantially real time geographical location of an AV, all or some of conveyance data relating to an AV, or a combination thereof, can be transmitted to a central server at any time prior to filtering a conveyance service request.

A central server can use an equal weight or an unequal weight for a representative preference when calculating a weighted average to identify a preferred conveyance service request. A central server can use an equal weight or an unequal weight for a selected preference when calculating a weighted average to identify a preferred conveyance service request, an AV that can be identified as preferred, all or some of preferred conveyance data relating to an AV, or a combination thereof.

When a central server receives a conveyance service request, a central server can categorize or pre-filter a conveyance service request. A central server can obtain or receive a pre-filtered or a pre-categorized conveyance service request relating to a geographical area. A central server can obtain or receive a pre-filtered or a pre-categorized conveyance service request relating to a level of service. A conveyance service request can be pre-filtered or pre-categorized on a central server based on a geographical area. A conveyance service request can be pre-filtered or pre-categorized on a central server based on a level of service.

When a central server receives all or some of conveyance data relating to an AV, a central server can categorize or pre-filter all or some of conveyance data relating to an AV. A central server can obtain or receive all or some of a pre-filtered conveyance data relating to an AV, or all or some of a pre-categorized conveyance data relating to an AV, relating to a geographical area. A central server can obtain or receive all or some of a pre-filtered conveyance data relating to an AV or all or some of a pre-categorized conveyance data relating to an AV, relating to a level of service. All or some of conveyance data relating to an AV can be pre-filtered or pre-categorized on a central server based on a geographical area. All or some of conveyance data relating to an AV can be pre-filtered or pre-categorized on a central server based on a level of service.

A conveyance service request or all or some of conveyance data relating to an AV can be filtered based on a representative preference, a selected preference, or a combination thereof, on a central server after being pre-filtered or pre-categorized.

When a central server obtains a pre-filtered conveyance service request, a central server can compare a pre-filtered conveyance service request to a representative preference or a selected preference to identify a filtered conveyance service request. When a central server obtains a pre-filtered autonomous vehicle, a central server can compare all or some of pre-filtered conveyance data relating to an AV to a selected preference to identify all or some of filtered conveyance data relating to an AV.

If a conveyance service request is pre-filtered, then a conveyance service request is not filtered. A pre-filtered conveyance service request can be perceived or referred to as a filtered conveyance service request. A central server can filter a conveyance service request at least once. A central server can sort a conveyance service request at least once to identify a preferred conveyance service request. A central server can filter a conveyance service request more than once based on a pricing preference and then a service provider preference. A conveyance service request can be categorized by a geographical location after being received on a central server.

If all or some of conveyance data relating to an AV is pre-filtered, then all or some of conveyance data relating to an AV is not filtered. All or some of pre-filtered conveyance data relating to an AV can be perceived or referred to as all or some of filtered conveyance data relating to an AV. A central server can filter all or some of conveyance data relating to an AV at least once. A central server can sort all or some of conveyance data relating to an AV at least once, to identify an AV that can be identified as preferred, all or some of preferred conveyance data relating to an AV, or a combination thereof. A central server can filter all or some of conveyance data relating to an AV more than once based on a pricing preference and then a good supplier preference. All or some of conveyance data relating to an AV can be categorized by a geographical location after being received on a central server. All or some of pre-filtered conveyance data relating to an AV can be pre-filtered, filtered again, or a combination thereof, including all or some of a substantially real time geographical location of an AV.

A filtered conveyance service request can be sorted in ascending or descending order relating to a weighted average of a representative preference or a weighted average of a selected preference to identify a preferred conveyance service request. All or some of filtered conveyance data relating to an AV can be sorted in ascending or descending order relating to a weighted average of a selected preference to identify an AV that can be identified as preferred, all or some of preferred conveyance data relating to an AV, or a combination thereof.

A preferred conveyance service request in conjunction with corresponding conveyance data, a filtered conveyance service request in conjunction with corresponding conveyance data, all or some of preferred conveyance data relating to an AV, all or some of filtered conveyance data relating to an AV, all or some of conveyance data relating to an AV, or a combination thereof, can be identified or updated in substantially real time as a substantially real time geographical location of a representative or an AV updates or changes.

A preferred conveyance service request in conjunction with corresponding conveyance data, all or some of plurality of filtered conveyance service requests in conjunction with corresponding conveyance data, all or some of plurality of conveyance service requests in conjunction with corresponding conveyance data, all or some of preferred conveyance data relating to an AV, all or some of filtered conveyance data relating to an AV, all or some of conveyance data relating to an AV, a representative preference, a selected preference, a secured or obtained preferred conveyance service request, a secured or obtained autonomous vehicle that is identified as preferred, or a combination thereof, can be identified or updated in substantially real time as traffic information updates or changes.

A central server can secure a preferred conveyance service request, a filtered conveyance service request, an AV that can be identified as preferred, an AV that can be filtered, or a combination thereof, and can communicate directly with an external server, a central server, a service provider, An AV owner/controller, a good supplier, a fleet manager, a logistics provider, a logistics supplier, or a combination thereof.

A secured or obtained preferred conveyance service request or a secured or obtained autonomous vehicle that can be identified as preferred, can be sent to including but not limited to a service provider, an external server, a central server, a good supplier, a fleet manager, a logistics provider, a logistics supplier, An AV owner/controller, an owner/controller application, an application, an AV, a representative, a conveyance client, or a combination thereof.

A central server can be used to manage logistics on the front-end or back-end for a service provider, a good supplier, a fleet manager, An AV owner/controller, a third party, a logistics provider, or a logistics supplier. A central server can be used to control or operate an AV on the front-end or back-end for a service provider, a good supplier, a fleet manager, An AV owner/controller, a third party, a logistics provider, a logistics supplier, or a combination thereof. A central server can be used by a fleet manager to manage logistics on the back-end for a service provider. A central server can be used by a service provider to manage logistics on the back-end for an OEM or an auto manufacturer. A central server can be used by a service provider to manage logistics on the back-end for a fleet of AVs. A central server can be used by An AV owner/controller to manage logistics for a private owner of an AV. A central server can be used by An AV owner/controller to manage logistics for a fleet manager.

A central server can receive, store, standardize, aggregate, transmit, filter, identify, or a combination thereof, a conveyance service request or all or some of conveyance data relating to an AV in a database, a database table, or a database result set. A central server can receive, store, standardize, aggregate, transmit, filter, identify, or a combination thereof, and then secure a preferred conveyance service request or an AV that can be identified as preferred in a database, a database table, or a database result set. When securing or obtaining an AV that can be identified as preferred, all or some of preferred conveyance data relating to an AV can optionally be secured or obtained.

A central server can categorize or pre-categorize conveyance service requests with corresponding conveyance data in a database, a database table, a database result set, or a combination thereof. A central server can categorize or pre-categorize a fleet of autonomous vehicles with corresponding conveyance data based on conveyance data corresponding to each individual autonomous vehicle in a database, a database table, a database result set, or a combination thereof. A central server can categorize or pre-categorize all or some of conveyance data relating to an AV fleet as a whole in a database, a database table, a database result set, or a combination thereof. A central server can categorize or pre-categorize a fleet of autonomous vehicles with corresponding conveyance data based on conveyance data corresponding with each individual autonomous vehicle in a database, a database table, a database result set, or a combination thereof. A central server can categorize or pre-categorize a fleet of autonomous vehicles with corresponding conveyance data as a whole in a database, a database table, a database result set, or a combination thereof.

A central server can use a graph database to identify a preferred conveyance service request for or with an AV, an AV that can be identified as preferred, or a combination thereof, that can be in the closest proximity. A central server can utilize a directed graph or an undirected graph with a node and/or an edge to identify an AV within the shortest travel time to or for a preferred conveyance service request.

For example, two autonomous vehicles with corresponding conveyance data can be stored or categorized in two different databases, two different database tables, or two different database result sets, based on a conveyance industry segment preference and all or some of conveyance service requests can be stored or categorized in another database, another database table, or another database result set. Continuing with this non-limiting example, a central server can have or use three different databases, different database tables, or different database result sets to filter and identify preferred conveyance service requests to be secured or obtained for or with both autonomous vehicles. Continuing with this non-limiting example, a central server can have or use a database or a database table, where a central server can have or use three different queries, but an underlying database table is still the same or unchanged.

A central server can filter a conveyance service request or all or some of conveyance data relating to an AV, from a database or a database table, and a database result set can identify a filtered conveyance service request or all or some of filtered conveyance data relating to an AV. A central server can identify a preferred conveyance service request or all or some of preferred conveyance data relating to an AV, from a database or a database table, and a database result set can identify a preferred conveyance service request or all or some of preferred conveyance data relating to an AV.

AV owner/controller or a fleet manager can use, for example, multiple selected preferences for each database, database table, or database result set when filtering and identifying preferred conveyance service requests to be secured or obtained for or with both autonomous vehicles. AV owner/controller or a fleet manager can use, for example, multiple selected preferences for each database, database table, or database result set when filtering and identifying two autonomous vehicles that can be identified as preferred to be secured or obtained for or with both preferred conveyance service requests.

A central server can filter conveyance service requests, all or some of conveyance data relating to an AV, or combination thereof, utilizing a step process. A central server can filter conveyance service requests using a two step process to first filter conveyance service requests based on a selected preference and then filter a subset of conveyance service requests based on a substantially real time geographical location of an AV. A central server can filter conveyance service requests using a two step process to first filter conveyance service requests based on a substantially real time geographical location of an AV and then filter a subset of conveyance service requests based on a selected preference. A central server can filter conveyance service requests using a two step process to first filter conveyance service requests based on a selected preference and then filter a subset of conveyance service requests based on a different selected preference.

A central server can filter all or some of conveyance data relating to an AV using a two step process to first filter all or some of conveyance data relating to an AV based on a selected preference and then filter a subset of all or some of conveyance data relating to an AV based on a substantially real time geographical location of an AV. A central server can filter all or some of conveyance data relating to an AV using a two step process to first filter all or some of conveyance data relating to an AV based a substantially real time geographical location of an AV and then filter a subset of all or some of conveyance data relating to an AV based on a selected preference. A central server can filter all or some of conveyance data relating to an AV using a two step process to first filter all or some of conveyance data relating to an AV based on a selected preference and then filter a subset of all or some of conveyance data relating to an AV based on a different selected preference.

A central server can filter and identify multiple preferred conveyance service requests, a fleet of autonomous vehicles that can be identified as preferred, or a combination thereof, that can be matched together and secured or obtained to perform multiple conveyance services. A central server can filter and identify multiple preferred conveyance service requests first and then filter and identify multiple autonomous vehicles that can be identified as preferred, which can be matched together and secured or obtained to perform multiple conveyance services. A central server can filter and identify multiple autonomous vehicles that can be identified as preferred first and then filter and identify multiple preferred conveyance service requests, which can be matched together and secured or obtained to perform multiple conveyance services.

A central server can filter a conveyance service request in conjunction with corresponding conveyance data, all or some of conveyance data relating to an AV, or a combination thereof, in any order. A central server can identify a preferred conveyance service request in conjunction with corresponding conveyance data, an AV that can be identified as preferred, all or some of preferred conveyance data relating to an AV, or a combination thereof, in any order. A central server can secure a preferred conveyance service request in conjunction with corresponding conveyance data, an AV that can be identified as preferred, or a combination thereof, in any order. A central server can use or apply a second selected preference and a process can optionally be referred to or seen as an additional level of filtering.

A central server can use machine learning technology to identify a pattern and an AVAP can add a more autonomous vehicle in a specific area around 9 PM due to an identified pattern of increased conveyance service demand. A central server can use machine learning technology to identify a pattern based on a correlation relating to conveyance data. A central server can identify a correlation between traffic congestion and a time of the day. An application, an owner/controller application, an external server, or a combination thereof, can operate on a central server.

A central server can unsecure or cancel a secured or obtained preferred conveyance service request or a secured or obtained filtered conveyance service request if a better preferred conveyance service request or a better filtered conveyance service request becomes available such as but not limited to in substantially real time. A central server can unsecure or cancel a secured or obtained autonomous vehicle that can be identified as preferred or a secured or obtained autonomous vehicle that can be filtered if a better autonomous vehicle that can be identified as preferred or a better autonomous vehicle that can be filtered becomes available such as but not limited to in substantially real time. A central server can unsecure or cancel an AV that can be identified as preferred if an AV that can be identified as preferred is or becomes unavailable. A central server can have or be associated with a database based on a data point.

A central server relating to a service provider, An AV owner/controller, a good supplier, a fleet manager, a logistics provider, a logistics supplier, or a combination thereof, can secure a preferred conveyance service request, an AV that can be identified as preferred, or a combination thereof, and can facilitate and communicate with a central server relating or belonging to a third party. A central server relating to a service provider, an AV owner/controller, a good supplier, a fleet manager, a logistics provider, a logistics supplier, or a combination thereof, can secure a preferred conveyance service request, an AV that can be identified as preferred, or a combination thereof, and can facilitate and communicate with another central server associated with another service provider, AV owner/controller, good supplier, fleet manager, logistics provider, or logistics supplier. An AV that can be identified as preferred can be secured concurrently for or with more than one preferred conveyance service requests.

System: The following are illustrative, non-limiting examples of a "system" as used in the present disclosure:

A system can be but is not limited to a collection of elements that can for example secure a preferred conveyance service request, an AV that can be identified as preferred, or a combination thereof. A system can be but is not limited to a collection of elements of the present invention, where an element can be associated or integrated with another element. The collection of elements or individual elements can be in the same or different locations. A system can be but is not limited to a computer program product. A system may be a rules-based system.

A conveyance client, an application, an owner/controller application, a representative, an AV, a fleet of AVs, an AV that can be filtered, an AV that can be identified as preferred, a fleet manager, a logistics provider, a logistics supplier, an AV owner/controller, a terminal, a link, a central server, an external server, a service provider, a good supplier, a RAP, an AVAP, a visual representation, a representative preference, a selected preference, conveyance data, conveyance data relating to an AV, filtered conveyance data relating to an AV, preferred conveyance data relating to an AV, a conveyance service request, a filtered conveyance service request, and a preferred conveyance service request can all be in a similar geographical location, or spread out in a distant location, including a cross-border location.

A system can be used to analyze or evaluate and secure a preferred conveyance service request, an AV that can be identified as preferred, or a combination thereof, relating to a service provider operating in a conveyance industry segment. A system can be updated or refreshed in substantially real time and can refer to being updated or refreshed in the highest level of development or state of the art. A system can perform a function in substantially real time and can refer to being updated or refreshed in the highest level of development or state of the art.

Method: The following are illustrative, non-limiting examples of a "method" as used in the present disclosure:

A method can be but is not limited to a collection of elements of the present invention that can for example secure a preferred conveyance service request, an AV that can be identified as preferred, or a combination thereof. A method can be but is not limited to a collection of elements of the present invention, where an element can be associated or integrated with another element. The collection of elements or individual elements can be in the same or different locations. A method can be but is not limited to a computer program product. A method can be but is not limited to a rules based method.

A conveyance client, an application, an owner/controller application, a representative, an AV, a fleet of AVs, an AV, an AV that can be filtered, an AV that can be identified as preferred, a fleet manager, a logistics provider, a logistics supplier, An AV owner/controller, a terminal, a link, a central server, an external server, a service provider, a good supplier, a RAP, an AVAP, a visual representation, a representative preference, a selected preference, conveyance data, conveyance data relating to an AV, filtered conveyance data relating to an AV, preferred conveyance data relating to an AV, a conveyance service request, a filtered conveyance service request, and a preferred conveyance service request can all be in a similar geographical location, or spread out in a distant location, including a cross-border location.

A method can be used to analyze or evaluate and secure a preferred conveyance service request, an AV that can be identified as preferred, or a combination thereof, relating to a service provider operating in a conveyance industry segment. A method can be updated or refreshed in substantially real time and can refer to being updated or refreshed in the highest level of development or state of the art. A method can perform a function in substantially real time and can refer to being updated or refreshed in the highest level of development or state of the art.

External Server: The following are illustrative, non-limiting examples and embodiments of "external server" as used in the present disclosure:

An external server can be a software and/or a hardware that can for example facilitate an operation or a function to secure a preferred conveyance service request, an AV that can be identified as preferred, or a combination thereof. An external server can be a software and/or a hardware that can for example be utilized or operated by an AV owner/controller, a service provider, a good supplier, a fleet manager, a logistics provider, a logistics supplier, or a combination thereof. An external server can be a software and/or a hardware for example a computer application, a computer program, an API, a website, a web application, a smartphone application, a cloud application, or a service.

An external server can communicate information or data including but not limited to all or some of a preferred conveyance service request in conjunction with corresponding conveyance data, all or some of a filtered conveyance service request in conjunction with corresponding conveyance data, all or some of a conveyance service request in conjunction with corresponding conveyance data, all or some of preferred conveyance data relating to an AV, all or some of filtered conveyance data relating to an AV, all or some of conveyance data relating to an AV, all or some of a substantially real time geographical location of an AV, a representative preference, a selected preference, a secured or obtained preferred conveyance service request, a secured or obtained autonomous vehicle that can be identified as preferred. An external server can communicate all or some of information or data with a central server, an external server, an application, an owner/controller application, an AV, or a combination thereof.

An external server can be a software and/or a hardware that can for example facilitate an operation or a function to secure a conveyance service request, a filtered conveyance service request, a preferred conveyance service request, an AV, an AV that can be filtered, an AV that can be identified as preferred, or a combination thereof.

An external server can expose or be accessed through an API relating to a service provider, An AV owner/controller, a good supplier, a fleet manager, a logistics provider, a logistics supplier, or a third party.

All or some of conveyance data relating to an AV can be sourced or provided by an external server that can be associated with a service provider, a good supplier, a fleet manager, a logistics provider, a logistics supplier, An AV owner/controller, or a combination thereof. All or some of conveyance data relating to an AV can be sourced or provided by an external server that can also have or provide a conveyance service request in conjunction with corresponding conveyance data. All or some of conveyance data relating to an AV can be sourced or provided by an external server that does not have or does not provide a conveyance service request in conjunction with corresponding conveyance data. An AV, all or some of conveyance data relating to an AV, or a combination thereof, can be sourced or provided by a third party.

An external server can include but is not limited to a source of a conveyance service request in conjunction with corresponding conveyance data, all or some of conveyance data relating to an AV, or a combination thereof. An external server can be for example a source of a substantially real time conveyance service request, a source of all or some of conveyance data relating to an AV, or a combination thereof. An external server can be but is not limited to a computer network system. An external server can include but is not limited to a computer processor, a computer readable memory, and a network interface. An external server can encompass hardware and/or software alone or in a combination.

An AV can be sourced or provided by an external server that can be associated with a service provider, a good supplier, a fleet manager, An AV owner/controller, a logistics provider, a logistics supplier, or a combination thereof. An AV can be sourced or provided by an external server that can also source or provide a conveyance service request. An AV can be sourced or provided by an external server that does not have or does not provide a conveyance service request.

All or some of conveyance data relating to an AV can be sourced or provided by an external server that can be associated with a service provider, a good supplier, a fleet manager, An AV owner/controller, a logistics provider, a logistics supplier, or a combination thereof. All or some of conveyance data relating to an AV can be sourced or provided by an external server that can also have or provide a conveyance service request. All or some of conveyance data relating to an AV can be sourced or provided by an external server that does not have or does not provide a conveyance service request.

All or some of conveyance data relating to an AV can be transmitted to or communicated with a central server, an external server, an application, an application that can be associated with an AV, an owner/controller application, a terminal, an AV, An AV owner/controller, a service provider, a good supplier, a fleet manager, a logistics provider, a logistics supplier, or a combination thereof.

All or some of filtered conveyance data relating to an AV can be transmitted to or communicated with a central server, an external server, an application, an application that can be associated with an AV, an owner/controller application, a terminal, an AV, An AV owner/controller, a service provider, a good supplier, a fleet manager, a logistics provider, a logistics supplier, or a combination thereof.

All or some of preferred conveyance data relating to an AV can be transmitted to or communicated with a central server, an external server, an application, an application that can be associated with an AV, an owner/controller application, a terminal, an AV, An AV owner/controller, a service provider, a good supplier, a fleet manager, a logistics provider, a logistics supplier, or a combination thereof.

An AV can communicate with an external server through a central server. An AV can communicate with An AV owner/controller, a service provider, a good supplier, a fleet manager, a logistics provider, a logistics supplier, a conveyance client, or a combination thereof, through or by a central server, an application, or an external server. An AV can communicate with an external server or a central server through or by an application. An AV can communicate with An AV owner/controller, a service provider, a good supplier, a fleet manager, a logistics provider, a logistics supplier, a conveyance client, or a combination thereof, using a link between an application associated with an AV and a central server. An AV can communicate with An AV owner/controller, a service provider, a good supplier, a fleet manager, a logistics provider, a logistics supplier, a conveyance client, or a combination thereof, using a link between an application associated with an AV and an external server. An AV can communicate with an external server or a central server through or by an owner/controller application.

A preferred conveyance service request, an AV that can be identified as preferred, or a combination thereof, can be secured or obtained through or by a central server, an application, an owner/controller application, an external server, or a combination thereof. A preferred conveyance service request, an AV that can be identified as preferred, or a combination thereof, can be secured or obtained by a central server or an external server through an application associated with an AV. A preferred conveyance service request, an AV that can be identified as preferred, or a combination thereof, can be secured or obtained and transmitted between an application associated with an AV and a central server by way of a link. A preferred conveyance service request, an AV that can be identified as preferred, or a combination thereof, can be secured or obtained and transmitted between an application associated with an AV and an external server through a central server by way of a link. A preferred conveyance service request, an AV that can be identified as preferred, or a combination thereof, can be secured or obtained and transmitted between an application associated with an AV and an external server by way of a link. A preferred conveyance service request, an AV that can be identified as preferred, or a combination thereof, can be secured or obtained through or by an owner/controller application.

An external server can have or be associated with a database based on a data point. An external server can have or be associated with a database for a conveyance service request, all or some of conveyance data relating to an AV, or a combination thereof. An external server can have or be associated with a database based on a selected preference or a representative preference. An external server can have or be associated with a database for a conveyance industry segment. An external server can have or be associated with a conveyance industry segment.

An external server can be but is not limited to a server that can connect to or communicate with a central server by way of a link. An external server can transmit in substantially real time, including but not limited to, a conveyance service request in conjunction with conveyance data, all or some of conveyance data relating to an AV, or a combination thereof, to a central server by way of a link. An external server can encompass different hardware and/or software alone or in a combination. An external server can include or connect to a database. A computer readable memory of an external server can be a database that an external server can connect to.

An external server can have or be associated with including but not limited to a central server, an external server, a link, a terminal, an owner/controller application, a good supplier, an AV, an application, a service provider, An AV owner/controller, a fleet manager, a logistics provider, a logistics supplier, or a combination thereof. An external server can optionally be perceived or referred to as a service provider server, a good supplier server, a fleet manager server, An AV owner/controller server, a logistics provider, a logistics supplier, or a combination thereof. An external server can be a server in an individual geographical location or an additional geographical location. An external server can relate to a single Internet location, but that need not be the case. An external server can be a secure server. An external server can be made secure using hardware and/or software commercially available. Additionally, an external server can include encryption software such that communications entering or exiting an external server are encrypted. Encryption hardware and/or software are commercially available.

An external server can be associated with an application Program Interface (API). An external server Application Program Interface (API) can be used to facilitate communication between including but not limited to a central server, an external server, an application, an owner/controller application, an AV, or a combination thereof. An external server can provide a conveyance service request in conjunction with conveyance data, all or some of conveyance data relating to an AV, or a combination thereof, relating to a service provider operating in a conveyance industry segment. An external server can be updated or refreshed in substantially real time and can refer to being updated or refreshed in the highest level of development or state of the art. An external server can perform a function in substantially real time and can refer to being updated or refreshed in the highest level of development or state of the art.

An external server being a source of a conveyance service request in conjunction with corresponding conveyance data, all or some of conveyance data relating to an AV, or a combination thereof, can be associated with an individual service provider, AV owner/controller, good supplier, fleet manager, logistics provider, logistics supplier, or a combination thereof.

An external server can operate on a central server. An external server can include a distinct server operably linked in the same or a different geographical location. An external server can optionally be perceived or referred to as a peer-to-peer network. An external server can transmit a conveyance service request, all or some of conveyance data relating to an AV, or a combination thereof, that can be pre-standardized to or with a central server. An external server can be but is not limited to a server that can connect to or communicate with an application, an owner/controller application, a central server, or a combination thereof, by way of a link. An application, an owner/controller application, an AV, a terminal, a central server, an external server, a link, or a combination thereof, can be combined or integrated.

A fleet of AVs can be sourced or provided by an external server that can be associated with a service provider, a good supplier, a fleet manager, An AV owner/controller, a logistics provider, a logistics supplier, or a combination thereof.

An individual service provider can be associated with an external server that can use or have a database based on a data point. An individual service provider can be associated with an external server that can use or have a database for a conveyance service request, all or some of conveyance data relating to an AV, or a combination thereof. An individual service provider can be associated with an external server that can use or have a database based on a selected preference or a representative preference. An individual service provider can be associated with an external server that can use or have a database for a conveyance industry segment. An individual service provider can use or have an external server relating to a conveyance industry segment being a ride-hail industry segment and another external server relating to a conveyance industry segment being a freight industry segment. An individual service provider can use or have an external server for a conveyance service request. An individual service provider can use or have an external server for all or some of conveyance data relating to an AV.

A fleet manager can use or have an external server that can include a database for a fleet of AVs. An external server can connect to or communicate with two central servers belonging to two different entities. A secured or obtained preferred conveyance service request, a secured or obtained autonomous vehicle that can be identified as preferred, or a combination thereof, can be transmitted from an application to an external server through a link.

An external server can filter and identify including but not limited to all or some of a preferred conveyance service request in conjunction with corresponding conveyance data, all or some of a filtered conveyance service request in conjunction with corresponding conveyance data, all or some of a conveyance service request in conjunction with corresponding conveyance data, all or some of preferred conveyance data relating to an AV, all or some of filtered conveyance data relating to an AV, all or some of conveyance data relating to an AV, all or some of a substantially real time geographical location of an AV, a representative preference, a selected preference, a secured or obtained preferred conveyance service request, a secured or obtained autonomous vehicle that can be identified as preferred, or a combination thereof, together or separately.

An external server can secure a preferred conveyance service request, a filtered conveyance service request, a conveyance service request, an AV that can be identified as preferred, an AV that can be filtered, an AV, or a combination thereof, and can communicate directly or indirectly with a central server, an external server, an application, an owner/controller application, an AV, An AV owner/controller, a service provider, a good supplier, a fleet manager, a logistics provider, a logistics supplier, a third party, or a combination thereof. A function of an external server can be performed by a central server.

Conveyance Data: The following are illustrative, non-limiting examples and embodiments of "conveyance data" as used in the present disclosure:

Conveyance data can be information or data that can for example be used to facilitate an operation or a function to secure a preferred conveyance service request, an AV that can be identified as preferred, or a combination thereof. Conveyance data can be information or data that can for example be utilized or managed by An AV owner/controller, a service provider, a good supplier, a fleet manager, a logistics provider, a logistics supplier, or a combination thereof.

Conveyance data can be for example data or information corresponding to a past metric, a current metric, a future metric, or a combination thereof, of including but not limited to a request for transporting a person, a good, an article, a thing, or a combination thereof, from a geographical location to another geographical location.

When all or some of conveyance data relating to an AV is considered, all or some of filtered conveyance data relating to an AV, all or some of preferred conveyance data relating to an AV, or a combination thereof, can also be considered. When all or some of conveyance data relating to an AV is considered, all or some of a substantially real time geographical location of an AV, all or some of a substantially real time geographical location of an AV that can be filtered, all or some of a substantially real time geographical location of an AV that can be identified as preferred, or a combination thereof, can also be considered.

Conveyance data relating to an AV, a conveyance service request, a substantially real time geographical location of an AV, or a combination thereof, can be sourced or provided from an external server, a central server, an application, or an owner/controller application. Conveyance data relating to an AV, a conveyance service request, a substantially real time geographical location of an AV, or a combination thereof, can be sourced or provided by an AV, An AV owner/controller, a service provider, a good supplier, a fleet manager, a logistics provider, or a logistics supplier.

Conveyance data relating to an AV, a conveyance service request, or a combination thereof, can be generated by an external server, a central server, an application, or an owner/controller application. Conveyance data relating to an AV, a conveyance service request, or a combination thereof, can be generated by an AV, An AV owner/controller, a service provider, a good supplier, a fleet manager, a logistics provider, or a logistics supplier.

Conveyance data can be sourced, provided, or generated by a technology, a software, a hardware, or a combination thereof, relating to an AV. All or some of conveyance data relating to an AV can be used by An AV owner/controller, a service provider, a good supplier, a fleet manager, a logistics provider, a logistics supplier, or a combination thereof, to control, manage, or operate an AV.

Conveyance data can be but is not limited to any data or information corresponding to a conveyance service request, a filtered conveyance service request, a preferred conveyance service request, an AV, an AV that can be filtered, an AV that can be identified as preferred, or a combination thereof, that can for example be transmitted between an external server, a central server, an application, a terminal, an owner/controller application, or a combination thereof, by way of a link.

Conveyance data can for example be transmitted from an external server to a central server, an application, an owner/controller application, an external server, or a combination thereof. Conveyance data retrieved from an external server can be for example cached on a central server, an application, an owner/controller application, an external server, or a combination thereof, to provide enhanced performance and better avoid a relevant limitation including but not limited to a central server limitation, an external server limitation, a service provider limitation, a link limitation, and any involved service provider limitation.

Conveyance data can be stored or cached in a database. Conveyance data can be stored or cached in a database table. Conveyance data can be updated or refreshed in substantially real time and can refer to being updated or refreshed in the highest level of development or state of the art. Conveyance data can correspond to a preferred conveyance service request, a filtered conveyance service request, a conveyance service request, an AV, an AV that can be filtered, an AV that can be identified as preferred, or a combination thereof, relating to An AV owner/controller, a service provider, a good supplier, a fleet manager, a logistics provider, a logistics supplier, a conveyance client, a representative, or a combination thereof, operating in a conveyance industry segment.

All or some of conveyance data can be but is not limited to any data or information relating to a conveyance service request, a filtered conveyance service request, a preferred conveyance service request, an AV, an AV that can be filtered, an AV that can be identified as preferred, or a combination thereof, that can be used to filter a conveyance service request into a filtered conveyance service request.

All or some of conveyance data can be but is not limited to any data or information relating to a conveyance service request, a filtered conveyance service request, a preferred conveyance service request, an AV, an AV that can be filtered, an AV that can be identified as preferred, or a combination thereof, that can be used to filter all or some of conveyance data relating to an AV into all or some of filtered conveyance data relating to an AV.

All or some of conveyance data can be but is not limited to any data or information relating to a conveyance service request, a filtered conveyance service request, a preferred conveyance service request, an AV, an AV that can be filtered, an AV that can be identified as preferred, or a combination thereof, that can be used to identify a preferred conveyance service request from a filtered conveyance service request.

All or some of conveyance data can be but is not limited to any data or information relating to a conveyance service request, a filtered conveyance service request, a preferred conveyance service request, an AV, an AV that can be filtered, an AV that can be identified as preferred, or a combination thereof, that can be used to identify all or some of preferred conveyance data relating to an AV or an AV that can be identified as preferred from all or some of filtered conveyance data relating to an AV.

All or some of conveyance data can be but is not limited to any data or information relating to a conveyance service request, a filtered conveyance service request, a preferred conveyance service request, an AV, an AV that can be filtered, an AV that can be identified as preferred, or a combination thereof, that can be stored, aggregated, standardized, filtered, or identified as preferred. All or some of conveyance data relating to an AV can be filtered and identified as preferred, in a same or a similar process as a conveyance service request, a filtered conveyance service request, a preferred conveyance service request, or a combination thereof.

All or some of conveyance data relating to an AV can be filtered and identified as preferred, instead of or substituted with a conveyance service request. All or some of conveyance data relating to an AV can be filtered and identified as preferred via a process of filtering and identifying a preferred conveyance service request. All or some of conveyance data relating to an AV can be filtered, identified as preferred, and secured or obtained relating to a selected preference, a substantially real time geographical location of an AV, or a combination thereof.

All or some of conveyance data can be but is not limited to any data or information relating to a conveyance service request, a filtered conveyance service request, a preferred conveyance service request, an AV, an AV that can be filtered, an AV that can be identified as preferred, or a combination thereof, can be pre-filtered or pre-categorized. All or some of conveyance data relating to an AV can be pre-filtered or pre-categorized. All or some of conveyance data relating to an AV, all or some of filtered conveyance data relating to an AV, or a combination thereof, can be pre-filtered or pre-categorized based on all or some of a substantially real time geographical location of an AV.

Conveyance data can be for example used by a central server, an external server, an application, an owner/controller application, a representative, An AV owner/controller, an AV, a service provider, a good supplier, a fleet manager, a logistics provider, a logistics supplier, or a combination thereof, to analyze or evaluate and then secure a preferred conveyance service request for or with an AV, an AV that can be identified as preferred, or a combination thereof.

Conveyance data can be optimized to identify a preferred conveyance service request. Conveyance data can include but is not limited to optimization data that can come from an AV, an AV sensor, a sensor data, a third party provider, a mapping provider, a remote server, an external server, or a service provider. Conveyance data can for example, include but is not limited to, demographic data relating to a geographical area, a conveyance service request, all or some of conveyance data, all or some of conveyance data relating to an AV, a conveyance client, a representative, an AV, An AV owner/controller, a service provider, a good supplier, a fleet manager, a logistics provider, a logistics supplier, or a combination thereof. Conveyance data can include but is not limited to a statistical variable of a filtered conveyance service request. Conveyance data can include but is not limited to a statistical variable of a preferred conveyance service request.

All or some of conveyance data relating to an AV can be all or some data relating to an AV. All or some of conveyance data relating to an AV can include but is not limited to a substantially real time geographical location of an AV.

Conveyance data can be in substantially real time and can include but is not limited to a beginning service geographical location, An ending service geographical location, pricing information, elevated pricing information, a representative preference, a selected preference, a distance parameter, an estimated time of arrival, a time to destination, a conveyance client geographical location, a conveyance client review, a conveyance client rating, a conveyance client detail, a conveyance service detail, a conveyance service route, a preferred conveyance client, a sensor data, a representative geographical location, a representative review, a representative rating, a representative detail, an AV geographical location, an AV review, an AV rating, an AV detail, a preferred autonomous vehicle, a route planning preference, a fuel economy preference, a battery longevity preference, a vehicle capacity preference, a vehicle diagnostic preference, a conveyance data preference, a service provider geographical location, a service provider review, a service provider rating, a service provider detail, a preferred service provider, a good supplier geographical location, a good supplier review, a good supplier rating, a good supplier detail, a preferred good supplier, An AV owner/controller geographical location, An AV owner/controller review, An AV owner/controller rating, an AV owner/controller detail, a preferred AV owner/controller, a fleet manager geographical location, a fleet manager review, a fleet manager rating, a fleet manager detail, a preferred fleet manager, a logistics provider geographical location, a logistics provider review, a logistics provider rating, a logistics provider detail, a preferred logistics provider, a logistics supplier geographical location, a logistics supplier review, a logistics supplier rating, a logistics supplier detail, a preferred logistics supplier, a conveyance industry segment detail, a preferred conveyance industry segment, a good detail, an item detail, a type of vehicle detail, a vehicle detail, a measurement of a statistical variable, a level of service detail, a fuel consumption, a battery level, a vehicle diagnostic, a vehicle capacity, or a combination thereof.

A sensor data relating to an AV can be communicated to another autonomous vehicle, a service provider, a good supplier, An AV owner/controller, a fleet manager, a logistics provider, a logistics supplier, or a combination thereof. A sensor data relating to an AV to can be communicated to a central server, an external server, an application, a terminal, an owner/controller application, or a combination thereof. A sensor data can be used to communicate a status of an AV.

A sensor data can be used to communicate a battery level of an AV, a fleet of AVs, or a combination thereof. A sensor data can be used to communicate a status of an AV when an AVAP can be analyzing or evaluating and securing or obtaining a preferred conveyance service request for or with an AV, an AV that can be identified as preferred, or a combination thereof.

A sensor data can be used to find, locate, update, filter, identify, or a combination thereof, a substantially real time geographical location of an AV or a substantially real time geographical location of a fleet of AVs. A substantially real time geographical location of an AV can be based on or related to a sensor data. A sensor data can be used by Autonomous Vehicle Automated Platform that can analyze or evaluate and then secure a preferred conveyance service request, an AV that can be identified as preferred, all or some of preferred conveyance data relating to an AV, or a combination thereof.

When all or some of conveyance data relating to an AV is considered, all or some of conveyance data relating to a fleet of AVs, can also be considered. When all or some of conveyance data relating to a fleet of AVs is considered, all or some of filtered conveyance data relating to a fleet of AVs, all or some of preferred conveyance data relating to a fleet of AVs, or a combination thereof, can also be considered. All or some of preferred conveyance data relating to a fleet of AVs can be identified from all or some of filtered conveyance data relating to a fleet of AVs that can have the highest weighted average of a representative preference or the highest weighted average of a selected preference.

Conveyance data can be generated or provided from a central server, an external server, a terminal, an application, an owner/controller application, or a combination thereof. Conveyance data relating to an AV or a conveyance service request can be sourced or provided by an external server relating to an AV owner/controller, a service provider, a good supplier, a fleet manager, a logistics provider, or a logistics supplier. Conveyance data relating to an AV such as a substantially real time geographical location of an AV can be sourced or provided by an AV. Conveyance data relating to an AV such as a substantially real time geographical location of an AV can be sourced or provided by an external server. All or some of conveyance data can be communicated with an application, an owner/controller application, an AV, a terminal, a central server, an external server, a link, or a combination thereof, that can be combined or integrated.

For example, all or some of conveyance data sourced or provided by an AV can be sourced from an input device such as a sensor, a transceiver, a receiver, an interface, an application, or a terminal.

All or some of conveyance data relating to an AV or a conveyance service request, can include optimization data that can be provided by a third party map provider to be utilized with route planning and identifying a preferred conveyance service request, an AV that can be identified as preferred, or a combination thereof.

Conveyance data relating to an AV can be used to analyze or evaluate a conveyance service request in substantially real time by An AV owner/controller, a service provider, a good supplier, a fleet manager, a logistics provider, or a logistics supplier.

Conveyance data can relate to a battery level of a device or a terminal belonging to a conveyance client. Conveyance data can include but is not limited to milestones, awards, incentives, number of rides completed, monetary earnings, financial information, or scheduling information. All or some of conveyance data can include for example a vehicle detail or an AV detail, which can be utilized to identify a preferred vehicle type, a preferred vehicle service, or a combination thereof.

Conveyance Service Request: The following are illustrative, non-limiting examples and embodiments of "conveyance service request" as used in the present disclosure:

A conveyance service request can be for example a request from a conveyance client or an entity for the transportation of including but not limited to a person, a good, an article, a thing, or a combination thereof, from a geographical location to another geographical location. Once, for example, a beginning service geographical location, An ending service geographical location, or a combination thereof, is inputted or provided into an application, a central server or an external server, a conveyance service request relating to a conveyance client can be generated. When a conveyance service request is considered, a conveyance service request in conjunction with corresponding conveyance data can also be considered.

A conveyance service request in conjunction with corresponding conveyance data can be sourced or provided from, including but not limited to, an external server, a service provider, a good supplier, or a fleet manager. A conveyance service request can be stored or cached in a computer readable memory and/or a database of a central server. A conveyance service request can relate to a conveyance industry segment. A conveyance service request can relate to a service provider, a good supplier, a fleet manager, An AV owner/controller, a logistics provider, a logistics supplier, or a combination thereof.

All or some of a conveyance service request can have or be associated with corresponding conveyance data. All or some of a conveyance service request can have or be associated with intrinsic conveyance data that can be stored in a database. All or some of a conveyance service request can be associated with or inherently have associated conveyance data that can be used to filter and identify a preferred conveyance service request to be secured or obtained for or with an AV that can be identified as preferred.

A conveyance service request can be updated or refreshed in substantially real time and can refer to being updated or refreshed in the highest level of development or state of the art. A conveyance service request can be pre-filtered or pre-categorized on a central server. A conveyance service request can be a filtered conveyance service request, a preferred conveyance service request, or a combination thereof, relating to a selected preference or a representative preference. A conveyance service request can become a filtered conveyance service request, a preferred conveyance service request, or a combination thereof, based on a representative preference inputted or provided by a representative. A conveyance service request can become a filtered conveyance service request, a preferred conveyance service request, or a combination thereof, based on a selected preference inputted or provided by An AV owner/controller, a service provider, a good supplier, a fleet manager, a logistics provider, or a logistics supplier.

A conveyance service request can be filtered once or more than once. Any time a conveyance service request can be filtered into a filtered conveyance service request or identified as a preferred conveyance service request, all or some of conveyance data relating to an AV can optionally be filtered into all or some of filtered conveyance data relating to an AV or identified as all or some of preferred conveyance data relating to an AV.

A conveyance service request can be a ride-hail service request, a ride-share service request, a car-share service request, a peer-to-peer conveyance service request, a transportation service request, a person delivery service request, a taxi service request, a shuttle service request, a good delivery service request, an item delivery service request, a medical service and delivery request, a food delivery service request, a courier delivery service request, a freight delivery service request, an animal delivery service request, a delivery service request, or a combination thereof.

A conveyance service request can be perceived or referred to as a filtered conveyance service request or a preferred conveyance service request. A conveyance service request can be identified or referred to as a filtered conveyance service request or a preferred conveyance service request for or with a representative, an AV, a fleet of AVs, An AV owner/controller, a service provider, a good supplier, a fleet manager, a logistics provider, a logistics supplier, or a combination thereof. A conveyance service request can include a waypoint. A conveyance service request can include a waypoint where a conveyance client can walk to a designated area to be picked up for a conveyance service. If a conveyance service request is secured or obtained, that same a secured or obtained conveyance service request can be referred to or identified as a preferred conveyance service request.

A conveyance service request can be pre-scheduled. A thing to be conveyed can be, for example, personal items such as keys or documents. A conveyance service request can include special request information. A conveyance service request can be stored or cached in a computer readable memory and/or a database of an application. A conveyance service request can relate to an individual conveyance industry segment. A conveyance service request can relate to an individual service provider, good supplier, or fleet manager. A conveyance service request can be a pre-filtered conveyance service request. A plurality of conveyance service requests can be a single conveyance service request. A conveyance service request can be pre-filtered or pre-categorized on a central server based on a geographical location.

A conveyance service request can optionally be perceived as or treated the same or similar as, all or some of conveyance data relating to an AV. A conveyance service request, all or some of conveyance data relating an AV, or a combination thereof, can be filtered in either order. All or some of conveyance data corresponding to a conveyance service request, all or some of conveyance data relating to an AV, or a combination thereof, can be stored in a database table.

A conveyance service request can be filtered according to a selected preference, a substantially real time geographical location of a fleet of AVs, or a combination thereof. When a conveyance service request is filtered into a filtered conveyance service request or identified as a preferred conveyance service request, all or some of conveyance data relating to a fleet of AVs can optionally be filtered into all or some of filtered conveyance data relating to a fleet of AVs or identified as all or some of preferred conveyance data relating to a fleet of AVs.

Filtered Conveyance Service Request: The following are illustrative, non-limiting examples and embodiments of "filtered conveyance service request" as used in the present disclosure:

A filtered conveyance service request can be for example a conveyance service request that can be filtered with including but not limited to a representative preference, a selected preference, a substantially real time geographical location of a representative, a substantially real time geographical location of an AV, or a combination thereof. When a filtered conveyance service request is considered, a filtered conveyance service request in conjunction with corresponding conveyance data can also be considered.

A filtered conveyance service request can be stored or cached in a computer readable memory and/or a database of a central server. When a representative preference or a selected preference is updated, modified, added, removed, and/or refreshed, a new set of a filtered conveyance service request can be generated. A filtered conveyance service request can relate to a conveyance industry segment. A filtered conveyance service request can relate to a service provider, a good supplier, a fleet manager, An AV owner/controller, a logistics provider, a logistics supplier, or a combination thereof.

All or some of a filtered conveyance service request can have or be associated with corresponding conveyance data. All or some of a filtered conveyance service request can have or be associated with intrinsic conveyance data that can be stored in a database. All or some of a filtered conveyance service request can be associated with or inherently have associated conveyance data that can be used to identify a preferred conveyance service request to be secured or obtained for or with an AV that can be identified as preferred.

A filtered conveyance service request can be updated or refreshed in substantially real time and can refer to being updated or refreshed in the highest level of development or state of the art. A filtered conveyance service request can be pre-filtered or pre-categorized on a central server. A filtered conveyance service request can be a conveyance service request that matches or satisfies a representative preference or a selected preference. A filtered conveyance service request can become a preferred conveyance service request based on a selected preference inputted or provided by An AV owner/controller, a service provider, a good supplier, a fleet manager, a logistics provider, or a logistics supplier.

A filtered conveyance service request can be filtered once or more than once. Any time a filtered conveyance service request can be identified as a preferred conveyance service request, all or some of filtered conveyance data relating to an AV can optionally be identified as all or some of preferred conveyance data relating to an AV.

A filtered conveyance service request can be displayed on an application or an owner/controller application. A filtered conveyance service request can be displayed on a geographical map of a visual representation. A filtered conveyance service request can relate to an individual conveyance industry segment. A filtered conveyance service request can relate to an individual service provider, good supplier, or fleet manager. For example, if a representative, an AV owner/controller, a service provider, a good supplier, a fleet manager, a logistics provider, a logistics supplier, or a combination thereof, secures a filtered conveyance service request, that same secured filtered conveyance service request can be designated as a preferred conveyance service request. A filtered conveyance service request can be a pre-filtered conveyance service request. A filtered conveyance service request can be perceived or referred to as a conveyance service request. A plurality of filtered conveyance service requests can be a single filtered conveyance service request.

A filtered conveyance service request can optionally be perceived as or treated the same or similar as, all or some of filtered conveyance data relating to an AV. A filtered conveyance service request, all or some of filtered conveyance data relating to an AV, or a combination thereof, can be identified as preferred, in either order. All or some of conveyance data corresponding to a filtered conveyance service request, all or some of filtered conveyance data relating to an AV, or a combination thereof, can be stored in a database table.

A filtered conveyance service request can be for example a conveyance service request that can be filtered with, including but not limited to, a selected preference, a substantially real time geographical location of a fleet of AVs, or a combination thereof. Any time a filtered conveyance service request can be identified as a preferred conveyance service request, all or some of filtered conveyance data relating to a fleet of AVs can optionally be identified as all or some of preferred conveyance data relating to a fleet of AVs.

Preferred Conveyance Service Request: The following are illustrative, non-limiting examples and embodiments of "preferred conveyance service request" as used in the present disclosure:

A preferred conveyance service request can be for example a request for transporting including but not limited to a person, a good, a thing, an article, or a combination thereof, from a geographical location to another geographical location that can be identified from a filtered conveyance service request. A preferred conveyance service request can be for example a request that including but not limited to a central server, a representative, an application, an owner/controller application, An AV owner/controller, an AV, a service provider, a good supplier, a fleet manager, a logistics provider, a logistics supplier, or a combination thereof, identifies as preferred. When a preferred conveyance service request is considered, a preferred conveyance service request in conjunction with corresponding conveyance data can also be considered.

A preferred conveyance service request can be stored or cached in a computer readable memory and/or a database of a central server. A preferred conveyance service request can for example be originally sourced or provided by at least external server, a service provider, a good supplier, or a fleet manager. A preferred conveyance service request can be a conveyance service request or a filtered conveyance service request that matches or satisfies a representative preference or a selected preference. A filtered conveyance service request can be identified as preferred by a central server, a representative, an application, an owner/controller application, An AV owner/controller, an AV, a service provider, a good supplier, a fleet manager, a logistics provider, a logistics supplier, or a combination thereof, and then a filtered conveyance service request can become a preferred conveyance service request.

All or some of a preferred conveyance service request can have or be associated with corresponding conveyance data. All or some of a preferred conveyance service request can have or be associated with intrinsic conveyance data that can be stored in a database. All or some of a preferred conveyance service request can be associated with or inherently have associated conveyance data that can be used to secure a preferred conveyance service request for or with an AV that can be identified as preferred.

Any time a preferred conveyance service request can be identified, all or some of preferred conveyance data relating to an AV can optionally be identified and a preferred conveyance service request can be secured or obtained for or with an AV that can be identified as preferred.

A preferred conveyance service request can be updated or changed in substantially real time as a substantially real time geographical location of a representative or an AV changes or updates. A preferred conveyance service request can relate to a conveyance industry segment. A preferred conveyance service request can relate to a service provider, a good supplier, a fleet manager, An AV owner/controller, a logistics provider, a logistics supplier, or a combination thereof. A preferred conveyance service request can be updated or refreshed in substantially real time and can refer to being updated or refreshed in the highest level of development or state of the art.

A conveyance service request can be filtered in substantially real time by using a representative preference or a selected preference to create a set of a filtered conveyance service request. A filtered conveyance service request can be sorted in substantially real time relating to a weighted average of a representative preference or a selected preference to identify a preferred conveyance service request. A preferred conveyance service request can be identified as preferred with the highest weighted average of a representative preference. A preferred conveyance service request can be identified as preferred with the highest weighted average of a selected preference. When a representative preference or a selected preference is updated, modified, added, removed, and/or refreshed, a new set of a preferred conveyance service request can be generated or identified.

A preferred conveyance service request can be updated in substantially real time as traffic information changes or updates. A different geographical location can be used other than a substantially real time geographical location of a representative, when filtering a conveyance service request, to identify a preferred conveyance service request. A preferred conveyance service request can relate to an individual conveyance industry segment. A preferred conveyance service request can relate to an individual service provider, good supplier, or fleet manager.

A preferred conveyance service request can be visually identifiable from a filtered conveyance service request displayed on a visual representation. A preferred conveyance service request can be displayed on a geographical map of a visual representation. A preferred conveyance service request can be displayed on an application or an owner/controller application. An application or an owner/controller application can secure a preferred conveyance service request. A central server, an application, an owner/controller application, or a combination thereof, can secure a preferred conveyance service request for or with an AV that can be identified as preferred.

A preferred conveyance service request can be identified from a filtered conveyance service request that has the highest weighted average of a representative preference or a selected preference. A representative preference or a selected preference can have an equal weight or an unequal weight when using a weighted average to identify a preferred conveyance service request. A preferred conveyance service request can be perceived or referred to as a conveyance service request or a filtered conveyance service request. More than one preferred conveyance service requests can be secured or obtained concurrently for or with an AV that can be identified as preferred.

A preferred conveyance service request can optionally be perceived as or treated the same or similar as all or some of preferred conveyance data relating to an AV. A preferred conveyance service request, all or some of preferred conveyance data relating to an AV, or a combination thereof, can be identified as preferred, in any order. All or some of conveyance data corresponding to a preferred conveyance service request, all or some of preferred conveyance data relating to an AV, or a combination thereof, can be stored in a database table. Any time a preferred conveyance service request can be identified, all or some of preferred conveyance data relating to a fleet of AVs can optionally be identified and a preferred conveyance service request can be secured or obtained for or with a fleet of AVs that can be identified as preferred.

Representative Preference: The following are illustrative, non-limiting examples of a "representative preference" as used in the present disclosure A representative preference can be a rule or a parameter that can be used to facilitate an operation or a function to secure a preferred conveyance service request, an AV that can be identified as preferred, or a combination thereof. A representative preference can be a rule or a parameter that can for example be utilized or operated by An AV owner/controller, a service provider, a good supplier, a fleet manager, a logistics provider, a logistics supplier, or a combination thereof. A representative preference can be any rule or parameter that can be used or utilized during a process of filtering and/or identifying a preferred conveyance service request, an AV that can be identified as preferred, or a combination thereof.

A representative preference can be a rule or a parameter that can optimize all or some of conveyance data, all or some of conveyance data relating to an AV, an AV, a conveyance service request, or a combination thereof. A representative preference can relate directly or indirectly to a preferred conveyance service request, an AV that can be identified as preferred, all or some of preferred conveyance data relating to an AV, or a combination thereof. A representative preference can be associated with or have a feature or a various feature that can be used to match an AV or an AV that can be identified as preferred for or with a preferred conveyance service request, a conveyance client, or a combination thereof. A representative preference can be a rule implemented in a rules based system, a rules based method, or a combination thereof.

A representative preference can for example be used by a representative to identify and secure a preferred conveyance service request. A representative preference can include but is not limited to an option for example selected or provided by a representative to filter and/or sort a conveyance service request in substantially real time in order to identify a preferred conveyance service request. A representative preference can be used in conjunction with a substantially real time geographical location of a representative or a different geographical location to filter a conveyance service request into a filtered conveyance service request. A filtered conveyance service request can be sorted in substantially real time in an order relating to a weighted average of a representative preference to identify a preferred conveyance service request. A representative can input or provide a representative preference into an application that can be used to identify and secure a preferred conveyance service request.

A representative preference can be stored or cached on including but not limited to a central server, an application, an external server, or a combination thereof. A representative preference can be stored or cached on or transmitted to including but not limited to a central server, an application, an external server, or a combination thereof. A representative preference can be pre-set on including but not limited to a central server, an external server, an application, or a combination thereof. A representative preference can be either inclusive or exclusive for filtering a conveyance service request. An individual representative preference can have an equal weight or an unequal weight when calculating a weighted average to identify a preferred conveyance service request. A representative can optionally choose a weight for a representative preference to have an equal weight or an unequal weight.

A representative preference can be updated or refreshed in substantially real time and can refer to being updated or refreshed in the highest level of development or state of the art. A representative preference can be used to perform a function in substantially real time being updated or refreshed in the highest level of development or state of the art.

A central server, an application, or a combination thereof, can filter out, hide, or remove a conveyance service request that does not meet a representative preference criteria for a representative. A representative preference can be updated or changed and a new or different set of including but not limited to a filtered conveyance service request, a preferred conveyance service request, or a combination thereof, can be identified. A representative preference can be used to identify a preferred conveyance service request from a filtered conveyance service request or a pre-filtered conveyance service request. A representative preference can be used for a conveyance industry segment. A representative preference can be used for a service provider.

A representative preference can be but is not limited to a pricing preference, an elevated pricing preference, a geographical location preference, a distance preference, a route preference, a service duration preference, a beginning service geographical location preference, An ending service geographical location preference, a time preference, a predictive preference, a historical preference, a efficiency preference, an event inclusion preference, an event exclusion preference, a traffic based preference, a road condition preference, a weather condition preference, a duration of conveyance service preference, a conveyance service request density preference, a conveyance client density preference, a conveyance client detail preference, a conveyance client rating preference, a representative density preference, a service provider inclusion preference, a service provider exclusion preference, a service provider density preference, a level of service preference, a good supplier inclusion preference, a good supplier exclusion preference, a good supplier density preference, a good detail preference, a conveyance industry segment preference, a freight preference, a waypoint preference, a delivery service preference, or a combination thereof.

An efficiency preference can be a parameter or a rule that can optimize vehicle utilization. If an efficiency preference is selected, a representative can accept an additional food delivery service request for the same restaurant to perform an additional conveyance service and earn more money. If a price preference is selected, then a conveyance service request priced higher than a set minimum price can be identified as a preferred conveyance service request. If a distance preference is selected, then a conveyance service request within a selected distance can be identified as a preferred conveyance service request. A good detail preference can include an item being fragile. If a good detail preference is selected, then a conveyance service request for conveying a certain type and/or quantity of a good that a representative is capable of delivering can be identified as a preferred conveyance service request, such as the capability to deliver a refrigerator or a mirror. If a freight preference is selected, then a conveyance service request for conveying freight that a representative is capable of delivering can be identified as a preferred conveyance service request, such as a conveyance service request to deliver a biohazardous material or a flammable material.

When an individual representative preference has an unequal weight, a pricing preference can have 70% weight and a distance preference can have 30% weight which can be used to identify a preferred conveyance service request when determining which a filtered conveyance service request has the highest weighted average.

A representative preference can be used for an individual conveyance industry segment. A representative preference can be used for an individual service provider. A representative can specify a representative preference to work in a given area by using a geographical location preference. A representative can specify a representative preference to work in a six-mile perimeter by using a geographical location preference.

A representative preference, once inputted or provided into an application, can be stored or cached on an application, a computer readable memory of a central server, or a combination thereof, and a representative preference is not inputted or provided again into an application by a representative. A representative preference can be stored or cached in a computer readable memory of a central server and a representative preference is not transmitted again from an application to a central server. A representative preference, a substantially real time geographical location of a representative, or a combination thereof, can be transmitted from an application to a central server at any time prior to filtering a conveyance service request. A representative preference and a selected preference can be used to manage or operate a representative and an AV in a RAP, an AVAP, or a combination thereof.

Selected Preference: The following are illustrative, non-limiting examples of a "selected preference" as used in the present disclosure A selected preference can be a rule or a parameter that can be used to facilitate an operation or a function to secure a preferred conveyance service request, an AV that can be identified as preferred, or a combination thereof. A selected preference can be a rule or a parameter that can for example be utilized or operated by An AV owner/controller, a service provider, a good supplier, a fleet manager, a logistics provider, a logistics supplier, or a combination thereof. A selected preference can be any rule or parameter that can be used or utilized during a process of filtering and/or identifying a preferred conveyance service request, an AV that can be identified as preferred, or a combination thereof.

A selected preference can be a rule or a parameter that can optimize all or some of conveyance data, all or some of conveyance data relating to an AV, an AV, a conveyance service request, or a combination thereof. A selected preference can relate directly or indirectly to a preferred conveyance service request, an AV that can be identified as preferred, all or some of preferred conveyance data relating to an AV, or a combination thereof. A selected preference can be associated with or have a feature or a various feature that can be used to match an AV or an AV that can be identified as preferred for or with a preferred conveyance service request, a conveyance client, or a combination thereof. A selected preference can be a rule implemented in a rules based system, a rules based method, or a combination thereof.

A selected preference can for example be used by An AV owner/controller, a service provider, a good supplier, a fleet manager, a logistics provider, a logistics supplier, or a combination thereof, to identify and secure a preferred conveyance service request, an AV, an AV that can be identified as preferred, or a combination thereof. A selected preference or a set of a selected preference can be used to filter, identify as preferred, secure, or a combination thereof, a preferred conveyance service request. A different selected preference or a different set of a selected preference can be used to filter, identify as preferred, secure, or a combination thereof, an AV that can be identified as preferred. A selected preference or a set of a selected preference can be used to filter, identify as preferred, secure, or a combination thereof, an AV that can be identified as preferred.

A selected preference can be refined or customized by An AV owner/controller, a service provider, a good supplier, a fleet manager, a logistics provider, a logistics supplier, a third party, or a combination thereof. A selected preference can be fixed or built-in on a central server. A selected preference can be made not-editable. A selected preference can be a digit or a number.

A selected preference can be a tool, for example, a rule or a parameter to filter, identify, secure, or a combination thereof, a preferred conveyance service request, a filtered conveyance service request, a conveyance service request, or a combination thereof. A selected preference can be a tool, for example, a rule or a parameter to filter, identify, secure, or a combination thereof, an AV that can be identified as preferred, an AV that can be filtered, an AV, all or some of preferred conveyance data relating to an AV, all or some of filtered conveyance data relating to an AV, all or some of conveyance data relating to an AV, or a combination thereof.

A selected preference can be used to match or satisfy a preferred conveyance service request, a filtered conveyance service request, a conveyance service request, or a combination thereof, with an AV or an AV that can be identified as preferred. A selected preference can be used to match or satisfy an AV or an AV that can be identified as preferred for or with a preferred conveyance service request, a filtered conveyance service request, a conveyance service request, or a combination thereof. A selected preference can for example be utilized by An AV owner/controller, a service provider, a good supplier, a fleet manager, a logistics provider, a logistics supplier, or a combination thereof, to identify and secure a preferred conveyance service request for or with an AV that can be identified as preferred.

A selected preference can include but is not limited to an option for example selected or provided by An AV owner/controller, a service provider, a good supplier, a fleet manager, a logistics provider, a logistics supplier, or a combination thereof, to filter and/or sort a conveyance service request in substantially real time to identify a preferred conveyance service request. A selected preference can include but is not limited to an option for example selected or provided by An AV owner/controller, a service provider, a good supplier, a fleet manager, a logistics provider, a logistics supplier, or a combination thereof, to filter and/or sort all or some of conveyance data relating to an AV in substantially real time to identify all or some of preferred conveyance data relating to an AV or an AV that can be identified as preferred.

A selected preference can, for example, be used to filter and identify a preferred conveyance service request and then filter and identify an AV that can be identified as preferred, all or some of preferred conveyance data relating to an AV, or a combination thereof, and be secured or obtained together. A selected preference can, for example, be used to filter and identify an AV that can be identified as preferred, all or some of preferred conveyance data relating to an AV, or a combination thereof, and then filter and identify a preferred conveyance service request and be secured or obtained together.

A selected preference can be used to filter a conveyance service request, all or some of conveyance data relating to an AV, or a combination thereof, in any order prior to securing or obtaining a match between a preferred conveyance service request, an AV that can be identified as preferred, or a combination thereof. A selected preference can be used to identify a preferred conveyance service request, all or some of preferred conveyance data relating to an AV, an AV that can be identified as preferred, or a combination thereof, in any order prior to securing or obtaining a match between a preferred conveyance service request, an AV that can be identified as preferred, or a combination thereof.

A selected preference can have or be associated with a set of preferences or a set of parameters that can be used to filter and identify a preferred conveyance service request, a filtered conveyance service request, or a combination thereof. A selected preference can have or be associated with a set of preferences or a set of parameters that can be used to filter and identify all or some of preferred conveyance data relating to an AV, all or some of filtered conveyance data relating to an AV, or a combination thereof. A selected preference can have or be associated with a set of preferences or a set of parameters that can be used to filter and identify a preferred conveyance service request, a filtered conveyance service request, all or some of preferred conveyance data relating to an AV, all or some of filtered conveyance data relating to an AV, an AV that can be identified as preferred, an AV that can be filtered, or a combination thereof.

A selected preference can be pre-set on including but not limited to a central server, an external server, an application, an owner/controller application, a terminal, or a combination thereof. A selected preference can be either inclusive or exclusive for filtering, a conveyance service request. A selected preference can be either inclusive or exclusive for identifying, a preferred conveyance service request. A selected preference can be either inclusive or exclusive for filtering, all or some of conveyance data relating to an AV. A selected preference can be either inclusive or exclusive for identifying, all or some of preferred conveyance data relating to an AV, an AV that can be identified as preferred, or a combination thereof.

An individual selected preference can have an equal weight or an unequal weight when calculating a weighted average to identify a preferred conveyance service request, all or some of preferred conveyance data relating to an AV, an AV that can be identified as preferred, or a combination thereof. A filtered conveyance service request can be sorted in substantially real time in an order relating to a weighted average of a selected preference to identify a preferred conveyance service request. All or some of filtered conveyance data relating to an AV can be sorted in substantially real time in an order relating to a weighted average of a selected preference to identify all or some of preferred conveyance data relating to an AV, an AV that can be identified as preferred, or a combination thereof.

An AV owner/controller, a service provider, a good supplier, a fleet manager, a logistics provider, a logistics supplier, or a combination thereof, can optionally choose a weight for a selected preference to have an equal weight or an unequal weight. An AV owner/controller, a service provider, a good supplier, a fleet manager, a logistics provider, a logistics supplier, or a combination thereof, can optionally choose a weight for a selected preference to filter, identify, secure, or a combination thereof, a preferred conveyance service request. An AV owner/controller, a service provider, a good supplier, a fleet manager, a logistics provider, a logistics supplier, or a combination thereof, can optionally choose a weight for a selected preference to filter, identify, secure, or a combination thereof, an AV that can be identified as preferred or all or some of preferred conveyance data relating to an AV.

A selected preference can be used to filter a conveyance service request into a filtered conveyance service request. A selected preference can be used to identify a preferred conveyance service request from a filtered conveyance service request. A selected preference can be used to filter all or some of conveyance data relating to an AV into all or some of filtered conveyance data relating to an AV. A selected preference can be used to identify all or some of preferred conveyance data relating to an AV, an AV that can be identified as preferred, or a combination thereof, from all or some of filtered conveyance data relating to an AV.

To identify an AV that can be identified as preferred, a selected preference can be used to filter and identify an AV that can be identified as preferred in a same or a similar process to filter and identify a preferred conveyance service request. To identify all or some of preferred conveyance data relating to an AV, a selected preference can be used to filter and identify all or some of preferred conveyance data relating to an AV in a same or a similar process to filter and identify a preferred conveyance service request. Anytime a conveyance service request is going through a process to become filtered or identified as preferred, all or some of conveyance data relating to an AV can go through a same or a similar process.

A selected preference can be stored or cached on including but not limited to a central server, an application, an owner/controller application, an external server, a terminal, or a combination thereof. A selected preference can be stored or cached on or transmitted to including but not limited to a central server, an external server, a terminal, an application, an owner/controller application, or a combination thereof. A selected preference can be stored on or retrieved from a server that can be remote from a central server.

A selected preference can be stored or cached in a database. A selected preference can be used in a database to filter and identify a preferred conveyance service request, a filtered conveyance service request, a conveyance service request, or a combination thereof. A selected preference can be used in a database to filter and identify an AV that can be identified as preferred, an AV that can be filtered, an AV, all or some of preferred conveyance data relating to an AV, all or some of filtered conveyance data relating to an AV, all or some of conveyance data relating to an AV, or a combination thereof.

After identifying a preferred conveyance service request as a data set result from a database, an AV that can be identified as preferred can be identified as a data set result from another database, and a preferred conveyance service request can be secured or obtained for or with an AV that can be identified as preferred. After identifying an AV that can be identified as preferred or all or some of preferred conveyance data relating to an AV as a data set result from a database, a preferred conveyance service request can be identified as a data set result from another database, and an AV that can be identified as preferred can be secured or obtained for or with a preferred conveyance service request.

An AV owner/controller, a service provider, a good supplier, a fleet manager, a logistics provider, a logistics supplier, or a combination thereof, can use a selected preference to filter and identify a preferred conveyance service request, a filtered conveyance service request, a conveyance service request, or a combination thereof. An AV owner/controller, a service provider, a good supplier, a fleet manager, a logistics provider, a logistics supplier, or a combination thereof, can use a selected preference to filter and identify an AV that can be identified as preferred, an AV that can be filtered, an AV, all or some of preferred conveyance data relating to an AV, all or some of filtered conveyance data relating to an AV, all or some of conveyance data relating to an AV, or a combination thereof.

An AV owner/controller, a service provider, a good supplier, a fleet manager, a logistics provider, a logistics supplier, or a combination thereof, can input or provide a selected preference into an owner/controller application, an application, or a central server that can be used to identify and secure a preferred conveyance service request for or with an AV that can be identified as preferred, an AV, or a combination thereof.

An AV owner/controller, a service provider, a good supplier, a fleet manager, a logistics provider, a logistics supplier, or a combination thereof, can use a selected preference to manage, control, or operate a fleet of AVs. An AV owner/controller, a service provider, a good supplier, a fleet manager, a logistics provider, a logistics supplier, or a combination thereof, can use a selected preference to manage, control, or operate an AV within a fleet of AVs.

A selected preference can be updated or refreshed in substantially real time and can refer to being updated or refreshed in the highest level of development or state of the art. A selected preference can be used to perform a function in substantially real time being updated or refreshed in the highest level of development or state of the art.

A selected preference can be updated or changed and a new or different set of including but not limited to a filtered conveyance service request, a preferred conveyance service request, or a combination thereof, can be identified. A selected preference can be updated or changed and a new or different set of including but not limited to all or some of filtered conveyance data relating to an AV, all or some of preferred conveyance data relating to an AV, an AV that can be identified as preferred, an AV that can be filtered, or a combination thereof.

A central server, an application, an owner/controller application, or a combination thereof, can for example, filter out, hide, or remove a conveyance service request that does not meet or match a selected preference criteria for an AV owner/controller, a service provider, a good supplier, a fleet manager, a logistics provider, or a logistics supplier. A central server, an application, an owner/controller application, or a combination thereof, can for example, filter out, hide, or remove all or some of conveyance data relating to an AV that does not meet or match a selected preference criteria for an AV owner/controller, a service provider, a good supplier, a fleet manager, a logistics provider, or a logistics supplier. A selected preference can be used in conjunction with a substantially real time geographical location of an AV or a different geographical location to filter a conveyance service request into a filtered conveyance service request.

A selected preference can be used to identify a preferred conveyance service request from a filtered conveyance service request or a pre-filtered conveyance service request. A selected preference can be used to identify all or some of preferred conveyance data relating to an AV, an AV that can be identified as preferred, or a combination thereof, from all or some of filtered conveyance data relating to an AV or all or some of pre-filtered conveyance data relating to an AV.

A selected preference can be used by An AV owner/controller, a service provider, a good supplier, a fleet manager, a logistics provider, a logistics supplier, or a combination thereof. A selected preference can be used by An AV owner/controller, a service provider, a good supplier, a fleet manager, a logistics provider, a logistics supplier, or a combination thereof, operating in a conveyance industry segment.

A selected preference can be a rule or a parameter that can utilize a route planning information. A selected preference can be learned over time relating to a conveyance service request, all or some of conveyance data, all or some of conveyance data relating to an AV, a conveyance client, a representative, an AV, An AV owner/controller, a service provider, a good supplier, a fleet manager, a logistics provider, a logistics supplier, all or some of conveyance data, or a combination thereof. A selected preference can be a predictive preference that can utilize machine learning technology and/or quantum computing.

A selected preference can use a sensor data to filter and identify a preferred conveyance service request, a filtered conveyance service request, a conveyance service request, all or some of preferred conveyance data relating to an AV, an AV that can be identified as preferred, all or some of filtered conveyance data relating to an AV, all or some of conveyance data relating to an AV, an AV, or a combination thereof.

A level of service preference can be used to identify, for example, a vehicle type, a service type, a vehicle detail, or an AV detail. A selected preference can have or relate to a cultural trait of a regional area or a country. A selected preference can be a capacity preference that can be utilized to manage or monitor a capacity level relating to a vehicle, an AV, a representative, An AV owner/controller, a service provider, a good supplier, a fleet manager, a logistics provider, a logistics supplier, or a combination thereof. A selected preference can be a vehicle diagnostic preference that can be related to conveyance data, all or some of conveyance data relating to an AV.

A selected preference can be but is not limited to a pricing preference, an elevated pricing preference, a geographical location preference, a distance preference, a route preference, a service duration preference, a beginning service geographical location preference, An ending service geographical location preference, a time preference, a predictive preference, a historical preference, a efficiency preference, a sensor preference, an event inclusion preference, an event exclusion preference, a traffic based preference, a road condition preference, a weather condition preference, a transportation preference, a route planning preference, a fuel economy preference, a battery longevity preference, a vehicle capacity preference, a vehicle diagnostic preference, a conveyance data preference, a duration of conveyance service preference, a conveyance service request density preference, a conveyance client density preference, a conveyance client detail preference, a conveyance client rating preference, a representative density preference, an AV density preference, a service provider inclusion preference, a service provider exclusion preference, a service provider density preference, a level of service preference, a good supplier inclusion preference, a good supplier exclusion preference, a good supplier density preference, An AV owner/controller inclusion preference, an AV owner/controller exclusion preference, an AV owner/controller density preference, a fleet manager inclusion preference, a fleet manager exclusion preference, a fleet manager density preference, a logistics provider inclusion preference, a logistics provider exclusion preference, a logistics provider density preference, a logistics supplier inclusion preference, a logistics supplier exclusion preference, a logistics supplier density preference, a good detail preference, a conveyance industry segment preference, a freight preference, a waypoint preference, a delivery service preference, a oldest outstanding request preference, or a combination thereof.

If a conveyance service request density preference is selected as a selected preference, a service provider or a fleet manager can strategically position an AV in an area of greater supply of a conveyance service request. If a service provider inclusion preference is selected by An AV owner/controller, then a conveyance service request from a selected service provider can be identified as a preferred conveyance service request. If a weather preference is selected, then a conveyance service request without a route through an area with inclement weather, such as snow, can be identified as a preferred conveyance service request. A selected preference can be transmitted from an owner/controller application to a central server. When an individual selected preference has an equal weight, an industry segment preference can have 25% weight, a service provider inclusion preference can have 25% weight, a pricing preference can have 25% weight, and a good detail preference can have 25% weight, which can be used to identify a preferred conveyance service request when determining which a filtered conveyance service request has a highest weighted average.

A selected preference can be used for an individual conveyance industry segment. A selected preference can be used by a fleet manager to operate or control a fleet of AVs in a conveyance industry segment. A selected preference can be used for an individual service provider. An AV owner/controller, a service provider, a good supplier, a fleet manager, a logistics provider, a logistics supplier, or a combination thereof, can specify a selected preference to work in a given area by using a geographical location preference. AV owner/controller, a service provider, a good supplier, a fleet manager, a logistics provider, a logistics supplier, or a combination thereof, can specify a selected preference to work in a five-mile perimeter by using a geographical location preference. An AV owner/controller, a service provider, a good supplier, a fleet manager, a logistics provider, a logistics supplier, or a combination thereof, can specify a selected preference to identify the oldest outstanding conveyance service request to ensure consumer sentiment is maintained and a conveyance client does not have to wait too long.

An AV owner/controller, a service provider, a good supplier, a fleet manager, a logistics provider, or a logistics supplier can use two specific selected preference to filter a conveyance service request and can use five specific selected preferences to filter all or some of conveyance data relating to an AV. A selected preference can be provided or inputted by An AV owner/controller, a service provider, a good supplier, a fleet manager, a logistics provider, or a logistics supplier into an application or an owner/controller application and can be stored or cached on an application, an owner/controller application, a central server, an external server, or a combination thereof. A selected preference can be similar to a representative preference.

A selected preference can be transmitted between or from an application to a central server by way of a link between an application and a central server. A selected preference can be transmitted between or from an application to an external server by way of a link between an application and an external server. A selected preference can be transmitted between or from an owner/controller application to a central server by way of a link between an owner/controller application and a central server. A selected preference can be transmitted between or from an owner/controller application to an external server by way of a link between an owner/controller application and an external server. A selected preference, all or some of conveyance data relating to an AV, a substantially real time geographical location of an AV, or a combination thereof, can be transmitted from an application or an owner/controller application to a central server or an external server at any time prior to filtering a conveyance service request.

To provide a few examples, a selected preference can be associated with a database, a database query, a database table, or a database result set. A database query can include or be associated with a selected preference. A selected preference can be related to or associated with another a selected preference. A selected preference can be used to retrieve data from database. A selected preference can be an internal part of a central server. A selected preference can be in a form or a format relating to a SQL parameter, or a variable. Multiple selected preferences can be used multiple times during a process of filtering and/or identifying a preferred conveyance service request for or with an AV that can be identified as preferred. A selected preference can be used with or within a conditional statement, a conditional expression, or a conditional construct. A selected preference can be used for altering a control flow based on a condition.

A selected preference can have or be associated with a different set of preferences or a different set of parameters that can be used to filter and identify a preferred conveyance service request, a filtered conveyance service request, a conveyance service request, or a combination thereof. A selected preference can have or be associated with a different set of preferences or a different set of parameters that can be used to filter and identify a preferred conveyance service request, a filtered conveyance service request, a conveyance service request, all or some of preferred conveyance data relating to an AV, all or some of filtered conveyance data relating to an AV, all or some of conveyance data relating to an AV, an AV that can be identified as preferred, an AV that can be filtered, an AV, or a combination thereof.

Some selected preferences can be more relevant than other selected preferences when a central server filters and/or identifies a preferred conveyance service request, a filtered conveyance service request, a conveyance service request, an AV that can be identified as preferred, an AV that can be filtered, an AV, all or some of preferred conveyance data relating to an AV, all or some of filtered conveyance data relating to an AV, all or some of conveyance data relating to an AV, or a combination thereof. A selected preference can be used for filtering a conveyance service request, all or some of conveyance data relating to an AV, or a combination thereof, and a different selected preference can be used for identifying a preferred conveyance service request, an AV that can be identified as preferred, all or some of preferred conveyance data relating to an AV, or a combination thereof.

A selected preference can use a sensor data to analyze or evaluate and secure a preferred conveyance service request with or for an AV that can be identified as preferred, an AV, or a combination thereof. A selected preference can use a sensor data to identify if an AV has enough battery to perform a conveyance service.

A transportation preference can be a parameter or a rule that can identify a conveyance service preference. A transportation preference can identify a conveyance service request that requires handicap assistance. A transportation preference can identify a conveyance service request that requires a luxury vehicle. An efficiency preference can a parameter or a rule that can optimize vehicle utilization. A selected preference can be stored or cached in a database table. A selected preference can be stored or cached in a database that a central server, an external server, an application, an owner/controller application, or a combination thereof, can connect to or be associated with.

A route planning preference can identify a route that can avoid toll roads. A route planning preference can identify an optimal navigational route that can aid in identifying a preferred conveyance service request, an AV that can be identified as preferred, all or some of preferred conveyance data relating to an AV, or a combination thereof. A fuel economy preference can be to exclude or discard an AV that has lower than a quarter battery level. A fuel economy preference can be to identify a specific mode an AV can perform, such as, sport mode, comfort mode, or eco mode.

A predictive preference can be identified or learned over time based on a pattern relating to a conveyance service request, all or some of conveyance data, all or some of conveyance data relating to an AV, a conveyance client, a representative, an AV, An AV owner/controller, a service provider, a good supplier, a fleet manager, a logistics provider, a logistics supplier, or a combination thereof.

A battery longevity preference can include only an AV that can have greater than 90% battery level for a conveyance service that exceeds 100 miles. A time preference can relate to a time range, a pick-up time, a drop-off time, or a pre-scheduled time during a time of a day, a time of a week, a time of a month, a time of a year, or a combination thereof. A conveyance client detail preference can be a route preference provided by a conveyance client, an application, an owner/controller application, a central server, an external server, a third party, a map provider, or a combination thereof.

A route preference can be utilized to identify a historical route, a specific route, a favored route, an area, a specific location, and/or a pricing information. A route preference can be learned over time to avoid traffic congestion on Highway Interstate 5 around 5 PM during the week. A route preference can be to avoid a road, a street, a highway, a neighborhood that a conveyance client or a recipient of a conveyance service prefers.

A level of service preference can be used by a conveyance client to identify a luxury vehicle, an environmentally friendly vehicle, or a driverless vehicle. A level of service preference can be utilized to identify a newer vehicle over an older vehicle. A level of service preference can be utilized by An AV owner/controller, a service provider, a good supplier, a fleet manager, a logistics provider, a logistics supplier, or a third party to provide a higher level of service, for example, a luxury service, and make more income potential.

A level of service preference can be displayed on or with a visual representation to identify different levels of service that An AV owner/controller, a service provider, a good supplier, a fleet manager, a logistics provider, a logistics supplier, or a third party can provide. A level of service preference can be displayed as an icon with or on a visual representation to allow a selection of different levels of service that An AV owner/controller, a service provider, a good supplier, a fleet manager, a logistics provider, a logistics supplier, or a third party can provide.

A level of service preference can be displayed on a dynamic map to identify different levels of service that an AV owner/controller, a service provider, a good supplier, a fleet manager, a logistics provider, a logistics supplier, or a third party can provide. An AV owner/controller, a service provider, a good supplier, a fleet manager, a logistics provider, a logistics supplier, or a combination thereof, can be displayed on or with a dynamic map that can display a level of service preference and can be represented by a mobile or transitory icon.

An event inclusion preference can identify a destination rating with 4 out of 5 stars for or with a An AV owner/controller, an AV, a service provider, a good supplier, a fleet manager, a logistics provider, a logistics supplier, or a combination thereof. An event inclusion preference can identify an event or an area that can be optimal for a service provider that can be currently well positioned in or near that event or area, but it may not be optimal for other service providers further away from that event or area.

A selected preference can be a good supplier preference that can enable a good supplier to delay or postpone a current or a future conveyance service request. A conveyance client preference or a preference of a recipient of a conveyance service, can be compared to or with a selected preference, to identify a match and secure a preferred conveyance service request for or with an AV that can be identified as preferred.

A selected preference can have or relate to a cultural trait that can impact a match between an AV and a preferred conveyance service request. A selected preference can have or relate to a cultural trait that can impact all or some of a conveyance service request in conjunction with corresponding conveyance data, all or some of conveyance data relating to an AV, or a combination thereof. As an illustration, Americans tend to have a selected preference with a shorter estimated time of arrival compared to Canadians.

A capacity preference can identify a maximum number of passengers or goods in a vehicle or an AV. A conveyance client can utilize a selected preference to specify if a conveyance client prefers an AV or a representative. A selected preference can be at least carpool preference. A selected preference can be used to identify a conveyance client or a group of a conveyance client that can be pooled together for a conveyance service to an ending service geographical location. A selected preference can relate to safety for example, an AV being handicap friendly.

A delivery service preference can be to filter out deliveries that can add more than 10 minutes to total travel time. A delivery service preference can specify a dimension for a good or item. A delivery service preference can be used to identify an AV with a specific feature relating to the good or item delivery. A delivery service preference can be used to identify a pre-scheduled conveyance service request or a pre-scheduled autonomous vehicle.

A vehicle diagnostic preference can be to take an AV off the road or to not secure another conveyance service request if an AV is due for maintenance. A vehicle diagnostic preference can be to take an AV off the road or to not secure another conveyance service request if criteria regarding an AV is met. A vehicle diagnostic preference can be related to a sensor data on an AV.

A central server can use or apply a second selected preference and a process can optionally be referred to or seen as an additional level of filtering. A central server can filter conveyance service requests using a two step process to first filter conveyance service requests based on a selected preference and then filter a subset of conveyance service requests based on a different selected preference. A central server can filter all or some of conveyance data relating to an AV using a two step process to first filter all or some of conveyance data relating to an AV based on a selected preference and then filter a subset of all or some of conveyance data relating to an AV based on a different selected preference.

Geographical Location: The following are illustrative, non-limiting examples and embodiments of "geographical location" as used in the present disclosure:

A geographical location of a representative, an AV, a conveyance client, a service provider, a good supplier, a fleet manager, An AV owner/controller, a logistics provider, a logistics supplier, or a combination thereof, can be for example in real time, near real time, static, or non-real time.

A geographical location of any individual person, machine, entity, or a combination thereof, can be related to or have a longitude and a latitude in a decimal point or format. A geographical location of any individual person, machine, entity, or a combination thereof, can be related to or have a longitude and a latitude in a database with a decimal point or format. A geographical location of any individual person, machine, entity, or a combination thereof, can be related to or have a longitude and a latitude in a different decimal point or format. A geographical location of any individual person, machine, entity, or a combination thereof, can be related to or have a longitude and a latitude in a database with a different decimal point or format.

A geographical location of a representative, an AV, a fleet of AVs, a conveyance client, a service provider, a good supplier, a fleet manager, An AV owner/controller, a logistics provider, a logistics supplier, or a combination thereof, can have or utilize a variable precision, that can be standardized in a uniform format. Due to many different systems and methods of coding a geographical location, a variable precision can be preferred to standardize a geographical location. Due to many different systems and methods of coding a substantially real time geographical location of an AV, a variable precision can be preferred to standardize a digit or a decimal.

A geographical location of any individual person, machine, entity, or a combination thereof, can be updated or refreshed in substantially real time and can refer to being updated or refreshed in the highest level of development or state of the art. A geographical location of any individual person, machine, entity, or a combination thereof, can be used to perform a function in substantially real time being updated or refreshed in the highest level of development or state of the art. A geographical location can be pre-set on including but not limited to a central server, an external server, an application, an owner/controller application, a visual representation, or a combination thereof.

A geographical location of any of a representative, conveyance client, an AV, service provider, good supplier, fleet manager, AV owner/controller, logistics provider, logistics supplier, can be a geographical location, a coordinate, a position, or a place where that entity can be at any given point in time.

A geographical location of a representative, an AV, a conveyance client, a service provider, a good supplier, a fleet manager, An AV owner/controller, a logistics provider, a logistics supplier, or a combination thereof, can be for example displayed on a visual representation.

When a substantially real time geographical location of an AV is considered, a substantially real time geographical location of a fleet of AVs can also be considered. When a geographical location of any individual person, machine, entity, or a combination thereof, is considered, a geographical location of a representative, an AV, a fleet of AVs, a conveyance client, a service provider, a good supplier, a fleet manager, An AV owner/controller, a logistics provider, or a logistics supplier can also be considered.

A geographical location of a representative, an AV, a fleet of AVs, a conveyance client, a service provider, a good supplier, a fleet manager, An AV owner/controller, a logistics provider, a logistics supplier, or a combination thereof, can relate to a service provider operating in a conveyance industry segment.

A geographical location of a representative, an AV, a fleet of AVs, a conveyance client, a service provider, a good supplier, a fleet manager, An AV owner/controller, a logistics provider, a logistics supplier, or a combination thereof, can be used for respective density preferences. A geographical location of a representative, an AV, a fleet of AVs, a conveyance client, a service provider, a good supplier, a fleet manager, An AV owner/controller, a logistics provider, a logistics supplier, or a combination thereof, can relate to an individual service provider operating in an individual conveyance industry segment.

A geographical location of a representative, an AV, a fleet of AVs, a conveyance client, a service provider, a good supplier, a fleet manager, An AV owner/controller, a logistics provider, a logistics supplier, or a combination thereof, can be static or non-real time. A geographical location of a good supplier can be static or non-real time as it can relate to a brick and mortar geographical location. A geographical location of an AV can be based on or related to a sensor data associated with an AV.

A geographical location of a fleet of AVs or an AV fleet, can be but is not limited to a geographical location, a coordinate, a position, or a place where a fleet of AVs can be at any given point in time. A geographical location of an AV can be based on an AV, a fleet of AVs or an AV fleet.

A geographical location of any individual person, machine, entity, or a combination thereof, can be sourced or provided from three external servers, and can be associated with or have a longitude and a latitude in a database table with a different decimal point or format that can be standardized to have a similar decimal point or format. A substantially real time geographical location of an AV, a fleet of AVs, an AV fleet, or a combination thereof, can have or be associated with a variable precision, that can be standardized in a uniform format. A geographical location of a representative, an AV, a fleet of AVs, a conveyance client, a service provider, a good supplier, a fleet manager, An AV owner/controller, a logistics provider, a logistics supplier, or a combination thereof, can have or be associated with a variable precision, that can be standardized in a uniform format.

A substantially real time geographical location of an AV, a fleet of AVs, an AV fleet, or a combination thereof, can have or be associated with a longitude and a latitude in a decimal point or format. A substantially real time geographical location of an AV, a fleet of AVs, an AV fleet, or a combination thereof, can have or be associated with a longitude and a latitude in a database table with a decimal point or format.

A substantially real time geographical location of an AV, a fleet of AVs, an AV fleet, or a combination thereof, can have or be associated with a longitude and a latitude in a different decimal point or format. A substantially real time geographical location of an AV, a fleet of AVs, an AV fleet, or a combination thereof, can have or be associated with a longitude and a latitude in a database table with a different decimal point or format.

A geographical location of an individual person, an individual machine, an individual entity, a representative, an AV, a fleet of AVs, a conveyance client, a service provider, a good supplier, a fleet manager, An AV owner/controller, a logistics provider, a logistics supplier, or a combination thereof, can have or be associated with a longitude and a latitude in a database table with a decimal point or format. A geographical location of an individual person, an individual machine, an individual entity, a representative, an AV, a fleet of AVs, a conveyance client, a service provider, a good supplier, a fleet manager, An AV owner/controller, a logistics provider, a logistics supplier, or a combination thereof, can have or be associated with a longitude and a latitude in a database table with a different decimal point or format.

Due to many different systems and methods of coding a geographical location of a representative, an AV, a fleet of AVs, a conveyance client, a service provider, a good supplier, a fleet manager, An AV owner/controller, a logistics provider, a logistics supplier, or a combination thereof, a variable precision is preferred to standardize a digit or a decimal.

Beginning Service Geographical Location: The following are illustrative, non-limiting examples and embodiments of "beginning service geographical location" as used in the present disclosure:

A beginning service geographical location can be but is not limited to a geographical location for example requested by a conveyance client or an entity where a conveyance service begins or is requested. A beginning service geographical location can be modified before and/or during a conveyance service, if utilizing a waypoint. A beginning service geographical location need not be a substantially real time geographical location of a conveyance client. A beginning service geographical location can be updated or refreshed in substantially real time and can refer to being updated or refreshed in the highest level of development or state of the art. A beginning service geographical location can be used to perform a function in substantially real time being updated or refreshed in the highest level of development or state of the art. A beginning service geographical location can be pre-set or pre-determined on including but not limited to a central server, an external server, an application, an owner/controller application, or a combination thereof. A beginning service geographical location can be associated with a conveyance service request.

A beginning service geographical location can be static or non-real time. A representative or an AV can pick up a conveyance client at a beginning service geographical location. A beginning service geographical location can have or be associated with a way-point. A beginning service geographical location can have or be associated with a way-point, where a conveyance client can walk to a beginning service geographical location. A conveyance client can have or use two or multiple beginning service geographical locations including a way-point, where a conveyance client can take a public bus from one beginning service geographical location to then be picked up by an AV from a second beginning service geographical location.

A beginning service geographical location can be at a future beginning service geographical location. A beginning service geographical location can used for or with an AV to create a conveyance service offering. A beginning service geographical location can be dynamic. A beginning service geographical location can be associated with latitude and longitude.

Ending Service Geographical Location: The following are illustrative, non-limiting examples and embodiments of "ending service geographical location" as used in the present disclosure:

An ending service geographical location can be but is not limited to a geographical location for example requested by a conveyance client or an entity where a conveyance service ends. An ending service geographical location can be modified before and/or during a conveyance service. An ending service geographical location can include a waypoint. An ending service geographical location can be updated or refreshed in substantially real time and can refer to being updated or refreshed in the highest level of development or state of the art. An ending service geographical location can be used to perform a function in substantially real time being updated or refreshed in the highest level of development or state of the art. An ending service geographical location can be pre-set or pre-determined on including but not limited to a central server, an external server, an application, an owner/controller application, or a combination thereof. An ending service geographical location can be associated with a conveyance service request.

An ending service geographical location can be static or non-real time. A representative or an AV can drop off a conveyance client at An ending service geographical location. An ending service geographical location can have or be associated with a way-point, where a conveyance client can stop at a coffee shop prior to being dropped off at An ending service geographical location. An ending service geographical location can be at a future ending service geographical location. An ending service geographical location can used for or with an AV to create a conveyance service offering. An ending service geographical location can be dynamic. An ending service geographical location can be associated with latitude and longitude.

Conveyance Industry Segment: The following are illustrative, non-limiting examples and embodiments of "conveyance industry segment" as used in the present disclosure:

The conveyance industry can be for example an industry categorized by the transportation of someone or something from a geographical location to another geographical location. The conveyance industry can be for example an industry categorized by the transportation of someone or something from a geographical location to another geographical location in substantially real time. A conveyance industry segment can be for example a smaller part of the overall conveyance industry as a whole, categorized by different limiting characteristics. A conveyance industry segment can be updated or refreshed in substantially real time and can refer to being updated or refreshed in the highest level of development or state of the art.

A service provider, An AV owner/controller, a good supplier, a fleet manager, a logistics provider, a logistics supplier, an AV, or a combination thereof, can operate in a conveyance industry segment. An AV owner/controller, a service provider, a good supplier, a fleet manager, a logistics provider, a logistics supplier, or a combination thereof, can manage, control, and/or operate an AV in a conveyance industry segment. A conveyance service request can be associated with a conveyance industry segment. An AVAP can manage, operate, and/or control an AV that can operate in a conveyance industry segment. A RAP can manage, operate, and/or control a representative that can operate in a conveyance industry segment. An AVAP, a RAP, or a combination thereof, can manage, operate, and/or control an AV, a representative, or a combination thereof, that can operate in a single conveyance industry segment or across multiple industry segments, which may include ride-hail, ride-share, car-share, peer-to-peer conveyance, person delivery, taxi, item delivery, good delivery, medical service and delivery, food delivery, courier, animal delivery, a transportation, or a combination thereof.

What is claimed is:

1. A network for improving efficiency for securing conveyance services by a vehicle controlled by a representative, the network comprising:
at least one external server in communication with the network, the at least one external server associated with a business entity that provides goods or services, the at least one external server comprising a source of conveyance service requests on behalf of one or more client, and conveyance data, at least a portion of the conveyance data comprising vehicle-related data relating to the vehicle, wherein the vehicle-related data includes vehicle capacity;
a central server in communication with the network, wherein the at least one central server is automated in whole or in part and configured for repeatedly receiving the conveyance service requests and the vehicle-related data from the at least one external server and for performing one or a combination of standardizing and aggregating one or a combination of the conveyance service requests and the vehicle-related data;
an application associated with the vehicle, the application configured for communicating one or a combination of geographical location data and the vehicle-related data to the network;
a representative application in communication with the network, the representative application configured for entry by the representative of one or more representative preference;
at least one terminal comprising a display device and an input device, the at least one terminal configured for interacting with one or more of the application and the representative application;
wherein the central server is further configured to process the conveyance service requests comprising conveyance data corresponding to at least one feature of the conveyance service requests, the geographical location data, the one or more representative preference, and the vehicle-related data, and wherein the central server is further configured to perform the steps of:
(a) filtering, in any order:
(i) at least a portion of the conveyance service requests by using one or a combination of the one or more representative preference and the geographical location data to identify a filtered subset of conveyance service requests; and
(ii) at least a portion of the vehicle-related data by using one or a combination of the one or more representative preference and the geographical location data to identify a filtered subset of vehicle-related data;
(b) identifying one or more matches between the filtered subset of conveyance service requests and the filtered subset of vehicle-related data based on one or a combination of the one or more representative preference and the geographical location data;
(c) securing the one or more matches by communicating one or more of the one or more matches and conveyance service instructions to the vehicle to cause the vehicle to provide the conveyance services on behalf of the one or more client;
(d) automatically and repeatedly analyzing one or more of the conveyance service requests, updated vehicle-related data, and updated geographical location data and repeating steps (a) through (c) to pool additional conveyance services to be provided by the vehicle until one or more of the vehicle capacity has been substantially filled and an ending service location has been reached; and
(e) generating on the display device a visual representation corresponding to a route followed by the vehicle in providing the one or more conveyance services, wherein the visual representation is dynamically updated to display progression of the conveyance services.

2. The network of claim 1, wherein the at least one external server comprises a plurality of external servers, each external server associated with a different business entity.

3. The network of claim 1, wherein the at least one external server comprises a plurality of external servers associated with a single business entity.

4. The network of claim 1, wherein the representative comprises a vehicle driver or controller of one or more autonomous vehicle.

5. The network of claim 1, wherein one or a combination of the representative and the client operates within a freight industry segment.

6. The network of claim 1, wherein the business entity comprises one or more of an entity that conveys goods or services, an entity that produces or supplies freight, a freight provider, a service provider, a goods supplier, a fleet manager, a logistics provider, and a logistics supplier.

7. The network of claim 1, wherein the conveyance service is one or a combination of services selected from ride-hail, ride-share, car-share, peer-to-peer conveyance, person delivery, taxi, shuttle, good delivery, item delivery, medical service and delivery, food delivery, courier delivery, freight delivery, and animal delivery.

8. The network of claim 1, wherein the central server identifies the filtered subset of conveyance service offerings using an algorithm configured for one or more of sorting, selection, searching, merging, maximizing, minimizing, and comparing.

9. The network of claim 1, wherein the central server identifies the filtered subset of conveyance service requests using a weighted average of the one or more representative preferences.

10. A method within a network for improving efficiency in securing conveyance services by a vehicle controlled by a representative in communication with the network, the method comprising:
(a) receiving at a central server in communication with the network in substantially real time, in any order:
(i) conveyance service requests and vehicle-related data from at least one external server associated with a business entity that provides goods or services, the conveyance service requests submitted on behalf of one or more client and comprising conveyance data corresponding to at least one feature of the conveyance service requests, wherein, the at least one external server comprises one or more of a substantially real time source of the conveyance service requests and a substantially real time source of conveyance data, at least a portion of the conveyance data comprising vehicle-related data relating to the vehicle, wherein the vehicle-related data includes vehicle capacity;

(ii) geographical location data; and
(iii) one or more representative preference entered by the representative;
(b) filtering, in any order, the conveyance service requests and the vehicle-related data to:
  (i) identify a filtered subset of conveyance service requests using one or a combination of the one or more representative preference and the geographical location data; and
  (ii) identity a filtered subset of vehicle-related data using one or a combination of the one or more representative preference and the geographical location data;
(c) identifying one or more matches between the filtered subset of conveyance service requests and the filtered subset of vehicle-related data based on one or a combination of the one or more representative preference and the geographical location data;
(d) securing the one or more matches by communicating conveyance service instructions to the vehicle to cause the vehicle to provide one or more conveyance services on behalf of the client; and
(e) automatically and repeatedly analyzing one or more of the conveyance service requests, updated vehicle-related data, and updated geographical location data and repeating steps (a) through (d) to pool additional conveyance services to be provided by the vehicle until one or more of the vehicle capacity has been substantially filled and an ending service location has been reached; and
(f) generating on a display device of at least one terminal in communication with the network a visual representation corresponding to a route followed by the vehicle in providing the one or more conveyance services, wherein the visual representation is dynamically updated to display progression of the one or more conveyance services.

11. The method of claim 10, wherein the at least one external server comprises a plurality of external servers, each external server associated with a different business entity.

12. The method of claim 10, wherein the at least one external server comprises a plurality of external servers associated with a single business entity.

13. The method of claim 10, wherein the representative comprises a vehicle driver or controller of one or more autonomous vehicle.

14. The method of claim 10, wherein one or a combination of the representative and the client operates within a freight industry segment.

15. The method of claim 10, wherein the business entity comprises one or more of an entity that conveys goods or services, an entity that produces or supplies freight, a freight provider, a service provider, a goods supplier, a fleet manager, a logistics provider, and a logistics supplier.

16. The method of claim 10, wherein the conveyance service is one or a combination of services selected from ride-hail, ride-share, car-share, peer-to-peer conveyance, person delivery, taxi, shuttle, good delivery, item delivery, medical service and delivery, food delivery, courier delivery, freight delivery, and animal delivery.

17. The method of claim 10, wherein the central server identifies the filtered subset of conveyance service offerings using an algorithm configured for one or more of sorting, selection, searching, merging, maximizing, minimizing, and comparing.

18. The method of claim 10, wherein the central server identifies the filtered subset of conveyance service requests using a weighted average of the one or more representative preferences.

* * * * *